United States Patent
Robinson et al.

(10) Patent No.: US 12,527,963 B2
(45) Date of Patent: Jan. 20, 2026

(54) MAGNETOELECTRIC DATA AND POWER TO MINIATURE BIODEVICES WITH TUNABLE AMPLITUDE AND WAVEFORM

(71) Applicant: William Marsh Rice University, Houston, TX (US)

(72) Inventors: Jacob Robinson, Houston, TX (US); Kaiyuan Yang, Houston, TX (US); Zhanghao Yu, Houston, TX (US); Joshua Chen, Diamond Bar, CA (US); Amanda Singer, Houston, TX (US); Benjamin Avants, Houston, TX (US); Nishant Verma, Houston, TX (US)

(73) Assignee: William Marsh Rice University, Houston, TX (US)

( * ) Notice: Subject to any disclaimer, the term of this patent is extended or adjusted under 35 U.S.C. 154(b) by 835 days.

(21) Appl. No.: 17/601,337

(22) PCT Filed: Apr. 3, 2020

(86) PCT No.: PCT/US2020/026688
§ 371 (c)(1),
(2) Date: Oct. 4, 2021

(87) PCT Pub. No.: WO2020/206332
PCT Pub. Date: Oct. 8, 2020

(65) Prior Publication Data
US 2022/0168579 A1 Jun. 2, 2022

Related U.S. Application Data

(60) Provisional application No. 62/976,051, filed on Feb. 13, 2020, provisional application No. 62/830,089, filed on Apr. 5, 2019.

(51) Int. Cl.
*A61N 1/378* (2006.01)
*A61N 1/372* (2006.01)
(Continued)

(52) U.S. Cl.
CPC ....... *A61N 1/37223* (2013.01); *A61N 1/3787* (2013.01); *H10N 35/101* (2023.02); *H10N 35/80* (2023.02); *H10N 35/85* (2023.02)

(58) Field of Classification Search
CPC .................. A61N 1/37223; A61N 1/3787
See application file for complete search history.

(56) References Cited

U.S. PATENT DOCUMENTS 5,630,836 A * 5/1997 Prem .............. A61N 1/37211
607/66
2007/0282378 A1 12/2007 Huang et al.
(Continued)

OTHER PUBLICATIONS

Wickens et al., "Magnetoelectric materials for miniature, wireless neural stimualation at therapeutic frequencies". (Year: 2018).*
(Continued)

*Primary Examiner* — George R Evanisko
(74) *Attorney, Agent, or Firm* — pH IP Law

(57) ABSTRACT

The disclosure describes new apparatus, systems and methods utilizing magnetoelectric neural stimulators with tunable amplitude and waveform. Specific embodiments of the present disclosure include a magnetoelectric film, a magnetic field generator and an electrical circuit coupled to the magnetoelectric film, in particular embodiments, the electrical circuit comprises components configured modify an electrical output signal produced by the magnetoelectric film. In certain embodiments, the electrical circuit is configured to modify the electric signal to charge a charge storage element, to transmit data to an implantable wireless neural stimulator, and to provide a stimulation output to electrodes.

19 Claims, 30 Drawing Sheets

(51) Int. Cl.
  *H10N 35/00*  (2023.01)
  *H10N 35/80*  (2023.01)
  *H10N 35/85*  (2023.01)

(56) References Cited

U.S. PATENT DOCUMENTS

| | | | |
|---|---|---|---|
| 2009/0062886 A1* | 3/2009 | O'Handley | A61N 2/006 607/51 |
| 2011/0125203 A1 | 5/2011 | Simon et al. | |
| 2013/0289913 A1 | 10/2013 | Jahns et al. | |
| 2014/0277268 A1 | 9/2014 | Lee | |
| 2015/0082919 A1 | 3/2015 | Higashi et al. | |
| 2016/0270927 A1 | 9/2016 | Zellmer et al. | |
| 2018/0053890 A1 | 2/2018 | Kang et al. | |
| 2018/0085593 A1 | 3/2018 | Fayram et al. | |
| 2018/0093099 A1 | 4/2018 | Cogan et al. | |
| 2018/0231621 A1 | 8/2018 | Higashi et al. | |

OTHER PUBLICATIONS

Bayrashev et al., "Low frequency wireless powering of microsystems using piezoelectric-magnetostrictive laminate composites," *Sensors and Actuators*, 114(2-3):244-249, 2004.

Bayrashev et al., "Low frequency wireless powering of microsystems using piezoelectric-magnetostrictive laminate composites," *Transducers, The 12th International Conference on Solid State Sensors, Actuators and Microsystems*, pp. 1707-1710, 2003.

Extended European Search Report issued in European Application No. 20784948.0, mailed Nov. 15, 2022.

Fernando et al., "An embedded wireless neural stimulation and recording system," Conference on Neural Engineering, 2007.

Jin et al., "Multiferroic polymer composites with greatly enhanced magnetoelectric effect under a low magnetic bias," *Adv. Mater.*, 23:3853-3858, 2011.

Kambale et al., "Magnetoelectric properties and magentomechanical energy harvesting from stray vibration and electromagnetic wave by $Pb(Mg_{1/3}Nb_{2/3})O_3$—$Pb(Zr,Ti)O_3$ single crystal/Ni cantilever," *Journal of Applied Physics*, 113(20):204108, 2013.

Kopaei et al., "A novel hybrid approach for wireless powering of biomedical implants," *Intelligent Sensors*, 455-460, 2013.

Martins et al., "Polymer-based magnetoelectric materials," *Adv. Funct. Mater.*, 23:3371-3385, 2013.

PCT International Search Report and Written Opinion issued in International Application No. PCT/US2020/026688, mailed Aug. 12, 2020.

Pietronave et al., "Monophasic and biphasic electrical stimulation induces a precardiac differentiation in progenitor cells isolated from human heart," *Stem Cells and Development*, 23(8):888-898, 2014.

Ribeiro et al., "Proving the suitability of magnetoelectric stimuli for tissue engineering applications," *Colloids and Surfaces B: Biointerfaces*, 140:430-436, 2016.

Wickens et al., "Magnetoelectric materials for miniature, wireless neural stimulation at therapeutic frequencies," bioRxiv, 2018.

Yue et al., "Magneto-electric nano-particles for non-invasive brain stimulation," *PLoS ONE*, 7(9):e44040, 2012.

Office Action for European Application No. 24160436.2, dated May 14, 2025, 6 Pages.

Office Action for European Application No. 24160440.4, dated May 14, 2025, 6 Pages.

* cited by examiner

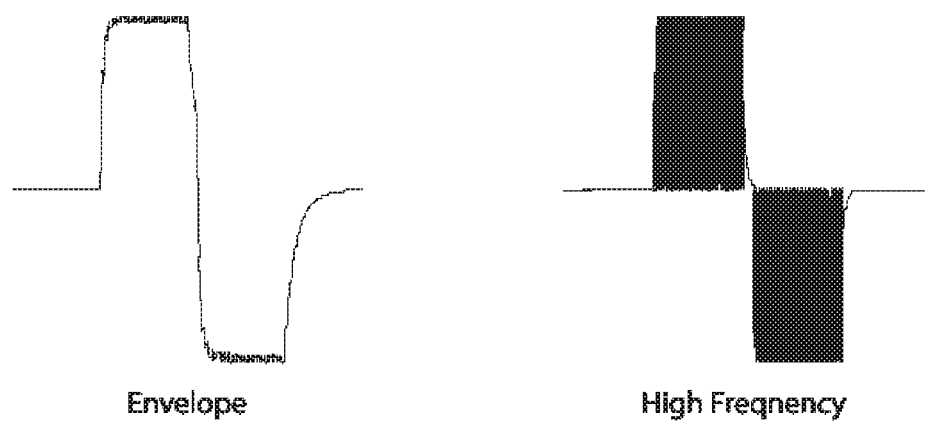
FIG. 2

A) Monophasic Film Circuit (High Frequency)
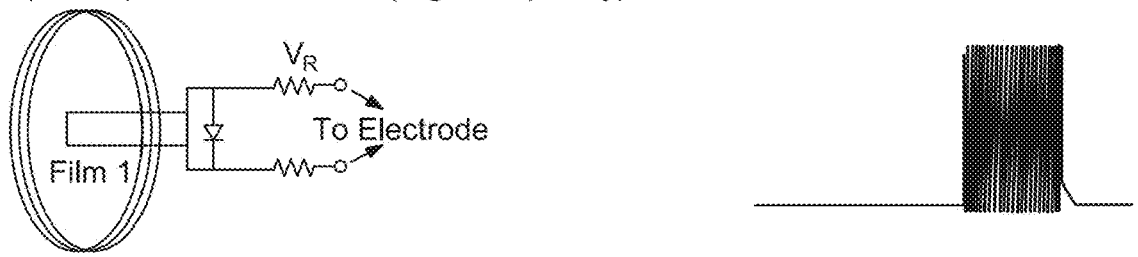
B) Monophasic Film Circuit (Low Frequency Envelope)
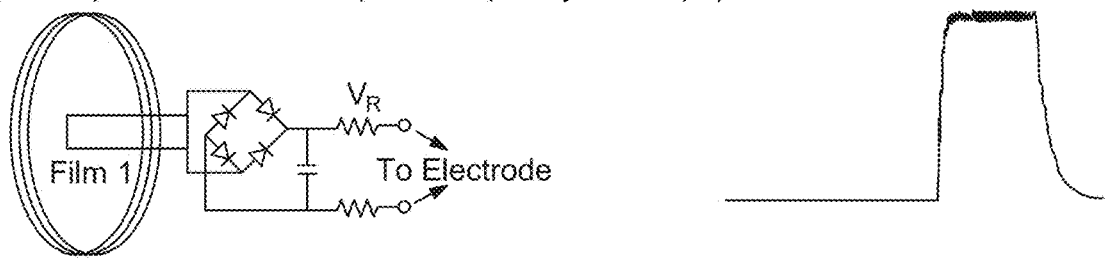
C) Biphasic Film Circuit (High Frequency)
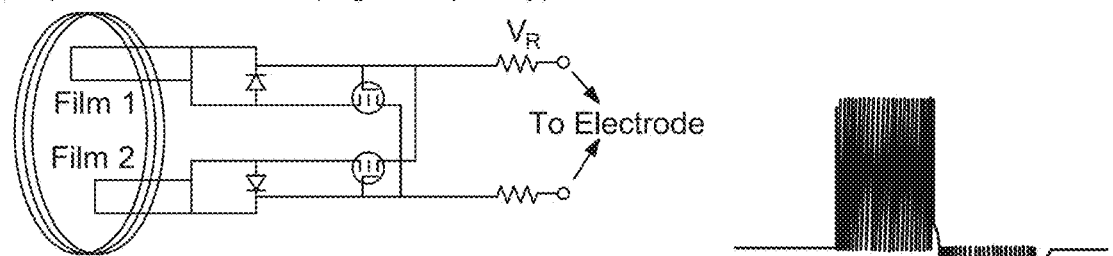
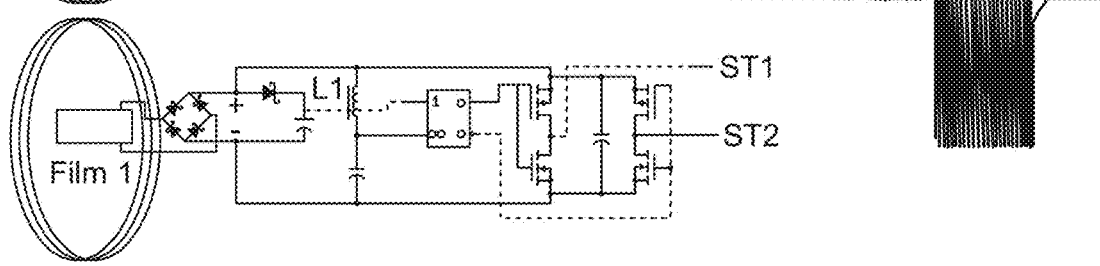
D) Biphasic Film Circuit (Low Frequency Envelope)
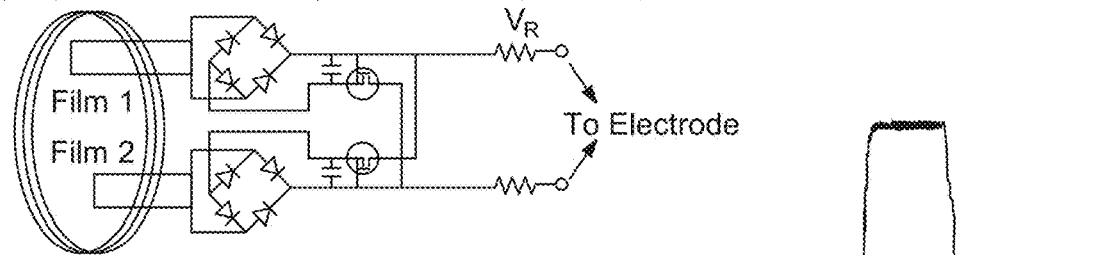
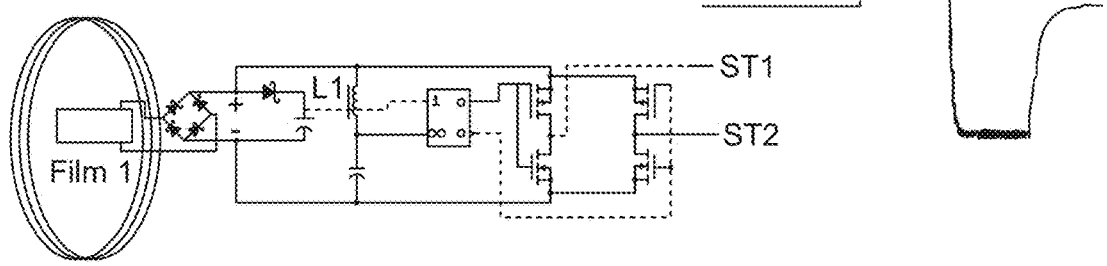
FIG. 3

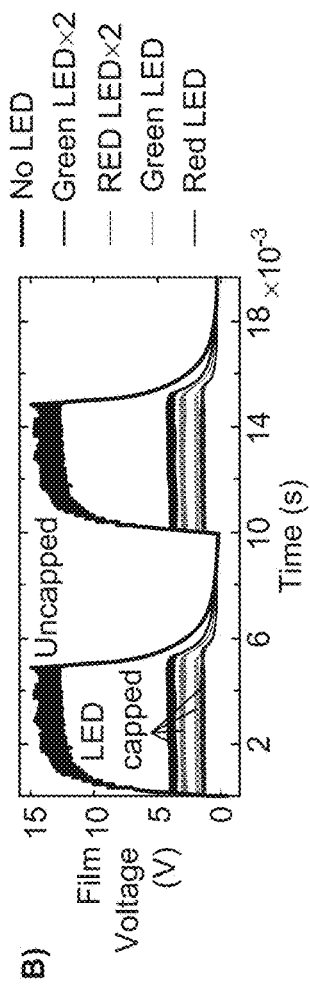
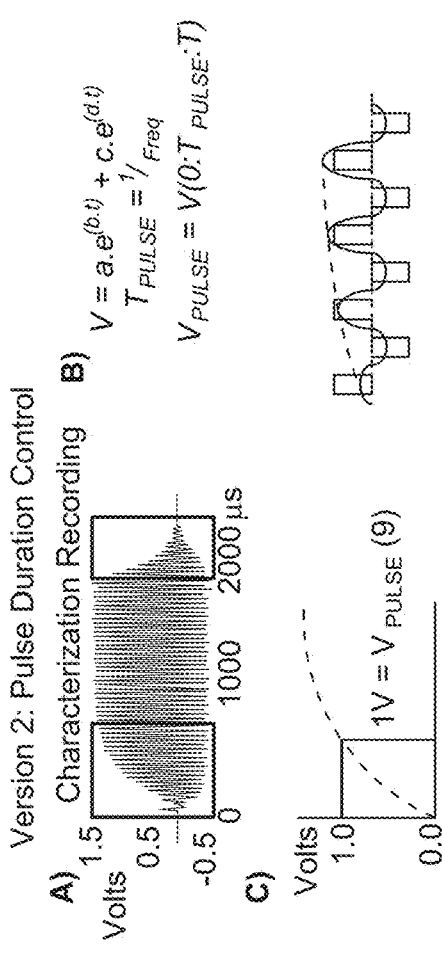
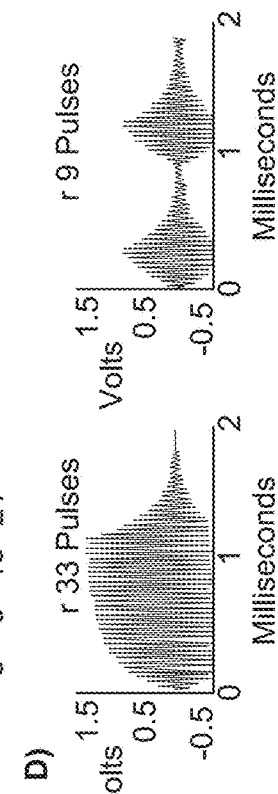
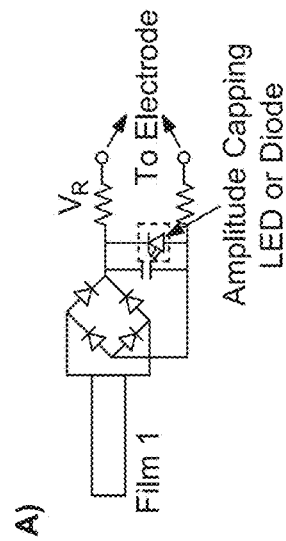
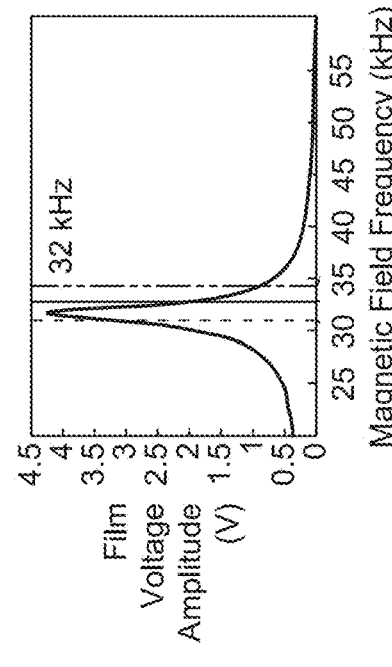
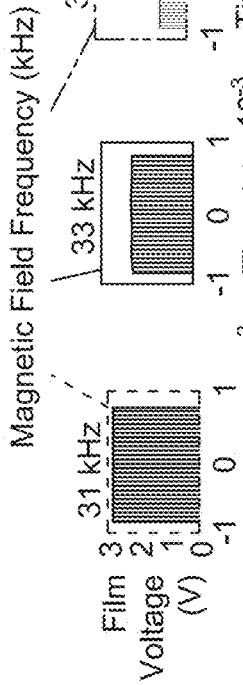
FIG. 4

| Material | Compatible Process | Temperature | Notes |
|---|---|---|---|
| *Hard Materials* | | | |
| Silicon Carbide | PECVD | 150 | Good moisture barrier |
| Al2O3 | ALD | 120 | Good moisture barrier |
| Medical Grade Epoxy | Liquid Resin Cure | 65 | Good moisture barrier, used readily in potting electronics |
| *Soft Materials* | | | |
| PDMS | Liquid Resin Cure | 80 | Permeable to water diffusion, but good ion barrier |
| Parylene C | Chemical Vapor Deposition | 25 | Permeable to water diffusion, but good ion barrier |
| Liquid Crystal Polymer | Thermal Press Bonding | 285 | Soft material, lower moisture absorption than polyimide and parylene-C, could potentially avoid heating film during thermal press |
| Polyimide | Liquid Resin Cure | 350 | Good moisture barrier, potential uneven coatings |
| Polyisobutylene | Liquid Resin Cure | 70 | Good moisture barrier |

FIG. 30

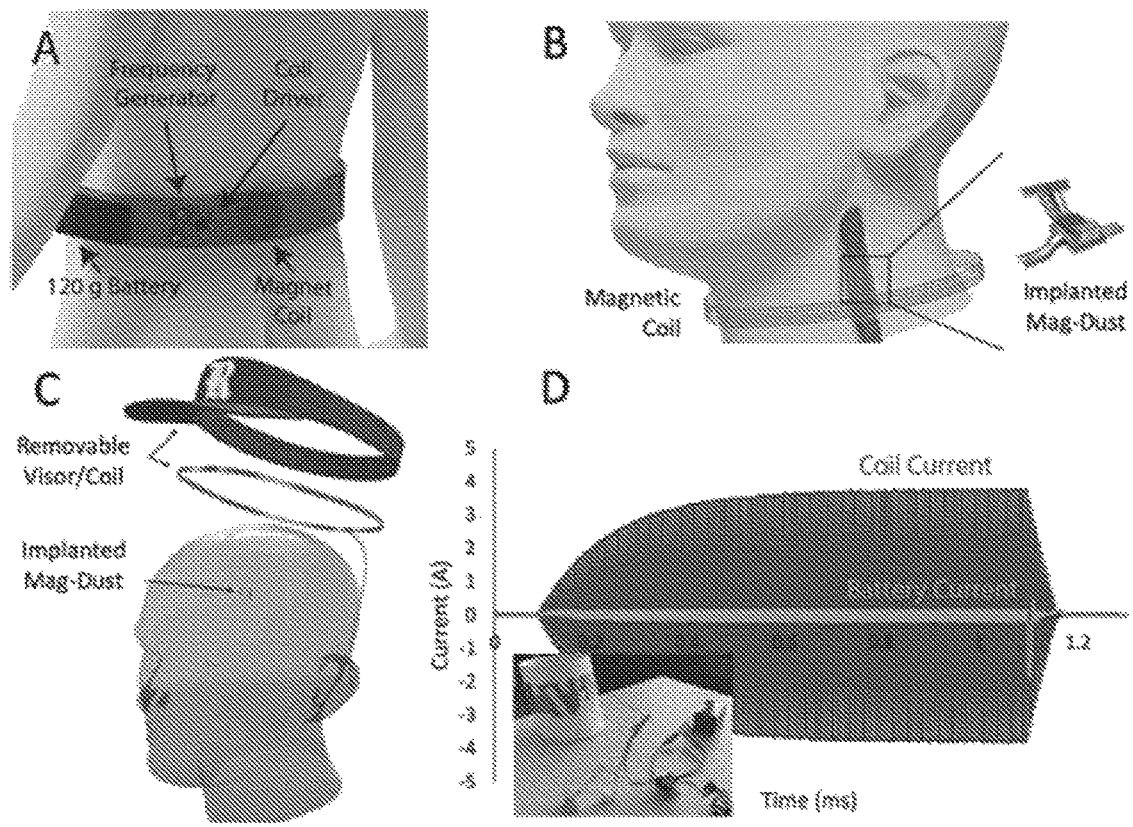

FIG. 31

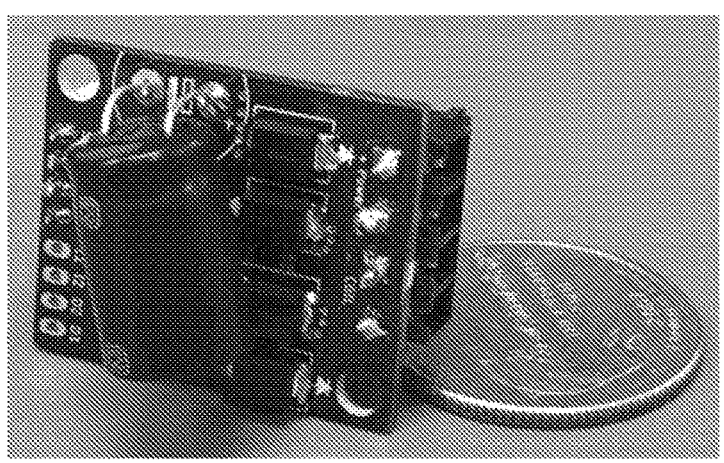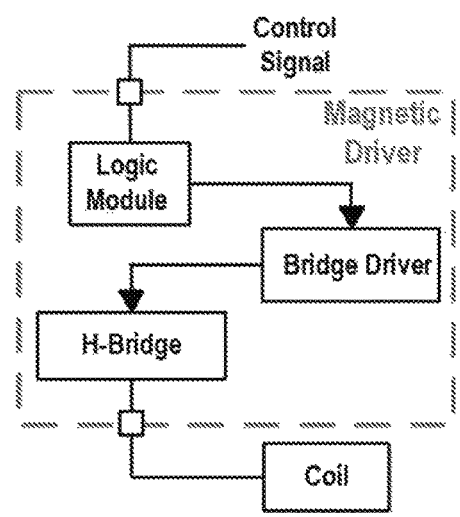
FIG. 40

MAGNETOELECTRIC DATA AND POWER TO MINIATURE BIODEVICES WITH TUNABLE AMPLITUDE AND WAVEFORM

CROSS-REFERENCE TO RELATED APPLICATIONS

This application is a national phase application under 35 U.S.C. § 371 of International Application No. PCT/US2020/026688, filed Apr. 3, 2020, which claims priority to U.S. Provisional Patent Application Ser. No. 62/830,089 filed Apr. 5, 2019 and to U.S. Provisional Patent Application Ser. No. 62/976,051 filed Feb. 13, 2020, the entire contents of each of which are incorporated herein by reference.

This invention was made with government support under grant number DGE 1250104 awarded by National Science Foundation. The government has certain rights in the invention.

BACKGROUND

A. Field

This disclosure relates to apparatus and methods utilizing magnetoelectric neural stimulators with tunable amplitude and waveform. In particular, this disclosure relates to apparatus and methods configured to charge a charge storage element, transmit data to an implantable wireless neural stimulator and provide a stimulation output.

B. Related Art

The successful implementation of implanted powered devices poses numerous challenges. For example, a fundamental issue for bioelectronics is the ability to deliver power to miniature devices inside the body. Wires provide efficient power transmission, but are common failure points and limit device placement. Wireless power by electromagnetic or ultrasound waves must also overcome obstacles. For example, wireless power by electromagnetic or ultrasound waves must overcome absorption by the body and impedance mismatches between air, bone, and tissue. Conventional methods to wirelessly power neural implants in deep tissue regions of freely moving animals or humans are also usually bulky due to large electromagnetic coils or battery packs with external leads. In addition, the ability to provide magnetoelectric charging, data transmission and stimulation to an implantable wireless neural stimulator is not provided in existing systems.

Accordingly, a need exists to address these issues, as well as others, for the effective implementation of implanted powered devices.

SUMMARY

Briefly, the present disclosure provides systems that transmit data to an implanted neural stimulation device with a magnetic field. In certain embodiments, the implanted device includes an electrical circuit that extracts timing and voltage reference from the magnetic field to perform reliable and calibration-free data transmission. In particular embodiments, the circuit transitions between different operation modes (power transfer, data transfer, stimulation) by monitoring the envelop of the magnetic field, which can be more reliable and energy efficient than some conventional methods.

In addition, the present disclosure provides apparatus, systems, and methods that utilize magnetic fields, which suffer little absorption by the body or differences in impedance at interfaces between air, bone, and tissue. These advantages have led to magnetically-powered stimulators based on induction or magnetothermal effects. However, fundamental limitations in these power transfer technologies have prevented miniature magnetically-powered stimulators from applications in many therapies and disease models because they do not operate in clinical "high-frequency" ranges above 20 Hz.

Exemplary embodiments of the present disclosure utilize magnetoelectric materials that provide miniature energy harvesting from magnetic fields for neural stimulation or to power electronic devices. Exemplary embodiments rely on an alternating magnetic field produced by a magnetic field driver that modulates a high frequency (e.g. 20-500 KHz) magnetic field delivered by an electromagnetic coil. This magnetic field is at or near the resonant frequency of a magnetoelectric film, which can typically be placed several centimeters from away from the coil. The film (a laminate of piezoelectric and magnetoelectric materials) can transform the magnetic field into a high frequency, high voltage electrical signal. Exemplary embodiments attach circuit elements to the film to alter the voltage waveform (e.g. to rectify and cap the voltage and current to a stable level for the desired application). In specific exemplary embodiments, the electric field from the film can be used to directly stimulate excitable cells in vitro, the film can be coupled to electrodes implanted in vivo for stimulation in freely moving subjects.

Magnetoelectric devices, powered remotely using a magnetic field can deliver a specific electrical signal in a small device package size. This miniaturization is key to make devices wearable and to target difficult to reach areas of the body including deep brain areas and the periphery. Additionally, wireless stimulators help to avoid some of the major failure modes of neural stimulators like lead migration and contact failure. An additional advantage is that the pattern of stimulation can be selected by an externally controlled magnetic field driver to create specifically timed pulses of specific frequencies of alternating magnetic field. Additional uses of this magnetoelectric voltage control could be to power neural implants in the central or peripheral nervous system for recording physiological variables in addition to electrical stimulation.

Specific embodiments include four different waveforms that can be useful for stimulating neural tissue depending on the desired application. The various waveforms are created by using the right number of films and the circuitry attached to them as well as properly slowly modulating the frequency or frequencies of the magnetic field. The waveforms include: (1) high frequency monophasic (single film); (2) envelope monophasic (single film); (3) high frequency biphasic (double film); and (4) envelope Biphasic (double film or single film).

Exemplary embodiments of the present disclosure can generate a variety of therapeutic neural stimuli by incorporating the appropriate magnetoelectric film, circuit elements and waveform of the magnetic field generator. For example, the natural resonant frequency of the film may not produce a physiological response, but exemplary embodiments of the present disclosure can create biphasic lower frequency pulses within a therapeutic range. Exemplary embodiments can also pulse the magnetic field and therefore generate voltage pulses that can directly modulate cellular activity using the high frequency resonances. Aspects of the present disclosure may accomplish this with one film for a monophasic voltage or two films for a biphasic voltage signal.

Additionally, typical voltages reported from magnetoelectric films are generally only a few volts at maximum, which means the voltage falls off quickly with the angle of the films and with distance from the magnet. These low voltages are due to the weak strength of alternating magnetic fields used to generate the magnetoelectric voltages. At such high frequencies these stronger magnetic fields are difficult to create without high voltage (approximately kV range) power sources. Exemplary embodiments of this disclosure employ a custom designed magnetic field driver to generate higher strength magnetic fields using a small system that requires only tens of volts and can plug into a typical power outlet. This configuration can generate maximum voltages greater than 50V. In order to stabilize this stimulation an LED or a zener diode can be used. This effectively caps the voltage at a chosen value, usually 1-6V depending on the application. Accordingly, exemplary embodiments can stably output a given voltage even with variations in distance and angle.

While power efficiency is lower than some competing technologies, the tissue absorption is much lower than other wireless power schemes allowing the ability to safely power devices deep into tissue. The efficiency of power transfer is angle dependent so the driver coil and device should be aligned for maximum efficiency.

Examples disclosed herein include relatively straightforward geometry of magnetoelectric materials. Other embodiments may include different shapes or structures of magnetoelectric devices as well as using different materials for the magnetostrictive and piezoelectric components. Certain embodiments could also include in the film, magnetic elements to bias film to increase sensitivity. Embodiments could also include films that naturally rectify the voltage waveform. In certain embodiments, the bias magnetic field can be either incorporated into either the film or the alternating field circuitry. Specific embodiments could include a system in miniature form that would be completely implantable in a moving subject.

Miniaturized wireless bioelectronic implants can provide powerful capabilities to accelerate basic biological research and improve clinical therapies for human disorders. By virtue of their small size and wireless interface, these tiny devices have the potential to provide less invasive, longer lasting interfaces to tissue like the brain or peripheral nerves. One of the fundamental challenges in developing theses implanted bioelectronics is wireless power and data transfer (WPDT) to devices inside the body. Existing technologies based on radio-frequency electromagnetic fields, ultrasonic waves, inductive coupling, and magnetothermal effects cannot satisfy all the desired properties of a safe, reliable, stable, and efficient WPDT scheme. To overcome these challenges, the inventors propose to design and integrate magnetoelectric (ME) materials with CMOS chips to create the first WPDT technology based on the magnetoelectric effect. This proposed magnetoelectric "smart dust" technology (sometimes referred to herein as "Mag-Dust" or "MagMote") will enable many scientific and medical applications, by simultaneously overcoming three challenges facing miniature bioelectronic implants: low absorption and reflection by tissue and bone; stable performance despite changing angles with and distance to the transmitter; and wearable power/data transmitters.

Exemplary embodiments of the present disclosure incorporate magnetoelectric (ME) wireless power and data transfer technology for miniature and highly integrated bioelectronic implants. Exemplary embodiments of the present disclosure can make significant advancements in three technical areas: (1) new fabrication strategies for producing miniaturized high-efficiency ME transducers for wireless power and data transfer to implanted devices; (2) novel low-power CMOS circuit and system designs for Mag-Dusts, aiming at enhanced power efficiency and robustness, reduced calibration efforts, and improved fabrication yield; (3) a proof-of-principle 1 millimeter cubic programmable ME-enabled wireless peripheral nerve stimulator. This work will also produce integration strategies to achieve high bio-compatibility, long-term stability and safety, evaluated with in vitro and accelerated aging tests. In addition, the inventors will demonstrate a battery-powered and portable magnetic field transmitter to drive and program the Mag-Dusts.

Exemplary embodiments of the present disclosure can have a broad impact on miniaturized bioelectronic implants. Specifically, exemplary embodiments can overcome the fundamental challenge of safe, reliable, and efficient wireless power and data transfer to deeply implanted miniature devices, paving the way towards minimally invasive and long-lasting interface technologies for chronic neural stimulation, recording, drug delivery, physiological monitoring, and so on. These technologies are expected to benefit a multitude of transformative and far-reaching scientific and medical applications in understanding neural systems (especially long-term and social behaviors), treating disorders, and relieving pains.

Bioelectronic implants provide powerful capabilities to accelerate basic neuroscience re-search and improve clinical therapies for human disorders. Common applications include electrical and optical stimulation and inhibition, and measurement of neural and physiological signals. Conventional battery-powered implants are often too bulky to be implanted directly at the target site, and the use of wires to connect a battery pack to sensors/stimulators is a common failure point for bioelectronic devices. In clinical applications, lead wires present a pathway for infection [1], and limit the ability of the stimulators to move with the tissue, leading to a foreign body response or loss of contact with the target tissue [2, 3]. In scientific experiments using small animals, wires or heavy batteries can restrict natural behaviors, particularly when studying social interaction between multiple animals [4]. Therefore, technologies to miniaturize and untether implants are critical in building the next-generation minimally invasive, high-spatial-resolution, and long-lasting bioelectronic interfaces to tissues particularly in the central and peripheral nervous system. These miniature wireless bioelectronic implants have the potential to enable and advance a plethora of transformative clinical and scientific applications.

One of the fundamental challenges in developing miniature wireless implanted bioelectronics is to safely and reliably deliver power and data to miniature devices in-side the body. Efficient wireless power and data transfer by electromagnetics (EM) to implantable mm-sized receivers necessitates EM waves at GHz radio frequencies. At these frequencies, EM radiation is significantly absorbed by the body. As a result, there are strict limits to the amount of power that can be safely delivered [5] and the volume of implants [6-8]. Ultrasonic waves suffer less tissue absorption but are significantly reflected (attenuated) by acoustic impedance mismatch between air, bone, and tissue, making it difficult to deliver enough energy through the air or through bones like the skull. Optical power transfer is an alternative approach to get rid of the bulky receivers [9], but it also suffers from limited penetration depth and tissue heating issues. Magnetic fields, on the other hand, suffer little absorption by the body and energy loss due to reflections [10-12]. These advantages have led to magnetically-powered implants based on inductive coupling or magneto-thermal effects. While inductive coupling is a well-developed technology for power transfer in consumer electronics, the diameter of the receiving coil is restricted. Reducing the coil's diameter to less than 9 mm will significantly reduce the received power and make it more sensitive to the distance and alignment between transmitters and receivers [13, 14]. Lastly, recently demonstrated magnetothermal stimulation eliminates the receiver size concerns, but is not suitable for many therapies and disease models because they do not operate in clinical "high-frequency" ranges above 20 Hz [15, 16]. Moreover, the required >20 mT magnetic field strengths cannot be easily produced by a portable generator, which limits the ability to use this technology for chronic neuromodulation of freely moving patients or animals In summary, an ideal wireless power and data transfer technology should possess the following properties: (1) low absorption and reflection by bodies to safely de-liver enough energy to implants; (2) regulated and reliable wireless power and data transfer; and (3) battery-operated and portable transmitters to enable biomedical applications that require chronic use.

To overcome these fundamental challenges, the inventors propose Mag-Dust, a transformative approach to create the first miniature wireless bioelectronic implants that combine magnetoelectric (ME) materials with CMOS ASICs. By coupling magnetostrictive and piezoelectric effects in nano-fabricated ME transducers, low-frequency (100 kHz to 10 MHz) alternating (AC) magnetic fields can be efficiently converted to alternating electric potentials, enabling wireless power and data transfer with advantages including the fact that low-frequency magnetic fields are not absorbed by the body so that it can efficiently deliver power to deeply implanted devices. Preliminary results have confirmed ME effects more than eight centimeters beneath bone and tissue under 1 mT magnetic fields [17]. In addition, ME technology will miniaturize implanted devices without significant reduction in the voltage produced by the transducers, because acoustic resonance has 105 times shorter wavelength than electro-magnetic resonance at the same frequency. Furthermore, ME transducers with high voltage conversion efficiency can potentially be driven by portable, lightweight, and battery-powered magnetic field generators, paving the way towards new paradigms of chronic and non-restrictive neural modulation and recording systems for long-term scientific studies of free-moving rodent models and future wearable point-of-care disorder treatment and pain relief devices Based on ME-enabled wireless power and data transfer technology, exemplary embodiments of the present disclosure include a fully-integrated proof-of-concept millimeter-sized Mag-Dust neural stimulator. In the design and fabrication of the ME transducer, fabrication techniques can be employed to create mm-scale ME transducers for wireless power and data transfer, based on polyvinylidene difluoride (PVDF) or lead zirconate titanate (PZT), and magnetostrictive alloys (Metglas). Additional embodiments may include enhancement of miniaturized ME transducer's efficiency by adding a magnetic bias. For the CMOS circuit and system design for Mag-Dusts, CMOS circuits and systems can be employed to interface with ME films, enabling regulated power supplies, calibration-free and robust data transfer, and programmable stimulation. Exemplary embodiments include a millimeter-sized neural stimulator through biocompatible integration of ME transducers and CMOS chips. In vitro tests can be performed to evaluate the functionality and long-term stability of exemplary embodiments in aqueous solutions that approximate the conditions inside the body.

Exemplary embodiments of the present disclosure include a magnetoelectric (ME) wireless power and data transfer technology for miniaturized and highly integrated bioelectronics implants. Exemplary embodiments comprise low-power CMOS circuit and system designs for enhanced power efficiency and robustness, reduced calibration efforts, and improved fabrication yield. In addition, exemplary circuit techniques provide low-power energy harvester and voltage/current/timing references. Exemplary embodiments include a device configured as a 1 mm$^3$ programmable wireless neural stimulator. Integration strategies will be studied for bio-compatibility and safety, which will be evaluated with accelerated aging and in vitro tests. Exemplary embodiments also include a battery-powered and wearable 1 mT magnetic field transmitter to program and sustain biphasic stimulations of the proposed Mag-Dust stimulator, covering a wide range of therapeutic-relevant stimulation patterns (0-200 Hz frequency, 30-1500 µA amplitude, and 50-1000 µs pulse width).

Exemplary embodiments of the present disclosure demonstrate that magnetoelectric materials—applied for the first time in bioelectronics devices—enable miniature magnetically-powered neural stimulators that operate at clinically relevant high-frequencies. As one example, it is shown that ME neural stimulators can effectively treat the symptoms of a Parkinson's disease model in a freely behaving rodent. The inventors also show that ME-powered devices can be miniaturized to sizes smaller than a grain of rice while maintaining effective stimulation voltages. These results suggest that ME materials are an excellent candidate for wireless power delivery that will enable miniature neural stimulators in both clinical and research applications.

Wireless neural stimulators have the potential to provide less invasive, longer lasting interfaces to brain regions and peripheral nerves compared to battery-powered devices or wired stimulators. Indeed, wires are a common failure point for bioelectronic devices. Percutaneous wires present a pathway for infection [1] and implanted wires can also limit the ability of the stimulators to move with the tissue, leading to a foreign body response or loss of contact with the target tissue [2,3]. Additionally, chronic stress and strain on wires, particularly for devices in the periphery, can lead to failure in the wire itself or its connection to the stimulator [4]. In small animals like rats and mice, wires used to power neural stimulators can interfere with natural behavior, particularly when studying social interaction between multiple animals [5].

Certain embodiments include an apparatus comprising: a magnetic field generator and an implantable wireless neural stimulator, where the implantable wireless neural stimulator comprises: a magnetoelectric film; a first electrode coupled to the magnetoelectric film; a second electrode coupled to the magnetoelectric film; an electrical circuit coupled to the magnetoelectric film; a third electrode coupled to the electrical circuit; and a fourth electrode coupled to the electrical circuit. In particular embodiments, the electrical circuit comprises a charge storage element; the magnetic field generator is configured to generate a magnetic field at an input frequency; the magnetoelectric film is configured to produce an electrical signal when the magnetoelectric film is stimulated by the magnetic field at the input frequency; the electrical circuit is configured to modify the electric signal to charge the charge storage element; the electrical circuit is configured to modify the electric signal to transmit data to the implantable wireless neural stimulator; and the electrical circuit is configured to modify the electric signal to provide a stimulation output to the third electrode and the fourth electrode.

In some embodiments the electrical circuit is configured to modify the electric signal to transmit data from the implantable wireless neural stimulator. In particular embodiments the electrical circuit is formed on a complementary metal-oxide-semiconductor (CMOS) chip. In specific embodiments the charge storage element is a capacitor. In certain embodiments the electrical circuit comprises a charging module, a data module, and a stimulation driver module. In particular embodiments the charging module is configured to provide power management and charging of the charge storage element. In some embodiments the data module is configured to provide data transfer to the implantable wireless neural stimulator. In specific embodiments the stimulation driver module is configured to provide the stimulation output to the third electrode and to the fourth electrode. In certain embodiments the charging module comprises a rectifier and a reference generator. In particular embodiments the electrical circuit is configured to modify the electric signal to transmit data to the implantable wireless neural stimulator data transfer by performing amplitude shift keying (ASK) modulation of the magnetic field. In some embodiments the magnetoelectric film comprises a central portion, and the electrical circuit is coupled to the central portion of the magnetoelectric film.

In certain embodiments the magnetoelectric film has a resonant frequency, and the input frequency is within ten percent of the resonant frequency of the magnetoelectric film. In particular embodiments the magnetic field generator is configured to generate a series of pulses of a magnetic field. In certain embodiments each pulse in the series of pulses has a duration of approximately 1 millisecond (ms). In particular embodiments the electrical signal has an output voltage, and an amplitude of the output voltage can be controlled by changing the duration of pulses in the series of pulses. In some embodiments the electrical signal has an output voltage, and an amplitude of the output voltage can be controlled by varying a total number of pulses in the series of pulses. In specific embodiments the electrical signal is a monophasic output signal. In certain embodiments the electrical signal is a biphasic output signal. In particular embodiments the magnetoelectric film comprises a magnetostrictive layer and a piezoelectric layer. In some embodiments the magnetoelectric film comprises a polyvinylidene fluoride (PVDF) layer. In specific embodiments the magnetoelectric film comprises a lead zirconate titanate (PZT) layer.

In certain embodiments the input frequency is between 20-500 kilohertz (kHz), and in particular embodiments the output signal stimulates a biological tissue. In some embodiments the output signal powers an electronic device. In specific embodiments the magnetoelectric film is a first magnetoelectric film and the apparatus further comprises a second magnetoelectric film. In certain embodiments the magnetic field generator comprises an electromagnet. In particular embodiments the magnetic field generator comprises a permanent magnet. In some embodiments the third electrode and the fourth electrode are configured as a stereotrode. In specific embodiments the magnetoelectric film comprises: a first end, a second end, a central point equidistant between the first end and the second end, and a length extending between the first end and the second end; the central portion comprises ten percent of the length of the magnetoelectric film; and the central point is located in the center of the central portion of the magnetoelectric film. In certain embodiments the magnetic field generator configured to generate a magnetic field at an input frequency within five percent of the resonant frequency of the magnetoelectric film.

Particular embodiments include a method of generating a magnetic field with the magnetic field generator, where the method comprises: providing an apparatus as disclosed herein; producing an electrical signal with the magnetoelectric film; and modifying the electrical signal with the electrical circuit. In certain embodiments modifying the electrical signal with the electrical circuit comprises: modifying the electric signal to charge the charge storage element; modifying the electric signal to transmit data to the implantable wireless neural stimulator; and modifying the electric signal to provide the stimulation output to the third electrode and the fourth electrode. Particular embodiments further comprise stimulating neural tissue with the modified electrical signal. Some embodiments further comprise powering a device with the modified electrical signal.

Certain embodiments include an implantable apparatus comprising: a magnetoelectric film; a magnetic field generator configured to generate a magnetic field at an input frequency between 20-500 kHz; and an electrical circuit coupled to the magnetoelectric film. In particular embodiments, the magnetoelectric film is configured to produce an electrical output signal when the magnetoelectric film is stimulated by the magnetic field at the input frequency, and the electrical circuit comprises electric components configured to modify the electrical output signal such that the electrical output signal has an output frequency between 0.5-1000 Hz.

In specific embodiments, the magnetoelectric film comprises a central portion, and the electrical circuit is coupled to the central portion of the magnetoelectric film. In some embodiments, the magnetoelectric film has a resonant frequency, and the input frequency is within ten percent of the resonant frequency of the magnetoelectric film.

In certain embodiments, the magnetic field generator is configured to generate a series of pulses of a magnetic field. In particular embodiments, each pulse in the series of pulses has a duration of approximately 1 millisecond (ms). In some embodiments, the electrical output signal has an output voltage, and an amplitude of the output voltage can be controlled by changing the duration of pulses in the series of pulses. In specific embodiments, the electrical output signal has an output voltage, and an amplitude of the output voltage can be controlled by varying a total number of pulses in the series of pulses. In certain embodiments, the electrical output signal is a monophasic output signal. In particular embodiments, the electrical output signal is a biphasic output signal. In some embodiments, the magnetoelectric film comprises a magnetostrictive layer and a piezoelectric layer. In specific embodiments, the magnetoelectric film comprises a polyvinylidene fluoride (PVDF) layer. In certain embodiments, the magnetoelectric film comprises a lead zirconate titanate (PZT) layer. In some embodiments, the input frequency is between 20-500 kilohertz (kHz). In particular embodiments, the output signal stimulates a biological tissue. In specific embodiments, the output signal powers an electronic device.

In certain embodiments, the magnetoelectric film is a first magnetoelectric film and wherein the apparatus further comprises a second magnetoelectric film. In particular embodiments, the magnetic field generator comprises an electromagnet. In some embodiments, the magnetic field generator comprises a permanent magnet. In specific embodiments, the electrical components comprise a full wave rectifier and a transistor. In certain embodiments, the electrical components comprise a diode and a capacitor. In particular embodiments, the apparatus further comprises a stereotrode and wherein the electrical output signal is transmitted through the stereotrode. In some embodiments: the magnetoelectric film comprises a first end, a second end, a central point equidistant between the first end and the second end, and a length extending between the first end and the second end; the central portion comprises ten percent of the length of the magnetoelectric film; and the central point is located in the center of the central portion of the magnetoelectric film. In specific embodiments, the magnetic field generator configured to generate a magnetic field at an input frequency within five percent of the resonant frequency of the magnetoelectric film.

Certain embodiments include an implantable apparatus comprising: a magnetoelectric film; and a magnetic field generator configured to generate a magnetic field at an input frequency between 20-500 kHz. In particular embodiments, the magnetoelectric film is a self-rectifying film; and the magnetoelectric film that is configured produce an electrical output signal with an output frequency between 0.5-1000 Hz when the magnetoelectric film is stimulated by the magnetic field at the input frequency. In particular embodiments, the magnetoelectric film comprises zinc oxide (ZnO). In some embodiments, the magnetoelectric film comprises a polyvinylidene fluoride (PVDF) layer doped with zinc oxide (ZnO) nanoparticles. In specific embodiments, the magnetoelectric film has a resonant frequency, and the input frequency is within ten percent of the resonant frequency of the magnetoelectric film. In certain embodiments, the resonant frequency of the magnetoelectric film is between 65 and 75 kilohertz (kHz). In particular embodiments, the magnetic field generator is configured to generate a series of pulses of a magnetic field. In some embodiments, each pulse in the series of pulses has a duration of approximately 1 millisecond (ms). In specific embodiments, the electrical output signal has an output voltage, and an amplitude of the output voltage can be controlled by changing the duration of pulses in the series of pulses.

In certain embodiments, the electrical output signal has an output voltage, and an amplitude of the output voltage can be controlled by varying a total number of pulses in the series of pulses. In particular embodiments, the electrical output signal is a monophasic output signal. In some embodiments, the electrical output signal is a biphasic output signal. In specific embodiments, the magnetoelectric film comprises a magnetostrictive layer and a piezoelectric layer. In certain embodiments, the magnetoelectric film comprises a polyvinylidene fluoride (PVDF) layer. In particular embodiments, the input frequency is between 20-300 kilohertz (kHz). In some embodiments, the output signal stimulates a biological tissue. In specific embodiments, the output signal powers an electronic device. In certain embodiments, the magnetoelectric film is a first magnetoelectric film and wherein the apparatus further comprises a second magnetoelectric film. In particular embodiments, the magnetic field generator comprises an electromagnet. In some embodiments, the magnetic field generator comprises a permanent magnet. In specific embodiments, the apparatus further comprises a stereotrode and wherein the electrical output signal is transmitted through the stereotrode.

Certain embodiments include a method of stimulating neural tissue, where the method comprises: providing an apparatus as disclosed herein; generating a magnetic field with the magnetic field generator; producing an electrical output signal with the magnetoelectric film; and modifying the electrical output signal with the electrical circuit. Particular embodiments further comprise stimulating neural tissue with the modified electrical output signal. Some embodiments further comprise powering a device with the modified electrical output signal.

Certain embodiments include a method of stimulating neural tissue, where the method comprises: providing an apparatus as disclosed herein; generating a magnetic field with the magnetic field generator; and producing an electrical output signal with the magnetoelectric film. Particular embodiments further comprise stimulating neural tissue with the electrical output signal. Some embodiments further comprise powering a device with the electrical output signal.

Certain embodiments include an implantable apparatus comprising: a magnetoelectric film; a magnetic field generator configured to generate a magnetic field at an input frequency between 20-500 kHz. In particular embodiments, the magnetoelectric film is configured to produce an electrical output signal with a voltage waveform when the magnetoelectric film is stimulated by the magnetic field at the input frequency; the apparatus comprises an electrical circuit or material to modify the voltage waveform, and the electrical circuit or material comprises electric components configured to modify the electrical output signal such that the electrical output signal has an output frequency between 0.5-1000 Hz. In some embodiments, the material comprises zinc oxide (ZnO) nanorods.

Any embodiment of any of the present methods, composition, kit, and systems may consist of or consist essentially of—rather than comprise/include/contain/have—the described steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

Other objects, features and advantages of the present invention will become apparent from the following detailed description. It should be understood, however, that the detailed description and the specific examples, while indicating certain embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 2 illustrates different waveforms according to exemplary embodiments of the present disclosure.

FIG. 3 illustrates different circuits that can be used to generate different waveforms according to the present disclosure.

FIG. 4 illustrates different aspects of fixed amplitude and tunable amplitude configurations.

FIG. 30 illustrates a table with encapsulation strategies.

FIG. 31 illustrates wearable battery-powered magnetic field transmitters. (A-C) shows concepts for wearable battery-powered magnetic field generator capable of driving an implanted ME neural stimulator; (D) shows preliminary desktop setup showing 1 mT field generated by 3.7 mA current through the coil, with only a 0.2 mA draw on the battery.

FIG. 40 illustrates a portable magnetic field driver and its system diagram.

DETAILED DESCRIPTION OF THE INVENTION

Figure 1:
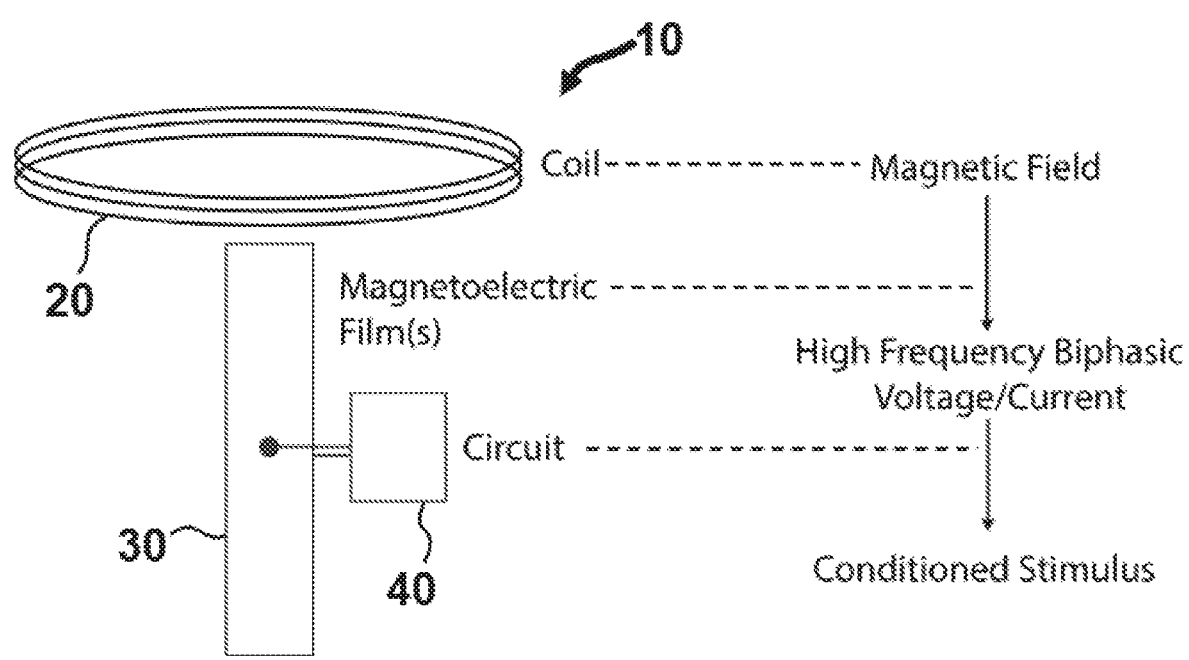
FIG. 1 is a schematic diagram of an apparatus according to an exemplary embodiment of the present disclosure.

Referring now to FIG. 1, a basic schematic diagram illustrates aspects of an apparatus 10 according to the present disclosure. As described in further detail below, exemplary embodiments of the present disclosure can be configured to stimulate neural tissue, power devices that record physiological signals, and/or couple recording and stimulation for closed-loop bioelectronic medicine.

Apparatus 10 comprises a magnetic field generator 20 (shown in this example as a coil), a magnetoelectric (ME) film 30, and an electrical circuit 40 coupled to a central portion of the film 30. Coupling the circuit to the center of the film is important for maximum efficiency and enables a voltage amplitude that can stimulate cells because it minimizes mechanical damping of the ME film resonance.

It is understood that the schematic shown in FIG. 1 is a simplified diagram of embodiments disclosed herein, which are discussed in greater detail below. In general terms, magnetic field generator 20 generates a magnetic field that is converted to a high frequency monophasic or biphasic voltage/current by film 30, which is then converted to a conditioned stimulus by electrical circuit 40.

Apparatus 10 can be configured to control the amplitude and waveform of the conditioned stimulus to achieve stable and effective neural stimulation. In particular electrical circuit 40 can be configured to convert the high-frequency magnetic field into any of the following waveforms shown in FIG. 2. FIG. 2 illustrates a monophasic, high frequency waveform (e.g. created using a diode), a monophasic, low frequency/envelope waveform (e.g. created using a diode and capacitor), a biphasic, high frequency waveform (e.g. created using a circuit and two films), and a biphasic, low frequency/envelope waveform (created using a circuit and two films, or a circuit and one film).

Referring now to FIG. 3, examples of different circuits that can be used to generate different waveforms according to the present disclosure. It is understood the diagrams shown in FIG. 3 are schematic diagrams only, and are not to scale. For example, in certain instances the circuits shown in FIG. 3 are coupled to an end portion of the film(s), while exemplary embodiments include circuits coupled to the central portion of the film. It is also understood the diagrams shown are merely exemplary of the types of circuits that can be utilized to generate the desired waveforms. As shown in FIG. 3, exemplary electrical circuits can comprise rectifiers, diodes, transistors, resistors and other components as needed to produce the desired waveform.

In certain embodiments, the piezoelectric film acts as a capacitor with a capacitance value determined by the size and dielectric constant. The addition of a diode in parallel with the film creates a clamper circuit which biases the high frequency waveform. In the two-film configurations transistors can be added such that circuitry leading to the non-active film is switched off while the active film is providing a signal allowing for the creation of the biphasic waveform. Resistors can be used to limit the current or voltage of the waveform applied to the tissue, as well as provide locations to probe the circuit to test functionality. An LED or zener diode in parallel with the film and diode can be used to cap the film output voltage at the forward bias voltage of the zener diode or LED. A capacitor in parallel with the film can be used the smooth the waveform and create the envelope feature shown in FIG. 2. In addition to using discrete components, an integrated circuit could also be designed to generate the desired waveform, which could also include capacitors for energy storage.

The need to create monophasic or biphasic stimulation depends on which condition is being treated. For example, as shown in panel D of FIG. 6, chronic back pain may be addressed with monophasic stimulation, while Parkinson's may be addressed with biphasic stimulation.

To maintain stable efficacy of the device, it is often important to stabilize the voltage output as the device moves with respect to the magnetic field generator (e.g. a fixed amplitude device). It may also be important to adjust the amplitude of the stimulus as the tissue changes, the device migrates over time, or the needs of the patient changes (tunable amplitude).

Referring now to FIG. 4, different aspects of fixed amplitude and tunable amplitude configurations are shown. To condition the amplitude of the stimulus the device can operate in fixed amplitude configuration, which can be accomplished by adding an LED or diode in parallel with the first diode. In such embodiments, the forward bias voltage sets the capping voltage of the device. These configurations can be beneficial for applications where the magnetic field strength is changing over a large area.

The device can also be operated in a tunable amplitude configuration to condition the amplitude of the stimulus. Such configurations can use pulse width modulation to increase or decrease the stimulus amplitude by changing the duration or the frequency of the high-frequency magnetic field pulse.

Certain embodiments may utilize a frequency shift. For example, by changing the magnetic field frequency slightly away from resonance on a characterized film, one can lower the output voltage. This is useful for applications where the pulse length needs to be long but the amplitude needs to be kept lower.

Particular embodiments may also use pulse duration control. For example, for very short pulses one can characterize a film and use the rising time constant calculated to determine the number of magnetic field pulses needed to achieve a desired voltage. This can be useful for amplitude control in applications where the pulse time is very short.

In addition, certain embodiments may utilize a programmable function to program the device. For example, data can be sent via the magnetic field to switch between stimulation modes in the electrical circuit as needed.

Although the resonant frequencies of the ME films are too fast for cells to respond (roughly 50-500 kHz), the inventors can apply a slowly varying envelope to this high-frequency carrier to stimulate electrically excitable cells. For example, the inventors can create a stimulus pulse train at 130 Hz (the typical therapeutic frequency for DBS) by applying a series of brief high-frequency pulses (approximately 1 ms in duration) and using a diode to rectify the ME response.

Exemplary embodiments can dynamically adjust the voltage produced by the ME device to match traditional DBS stimulation by changing the properties of the magnetic stimulus. For example, by adding a capacitor and resistor in series with the ME film, one can engineer an RC time constant that is fast compared to the desired pulse train (130 Hz), but slow compared to the carrier frequency (~100 kHz). In this case, the duration or duty cycle of the high-frequency magnetic pulse can be adjusted such that the film reaches a voltage determined by the time constant for charging the film.

Figure 5:
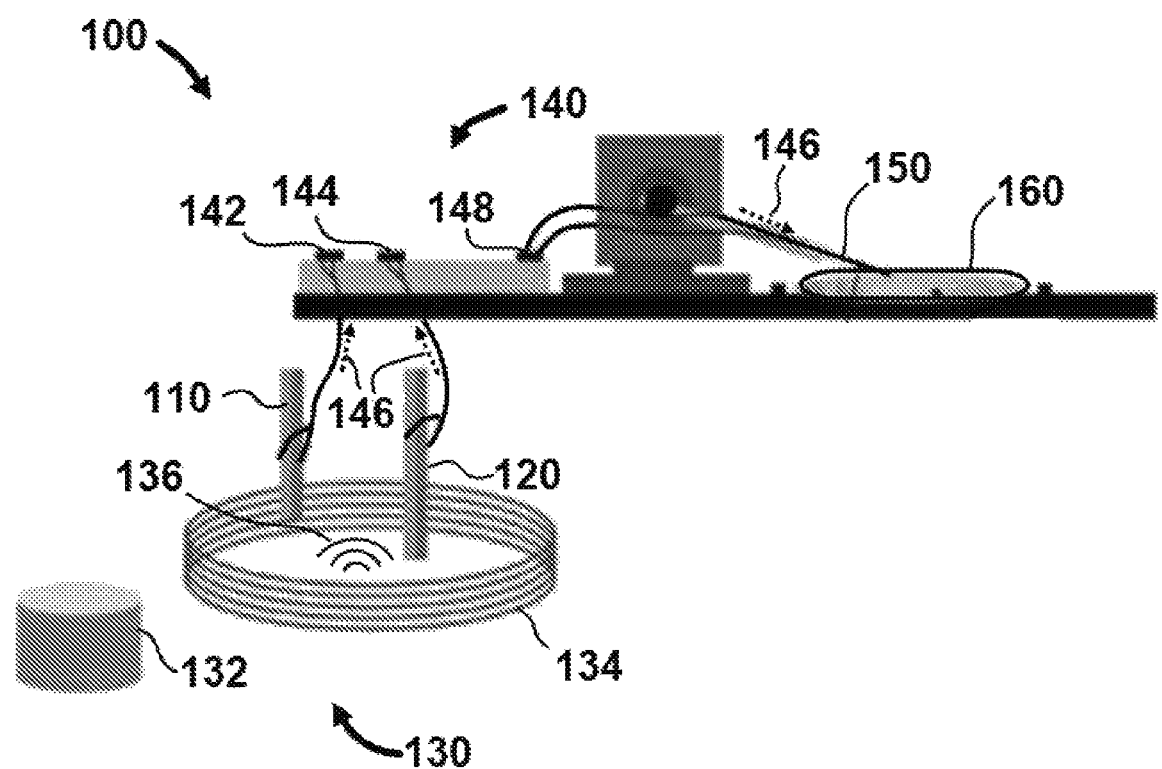
FIG. 5 illustrates is a schematic view of a system according to an exemplary embodiment of the present disclosure.

Referring now to FIG. 5, a more detailed schematic view is provided of a system 100 according to an exemplary embodiment of the present disclosure. System 100 comprises a first a magnetoelectric film 110 and a second a magnetoelectric film 120. It is understood that other embodiments may comprise a single magnetoelectric film. System 100 further comprises a magnetic field generator 130 comprising a permanent magnet 132 and an alternating current magnetic coil 134. While the embodiment shown utilizes a permanent magnet in the magnetic field generator, other embodiments may utilize an electromagnet in the magnetic field generator. In certain embodiments, magnetic field generator 130 is configured to generate a magnetic field 136 at a frequency between 20-500 kHz.

In the illustrated embodiment, first and second magnetoelectric films 110 and 120 are configured to produce an electrical output signal 146 when stimulated by magnetic field 136 at the input frequency generated by magnetic field generator 130. In particular embodiments, electrical circuit 140 is configured to modify the electrical output signal such that electrical output signal 146 has an output frequency between 0.5-1000 Hz. As discussed in further detail below, electrical circuit 140 may comprise various components, including for example, one or more rectifiers 142, transistors 144 and resistors 148. Electrical output signal 146 can be transmitted through a stereotrode 150 to activate neurons in a biological sample 160 (e.g. brain tissue).

In certain exemplary embodiments, magnetoelectric films 110 and 120 can be fabricated through the combination of a piezoelectric layer, Polyvinylidene Fluoride (PVDF) and magnetostrictive layer (e.g. Metglas) to form the magnetoelectric (ME) film. In specific embodiments, the two layers are first plasma treated to promote adhesion and a clean surface. The layers can then be bonded with the application of an approximately 30 µm thick epoxy layer. Once cured, the composite thin film can be cut using a femtosecond laser system that has can cut devices on the sub-millimeter scale.

To interrogate the high voltages on the film, silver print or silver conductive epoxy can be used to couple microwires to the center portion of the films. Electrical circuit 140 can comprise a novel H-bridge circuit to serve as a magnetic coil driver to reach high voltages and frequencies. It is understood the specific fabrication methods and materials disclosed herein are merely exemplary, and embodiments of the present disclosure are not limited to such methods and materials.

In certain embodiments, magnetoelectric films 110 and 120 may be fabricated by spin coating the piezoelectric polymer (PVDF-TrFE), using PZT piezoelectric ceramic material, or using electrospinning and direct writing methods of PVDF nanofibers. In specific embodiments, when the ME film is brought into contact with an alternating magnetic field produced by the driver and a permanent bias magnet or DC bias coils, the film will resonate and generate up to 50V peak-to-peak. The appropriate circuitry can be electrically coupled to the film to obtain the desired output voltage waveform, including examples discussed below.

In certain embodiments, other magnetostrictive materials may also be utilized, including zinc oxide (ZnO) nanoparticle doped PVDF films. Having a high piezoelectric coefficient like that of lead zirconate titanate (PZT) is beneficial in manufacturing materials for higher energy output and harvesting. PVDF is a piezoelectric polymer that is less piezoelectric than PZT but is a soft conformal material, and it has been shown that ZnO nanoparticles embedded in PVDF enhances its piezoelectric properties, mainly by increasing the dielectric constant of the composite film [48].

Specific discussion of embodiments incorporating ZnO nanoparticles and further description and explanation of the operating principles can also be found in the discussion of the examples and results that follow.

Examples

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Design Challenges

One of the primary challenges for wireless neural stimulators is to create efficient miniature devices (<1 cm in length) that operate reliably beneath bone and tissue as an animal or human patient engages in normal activity. At lengths of less than 1 cm, devices could be fully implanted in the periphery and be light enough to allow for unrestricted animal behavior; however, for devices this small, power delivery remains a challenge. Efficient power transfer with propagating electromagnetic waves requires antennas with feature sizes comparable to the electromagnetic wavelength. Thus, for sub-millimeter devices, such as the proposed RF powered "neurograins [6]," effective power-transfer frequencies lie in the GHz range, where electromagnetic radiation is absorbed by the body [7]. Absorption of this radio-frequency electromagnetic energy limits the amount of power that can be safely delivered to implants deep inside tissue [7]. As a result, researchers typically turn to magnetic induction or batteries to power implanted devices; however, these techniques also limit the degree of miniaturization. Batteries increase the size of the device and add considerable weight. Additionally, batteries require replacement or charging, which can limit the potential uses. Inductively coupled coils, on the other hand, can be made smaller and lighter than batteries, however; the power a receiving coil can generate is directly related to the amount of flux captured by the area of the coils. Thus, when the receiver coils are miniaturized, the output power reduces and becomes more sensitive to perturbations in the distance or angle between the transmitter and receiver [8]. For example, Freeman et al. demonstrated that small inductive coils less than 1 mm in diameter can power stimulators for the sciatic nerve in anesthetized rats [9]; however, in its present form, this device would have difficulty providing stable stimulation in freely moving animals due to the reduced power coupling efficiency that accompanies changes in the angle and distance between the receiver and transmitter coils.

Additionally, for neural stimulators to treat a number of neurological disorders like Parkinson's Disease (PD), obsessive-compulsive disorder, and epilepsy, they must operate safely and effectively in the high-frequency "therapeutic band" between 100 and 200 Hz [10-12]. This type of high-frequency neural stimulation is challenging because charge on the electrode must be dissipated between successive stimulation pulses to prevent electrolysis, tissue damage, and changes to the local pH [13]. Charge dissipation at high-frequencies is accomplished by using a biphasic stimulus waveform that actively or passively charges and discharges the electrode with each cycle. Indeed, all clinically approved electrical neural stimulation therapies in this therapeutic band use various forms of "charge balanced" biphasic stimulation waveforms [14].

Recently, several promising alternatives to magnetic induction and batteries have enabled miniature neural stimulators; however, these approaches have yet to demonstrate in vivo operation in the therapeutic high-frequency band in freely moving animals. Montgomery et al. and Ho et al. have shown that one can use the mouse body as an electromagnetic resonant cavity to effectively transfer energy to sub-wavelength scale devices implanted inside the animal [15, 16]. This approach is particularly effective to drive tiny LEDs for optogenetic stimulation. However, because the electrical waveform is monophasic, electrical stimulation has been limited to <20 Hz. Using superparamagnetic nanoparticles to absorb energy from high-frequency (500 kHz) magnetic fields [17], one can heat specific regions of the brain [18,19] in freely moving animals [19]. This local heat can stimulate neural activity when the targeted brain region is genetically modified to respond to changes in temperature [18,19]. However, this approach requires transgenesis, which adds regulatory complexity and has yet to show high-frequency operation due the requirement for the tissue to cool between stimulation intervals. Ultrasound provides a promising and efficient method to power bioelectronic implants because ultrasound wavelengths are 105 times smaller than electromagnetic waves at the same frequency allowing sub-millimeter-sized devices to have wavelength-scale piezoelectric antennas [20,21]. However, implementation of these "neural dust" motes can be challenging in freely moving animals because the impedance mismatch between air, bone, and tissue requires contact between soft tissue and the ultrasound transducer for efficient power transfer. As a result, there has yet to be a demonstration of ultrasound-powered neural stimulators in freely moving animals [22].

Here the inventors show that magnetoelectric (ME) materials enable the first magnetically powered miniature neural stimulators that operate in the therapeutic high-frequency band. Similar to inductive coils, these materials transform a magnetic field to an electric field, but instead of using an implanted coil the inventors use a material that generates a voltage via mechanical coupling between magnetostrictive and piezoelectric layers in a thin film. Namely, the magnetic field generates strain in the magnetostrictive layer as the magnetic dipoles align with the applied field. That strain exerts a force on the piezoelectric layer, which generates a voltage (FIG. 5). By exploiting this transduction mechanism, magnetoelectrics do not suffer from the same miniaturization constraints as coils and can be driven by weak magnetic fields on the order of a few millitesla. These properties have led researchers to propose magnetoelectrics as a promising material for bioelectronic implants [23-27]. Here the inventors demonstrate the first proof-of-principle wireless neural stimulators based on ME materials in a freely behaving rodent model for Parkinson's Disease (PD), and that these materials could power miniature devices deep within the human brain.

Fabrication and Characterization of ME Stimulators

The inventors fabricated proof-of-principle ME stimulators by bonding a rectangular magnetostrictive layer (Metglas) to a platinum coated piezoelectric layer, polyvinyldine fluoride (PVDF). The inventors then encapsulated the films in a protective parylene-C layer (8-10 μm thick) (see FIG. 6. panel (a), see also Methods section). This embodiment incorporates PVDF layers between 28 and 110 μm, which yielded total device thicknesses between 50-150 μm. Other embodiments may include alternative or additional piezoelectric materials, including for example, lead zirconate titanate, also referred to as PZT.

Figure 6:
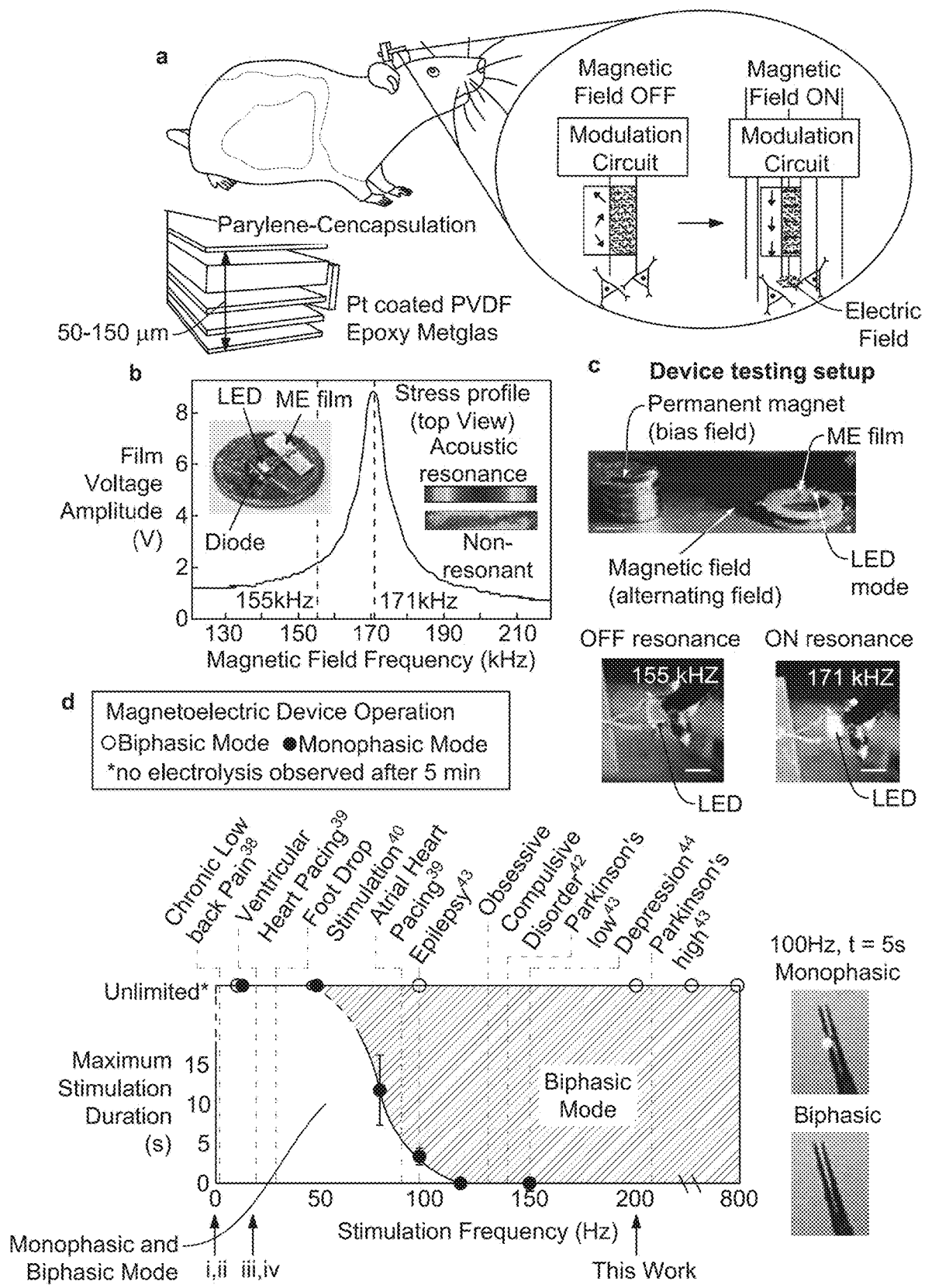
FIG. 6 illustrates provides aspects of how magnetoelectric (ME) films convert alternating magnetic fields into a voltage.

FIG. 6 provides an overview of how ME films convert alternating magnetic fields into a voltage. In FIG. 6 panel (a), a diagram of a ME device is shown on a freely moving rat for wireless neural stimulation. In the embodiment shown, the active ME element comprises piezoelectric PVDF (blue) and Metglas (gray) laminate encapsulated by Parylene-C. The inset shows the operating principle whereby the strain produced when magnetizing the gray magnetostrictive layer is transferred to the blue piezoelectric layer, which creates a voltage across the film. In FIG. 6 panel (b), an example of a resonant response curve for a ME film shows that the maximum voltage is produced when the magnetic field frequency matches an acoustic resonance at 171 kHz. When measured the voltage across the film, a dramatic voltage increase was fond when the applied magnetic field frequency, matches an acoustic resonant frequency. The photograph inset shows an example of an assembled ME stimulator. The "Stress profile" inset shows a top view of the stress produced in a ME film as calculated by a finite element simulation on and off resonance (COMSOL). In FIG. 6 panel (c), a device testing setup is shown with a permanent magnet to apply a bias field and an electromagnetic coil to apply an alternating magnetic field (scale bars: upper=1 cm, lower=2 mm).

FIG. 6 panel (d) shows a maximum stimulation duration (using a 400 μs/phase pulse repeated at increasing frequencies) for a ME device in biphasic and monophasic operation. In this example, the maximum stimulation time is determined by time of electrolysis on a stereotrode in saline as evidenced by gas bubbles (error bars+/−1 standard deviation for n=4 trials). Dashed lines indicate frequencies of electrical stimulation used in various clinical applications, showing that biphasic operation is necessary for many clinically relevant applications. Roman numerals indicate stimulation frequencies demonstrated by previously published miniature magnetic stimulators (i: Magnetothermal, Chen et. al, 2015, ii: Magnetothermal, Munshi et. al, 2017, iii: Mid-Field Optogenetics, Montgomery et. al, 2015, iv: RF Inductive Coupling, Freeman et. al, 2017).

Figures 7, 8:
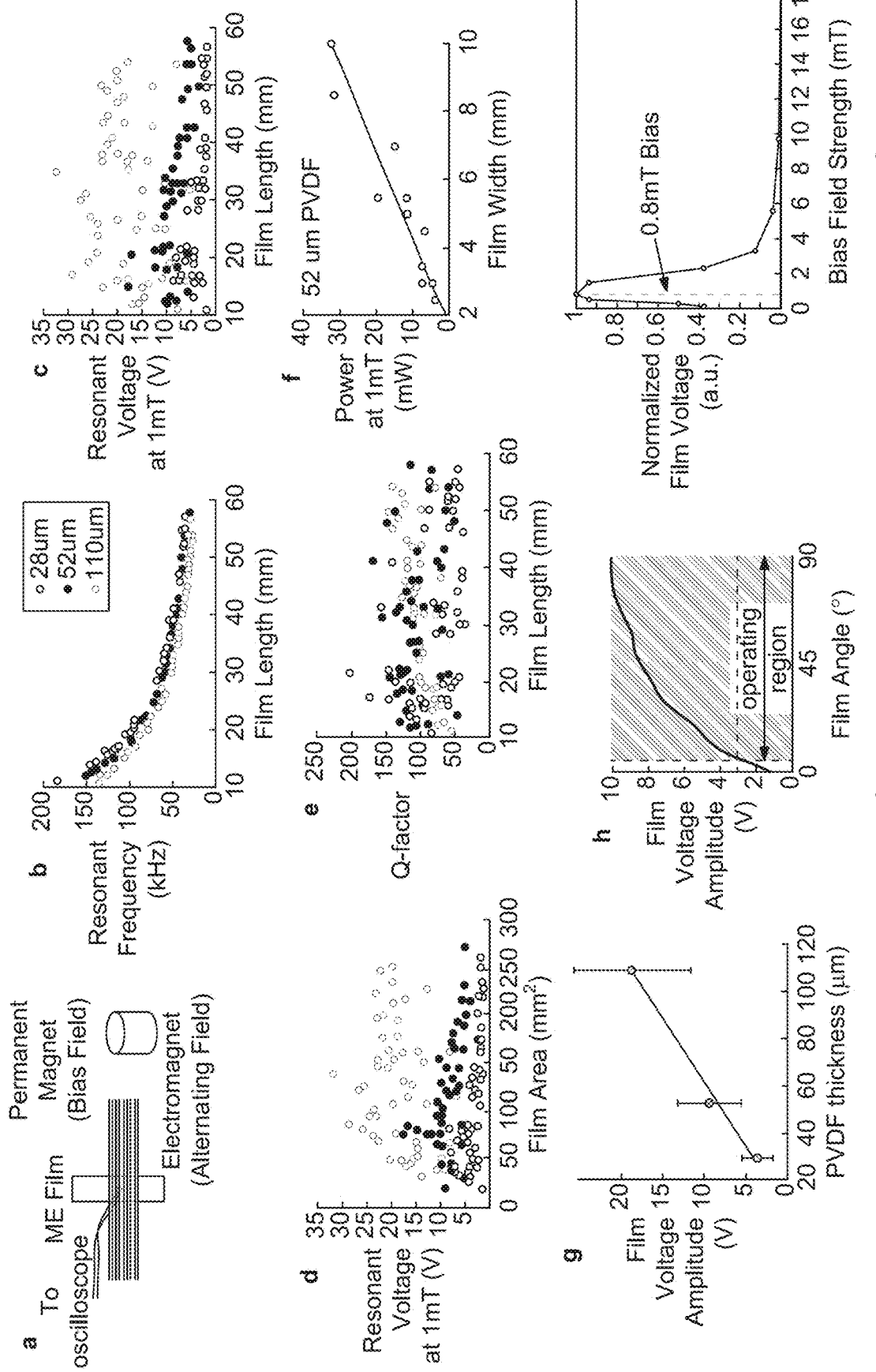
FIG. 7 illustrates film properties versus film length.
FIG. 8 illustrates film output voltage as a function of bias field.

Because the resonant frequency is proportional to the inverse of the film length, one can design multiple films and selectively activate them by changing the stimulus frequency, as shown in FIG. 7. Using this principle, the inventors can use different magnetic field frequencies to activate separate devices that may be in different areas of the body, or create biphasic stimulators by interleaved resonant stimulation of two different films, with each film driving either the positive or negative phase of the neural stimulus. FIG. 7 illustrates ME properties as a function of film size. Panel (a) shows a schematic of experimental setup used to gather data. Testing was performed for ME films with three different PVDF thicknesses: 28 (blue), 52 (red), and 110 (yellow) μm. FIG. 7 panel (b) shows resonant frequency as a function of film length, while panel (c) shows output voltage as a function of film length, panel (d) shows output voltage as a function of film surface area, and panel (e) shows Q-factor as a function of film length FIG. 7 panel (f) shows maximum power output as a function of film width for 52 um PVDF thickness, while panel (g) illustrates peak resonant voltage plotted vs. PVDF thickness, showing that the peak ME voltage increases with the PVDF thickness. Error bars indicate +/−1 standard deviation for n≈50 films for each thickness. FIG. 7 panel (h) shows ME voltage as a function of angle between the film and the coil. Blue region shows the range of operating angles for which the voltage is greater than the expected stimulation voltage.

One can further enhance the voltage generated by the ME films by applying a constant bias field with a permanent magnet or an electromagnet, as shown in FIG. 6 panel (c). Because the strain in the magnetostrictive material is a sigmoidal function of the magnetic field strength, the change in voltage produced by the alternating field is largest when the field oscillates about the midpoint of the sigmoid, as shown in FIG. 8 [28,29]. FIG. 8 shows film output voltage as a function of bias field. The peak resonance voltage is significantly increased by a modest bias field that can be produced by a permanent magnet.

Figure 9:
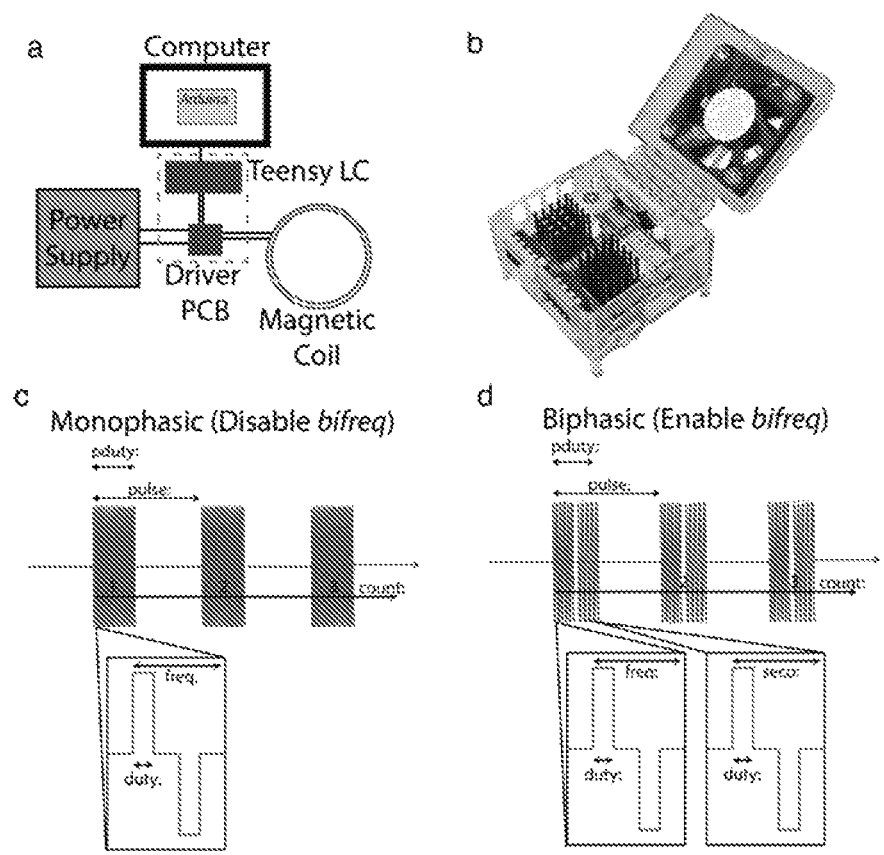
FIG. 9 illustrates aspects of a magnetic field driver.

Thus, a bias field can be used to offset the magnetic field near the center of the sigmoidal magnetostrictive response curve. This bias field allows the inventors to generate therapeutic voltage levels while applying a small (few mT) alternating magnetic field using an electromagnetic coil and custom control circuitry that specifies the frequency and timing of the alternating magnetic field, as shown in FIG. 9. FIG. 9 shows aspects of a magnetic field driver. FIG. 9, panel (a) illustrates a schematic of the major components of the magnetic field driver, where the dashed line denotes components rendered in panel (b). FIG. 9, panel (c) shows an output waveform for monophasic stimulation and the parameters that can be controlled by the drive software, while panel (d) shows an output waveform for biphasic stimulation, and the parameters that can be controlled by the driver software.

To identify the operational frequencies for the ME stimulators the inventors tested them in saline and found that with a biphasic stimulation waveform the inventors could apply constant stimulation up to at least 800 Hz without significant hydrolysis. For this test the inventors operated either one film for monophasic stimulation or two films for biphasic stimulation attached to a stereotrode (Microprobes) in saline (see Methods). The inventors then measured the time at which the inventors could see bubbles at the electrode tip resulting from hydrolysis. This hydrolysis event indicates conditions that would lesion the surrounding tissue. The inventors found that with a monophasic stimulation waveform, stimulation frequencies above 50 Hz produced hydrolysis while biphasic charge-balanced stimulation showed no hydrolysis up to the maximum tested frequency of 800 Hz. Compared to previously demonstrated miniature magnetic neural stimulators, the biphasic ME devices shown here are the first to access the high-frequency bands used for clinical applications like the treatment of Parkinson's disease and obsessive-compulsive disorder (as shown in FIG. 6 panel [d]).

An additional challenge for any wirelessly powered neural stimulator is to maintain a well-regulated stimulation voltage. This challenge is especially prevalent as devices become small, which often reduces the power transfer efficiency resulting in a greater sensitivity to the alignment between the device and power transmitter. ME materials offer two main advantages that can enable stable and effective stimulation even as devices become small and move with respect to the driver coils.

First, ME devices generate voltages well in excess of the effective stimulation potential, allowing them to be effective even if the materials are misaligned with the driver coils. At resonance, the inventors have measured ME voltages in excess of 30 V at a field strength of only 1 mT (as shown in FIG. 7 panels [c] and [d]). Because effective stimulation voltages are usually between 1-5 V, the inventors can cap the applied voltage to this effective stimulation range using an LED or Zener diode. As long as the voltage generated by the ME film is greater than or equal to the capping voltage, the inventors will apply approximately the same stimulus voltage regardless of the angle or distance between the driver coil and the ME film. For a typical film the inventors found that the inventors could reorient the film by +/−80 degrees and maintain voltages in excess of 3 V (as shown in FIG. 7, panel [h]). This large angular tolerance is aided by the large magnetic permeability of the Metglas layer, which helps to direct the magnetic field lines along the long axis of the film, where they are most effective at creating a magnetostrictive response.

Second, the voltage generated by a piezoelectric material depends on the thickness of the piezoelectric layer and not the area of the film [30], allowing the inventors to fabricate small magnetoelectric films that generate roughly the same stimulation voltage as larger devices. FIG. 7 shows the peak voltage generated and quality factor for ME films of different areas. The inventors found that, for a 52 µm thick PVDF layer, the voltage remains around 10 V even as the film length decreases. Variations of +/−40% in peak voltage and quality factors are likely due to defects produced during film fabrication, which may be reduced with improved manufacturing. The inventors also verified that the output voltage depends only on the piezoelectric film thickness by measuring the peak voltages from ME devices with three different thicknesses of PVDF: 28 µm, 52 µm, and 110 µm. As expected, one can see that the peak voltage increases linearly with the PVDF thickness and is independent of the film length. The inventors calculated (and experimentally confirmed) that the power generated by a ME device is proportional to the film width for a given thickness and a length-to-width ratio >3 (see FIG. 7 panel [f]). Despite the decrease in power as films become smaller, the inventors calculate that films less than 1 cm long can generate up to 4 mW, which is more than sufficient for many wireless applications including neural stimulation [31].

Monophasic Stimulation by ME Films Evoke Action Potentials In Vitro

Using fluorescence microscopy to image voltage in cultured cells, the inventors found that monophasic stimulation for 50 ms at 100 Hz by ME films reliably stimulated action potentials (APs). For these experiments the inventors used "spiking" human embryonic kidney (HEK) cell lines that were modified to express sodium and potassium channels. These cells have spike-like electrical waveforms that are rectangular in shape and can last for a few seconds depending on the confluency of the culture [32]. To determine the relative timing between magnetic stimulation and action potential generation, the inventors transfected these cells with ArcLight33—a genetically encoded voltage indicator that allows us to measure action potentials using fluorescence microscopy.

Figure 10:
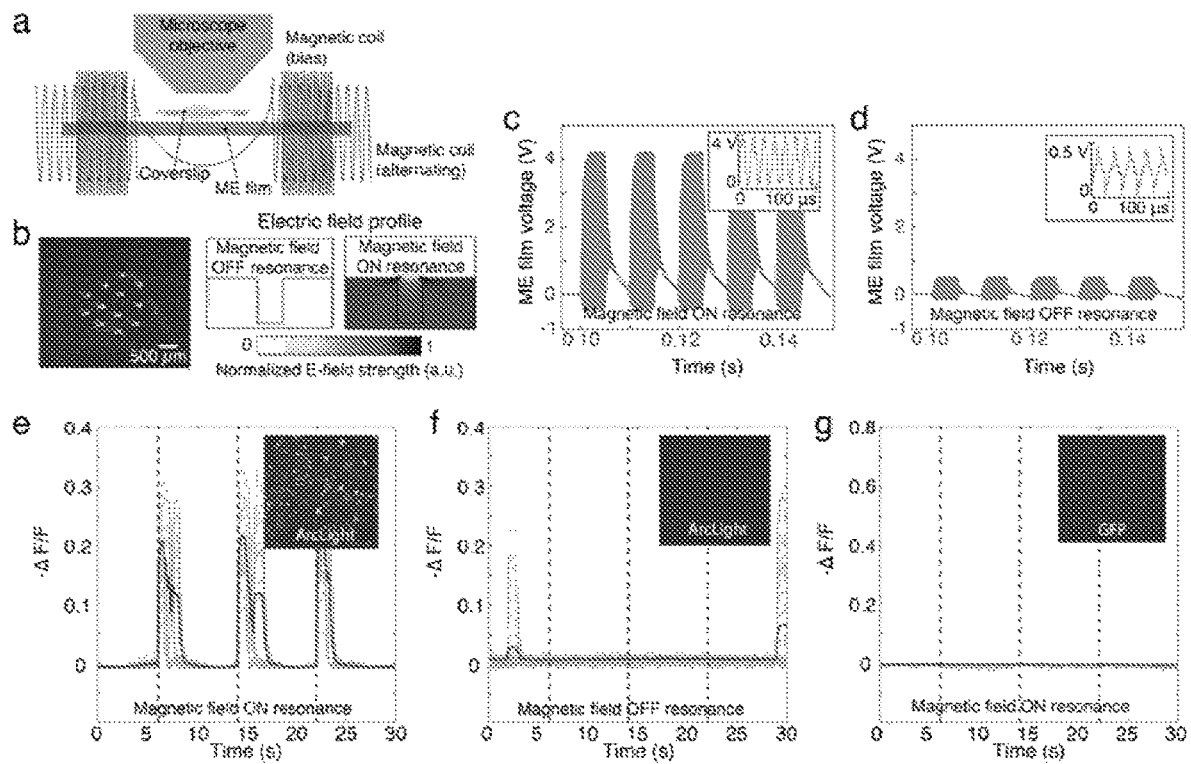
FIG. 10 illustrates aspects of monophasic ME stimulators activating cells in vitro.

Referring now to FIG. 10, aspects of monophasic ME stimulators activating cells in vitro are illustrated. FIG. 10 panel (a) shows a schematic of the experimental setup, while panel (b) shows a microscope image of holes stamped into the ME film and finite element simulation of the electric field shows that the holes produce fringing electric fields that overlap the culture cells. FIG. 10 panels (c) and (d) show the voltage across the ME film when the magnetic field is on resonance and off resonance, respectively. Insets show an enlarged view of the high frequency carrier waveform. FIG. 10 panels (e-g) illustrate fluorescence from spiking HEKs transfected with ArcLight, which show action potentials are triggered by the ME film driven at resonance (panel [e]), but not when the film is driven off resonance (panel [f]). Fluorescence from HEK cells transfected with GFP show no response when the ME film is driven on resonance confirming that the measured ArcLight response is the result of a change in transmembrane potential and not an artifact of the magnetic field or acoustic resonance of the ME film.

To image fluorescence while the inventors applied magnetic fields, an experimental setup was developed, allowing the placement of cells and ME films beneath an objective lens at the center of a 10 cm long solenoid with a 3 cm gap in the center. This configuration allowed the placement of ME films, cells, and the objective lens at the center of the applied magnetic field, as shown in FIG. 10, panel (a). Two slightly larger coils placed on either side of the gap provide the constant bias field.

Figure 11:
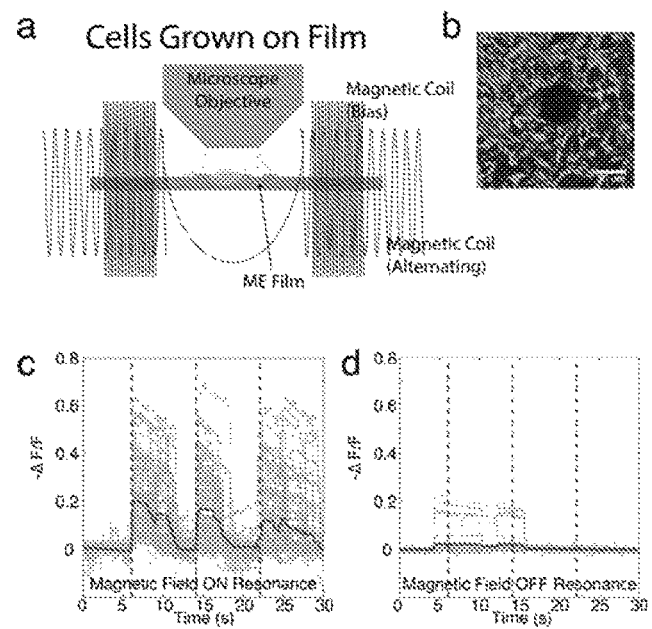
FIG. 11 illustrates aspects of cells grown directly on ME film.

The inventors then approximated an implanted ME stimulator using two experimental configurations: (1) growing cells directly on the ME film (as shown in FIG. 11); and (2) laying a coverslip with adherent cells on top of the ME film (as shown in FIG. 10). FIG. 11 shows ME stimulation of cells grown directly on ME film. FIG. 11 panel (a) shows a schematic of the experimental setup. FIG. 11 panel (b) shows a microscope image of fixed cells adherent to the region around a stamped hole (Hoechst/Calcein-AM, cells labeled prior to fixing). FIG. 11 panel (c) shows ArcLight fluorescence of spiking HEK cells when magnetic field is on resonance and panel (d) off resonance.

To culture cells directly on the ME film, the inventors coated the top parylene layer with poly-l-lysine. The healthy proliferation of HEKs on the ME device indicates that this encapsulation approach prevents the ME materials from limiting cell growth (FIG. 11, panel [b]). However, in a typical use case, the target cells may not adhere to the ME stimulator, so the inventors also tested the response of cells laid on top of the ME materials. In this configuration the inventors first grew the cells on coverslips for 3-5 days before inverting the coverslips and laying them on the ME for testing (FIG. 6, see Methods).

To create fringing electric fields that interact with the cultured cells, the inventors stamped holes in the ME film, as shown in FIG. 10 panel (b). The films were otherwise fabricated as described herein (FIG. 6, Methods). In experiments using ME films and Pt electrodes the inventors found that high-frequency biphasic stimulation at the ME resonance frequency (typically 20-150 kHz) was not effective to stimulate action potentials (APs) in cultured HEKs, as predicted by the low-pass filtering properties of the cell membrane [9]. To create an effective monophasic stimulus waveform, the inventors used a Schottky diode to rectify the voltage to create entirely positive or negative voltage waveforms depending on the diode direction. This rectified waveform has a slowly varying monophasic envelope in the <500 Hz frequency band where cells are responsive (FIG. 10 panels [c] and [d]).

For both cells grown directly on the ME films and those placed in contact the inventors found that five stimulation pulses with an envelope frequency of 100 Hz consistently stimulated APs in the spiking HEK cells (FIG. 10, panel [e], FIG. 11, panel [c]). Significantly, this 10-500 Hz stimulation frequency spans the therapeutic window for many deep brain stimulation treatments [34], and is difficult to achieve with other wireless stimulators that compensate for low-efficacy energy harvesting by charging on-board capacitors [35]. For experiments disclosed herein, the carrier frequency of the magnetic field was at the resonant frequency of the device, which varied between 20-40 KHz depending on device length. To test stimulation reliability, the inventors repeated the 5-pulse stimulus three times over a period of 30 seconds. The inventors observed APs for each stimulation pulse in n=43 cells on coverslips and n=144 cells grown on films. The inventors confirmed that the APs stimulated by the ME film were in fact the result of resonant excitation of the film and not an artifact of the applied magnetic fields by imaging voltage-sensitive fluorescence when the magnetic field was tuned off of the resonant frequency. For non-resonant excitation the inventors observed no correlation between the applied field and fluorescently detected APs in the spiking HEKs (FIG. 10 panel [f], FIG. 11 panel [d], supporting the conclusion that APs were stimulated by the ME film at resonance. The inventors also confirmed that the fluorescent signal recorded indeed represents the voltage-dependent ArcLight response by imaging cells transfected with voltage-independent cytoplasmic GFP. These cells showed no change in fluorescence when the films were driven at the resonant frequency (FIG. 10 panel [g]).

Biphasic Stimulation by ME Films Evoke Action Potentials in Brain Slices

Figure 12:
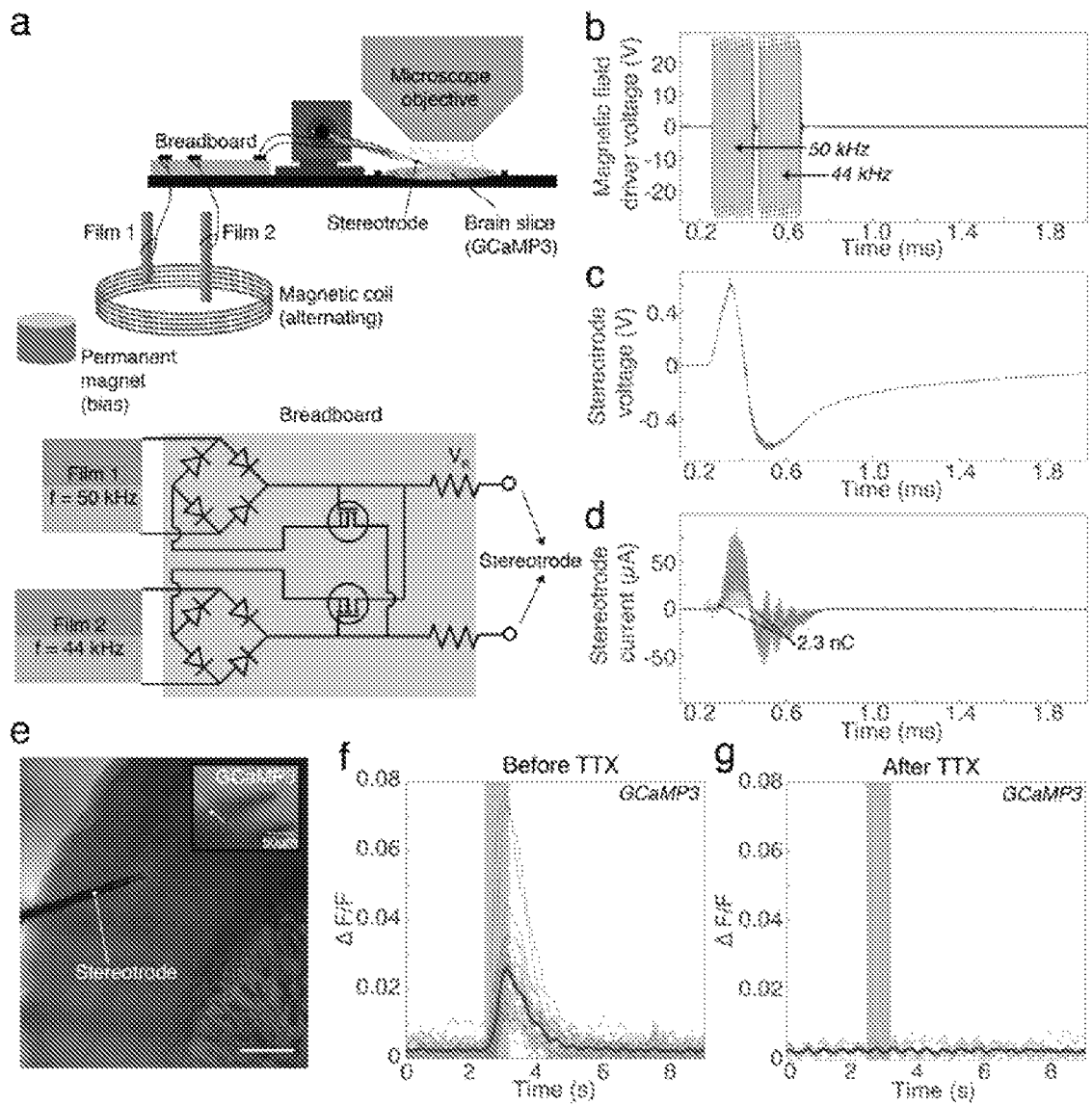
FIG. 12 illustrates aspects of biphasic ME stimulators activating neurons in ex vivo brain slices.

As described above, biphasic stimulation is preferred for most applications due to the desire to create a charge-balanced stimulus that reduces charge buildup and undesired electrochemical reactions at the electrode surface 13. While the voltage waveform produced by ME films at resonance is biphasic, these resonant frequencies (typically 20-150 kHz) are too high to produce reliable cell stimulation, as described above. To create an effective biphasic stimulus in the therapeutic window (100-200 Hz), the inventors use two films with distinct resonant frequencies connected to the same stimulating electrodes (FIG. 12 panel [a]). The first film is attached to a full wave rectifier, which is oriented to generate a positive pulse, while the second film is attached to a full wave rectifier that generates a negative pulse.

The transistors block currents generated by one film from propagating through the circuitry attached to the other film, ensuring that only one half of the circuit is active at a time. By switching the magnetic field frequency between the two ME resonance frequencies, the inventors can alternate positive and negative phase stimulation to create a biphasic neural stimulator (FIG. 12, panels [b-d]). In this case the residual charge of −2.3 nC, which discharges in <2 ms, implies that this stimulator can safely operate at frequencies up to >500 Hz without accumulating charge.

The inventors found that the biphasic ME stimulator is capable of repeatable neural stimulation using neocortical brain slices derived from mice that express the genetically encoded calcium indicator GCaMP3 in GABAergic neurons. To image neural activity following ME stimulation the inventors inserted a stereotrode attached biphasic ME stimulator described above while the inventors imaged GCaMP activity using fluorescence microscopy (FIG. 12, panels [e-g], Methods). The inventors chose neural stimulation parameters similar to those commonly used for deep brain stimulation [34]: 100 biphasic pulses at 200 Hz with each phase lasting 175 μs. When the magnetic field was on the inventors observed a corresponding increase in fluorescence in n=23 recordings in neocortical layer 5 consistent with activity-mediated calcium increases. Following bath application of tetrodotoxin (TTX, 500 nM) fluorescence increases were completely blocked in n=9 recordings confirming that ME stimulation reliably evoked sodium-channel dependent action potentials in nearby neurons.

In summary, FIG. 12 illustrates aspects of biphasic ME stimulators activating neurons in ex vivo brain slices. FIG. 12 panel (a) shows a schematic of experimental setup with two ME films for biphasic stimulation. This setup is similar to the embodiment described in FIG. 1, but includes a microscope objective for observation. FIG. 12 panel (b) shows a measured voltage waveform produced by the magnetic field generator. When coupled to the magnetic coils, this waveform produces magnetic fields that alternate between the resonant frequencies of the two ME films. FIG. 12 panel (c) shows measured voltage across the stereotrode, which shows the expected biphasic pulse shape. FIG. 12 panel (d) shows the calculated current based on measuring the voltage across our load resistor (VR) shows nearly perfect charge balancing with only 2.3 nC accumulating on the electrode per pulse train. FIG. 12 panel (e) shows the bright field image of stereotrode in mouse cortex (scale bar=1 mm) with inset of GCaMP signal averaged over a 600 µm×600 µm region around stereotrode tip. The arrow indicates a fluorescing cell body near the stereotrode. FIG. 12 panel (f) shows the average GCaMP signal when resonant magnetic field is applied before (panel [f]) and after (panel [g]) adding TTX shows neural activity is induced by the ME stimulator. Thin green traces represent separate experiments from two different brain slices, and thick black traces represent the mean of all experiments.

ME Neural Stimulation in Freely Moving Rats Shows Behavioral Efficacy

Figure 13:
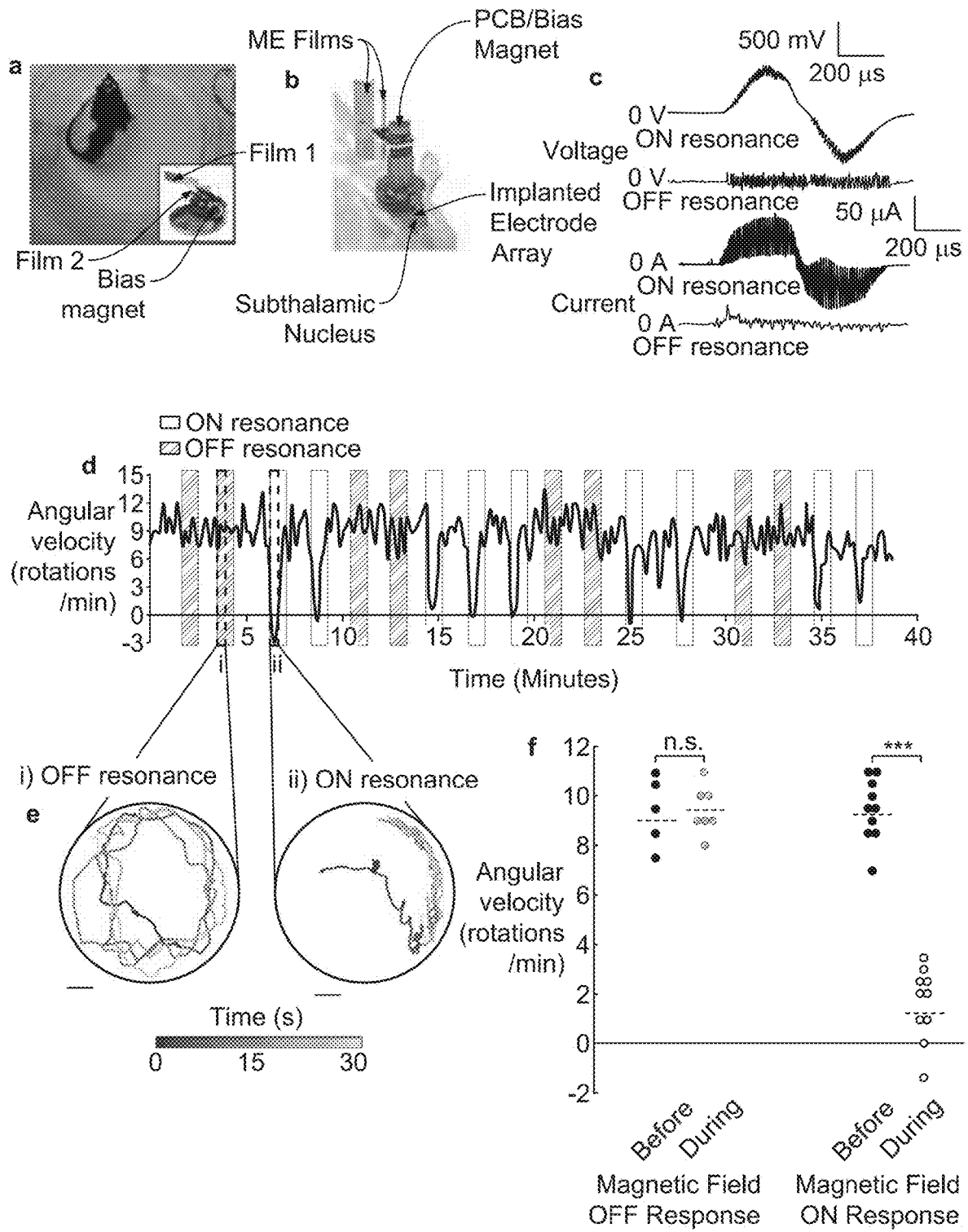
FIG. 13 illustrates aspects of a biphasic stimulator for deep brain stimulation (DBS) in freely moving rats.

A major advantage of the ME stimulators disclosed herein is the fact that remote activation enables experiments with freely behaving animals. As a proof-of-principle the inventors adapted the biphasic stimulator for deep brain stimulation (DBS) in freely moving rats, as shown in FIG. 13. To test ME stimulator efficacy, the inventors used a previously reported protocol to test DBS in hemi-parkinsonian rats [36]. In these experiments rats are injected with 6-OHDA in the left medial forebrain bundle (MFB) to create a unilateral lesion of the substantia nigra pars compacta (SNc). The animals are then placed in a 30 cm diameter circular enclosure. Following a dose of methamphetamine, the hemi-parkinsonian rats have been shown to rotate ipsilateral to the injection (e.g. left for injection into the left MFB). During these rotations, the rat primarily moves using its contralateral (right) forepaw, rarely placing the ipsilateral (left) forepaw onto the ground. When a biphasic stimulus is applied at 200 Hz in the sub-thalamic nucleus (STN) using a tethered electrode array stimulator, rats typically stop turning to the left and exhibit more normal behavior such as moving with both forepaws, maintaining a steady orientation, or turning to the contralateral side [34].

Figure 14:
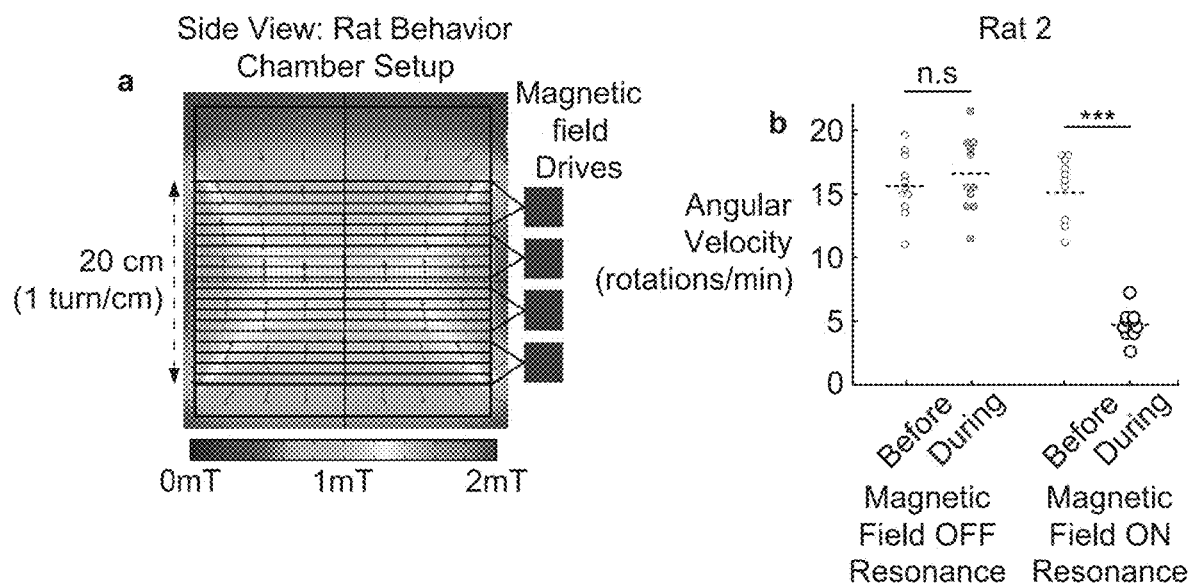
FIG. 14 illustrates a schematic showing the location and spacing of wires and the number of drivers used to generate the alternating magnetic field in an experimental setup.

To create a wireless, biphasic ME stimulator for freely moving animals the inventors added a small permanent magnet to the ME stimulator to generate a bias field, and wrapped the behavioral chamber with 18 AWG copper wire to create a solenoid (FIG. 13 panel [a], FIG. 14). By integrating the small permanent magnet (<0.25 g) into the ME stimulator, the inventors could ensure that the bias field was constantly aligned with ME films as the animal moved within the enclosure. The inventors could also ensure that the positive and negative stimuli had equal amplitudes by independently adjusting the distance between each film and the permanent magnet. This ME stimulator was then connected to a commercial electrode array (Microprobes) implanted in the STN (FIG. 13 panel [b], Methods). The inventors ensured that the stimulation voltage and current were within the safe and therapeutic range by measuring the output of the ME stimulator connected to an equivalent circuit model of the brain (FIG. 13 panel [c], Methods). Specifically, the inventors observed peak voltages of approximately +/−1.5 V and peak currents of approximately +/−100 µA for 400 us at approximately a 50% duty cycle (200 µs of overall current per phase), which is within the effective stimulation range reported for conventional wired stimulators [36]. When the inventors tune the magnetic field frequency off resonance they observe almost no generated voltage or current (FIG. 13, panel [c]).

In FIG. 13, effective DBS is shown in a freely moving rat using a wireless ME stimulator. FIG. 13 panel (a) illustrates an experimental setup showing rat in a circular enclosure wrapped with magnet wire. The inset shows a biphasic ME stimulator on a one cent coin. FIG. 13 panel (b) shows a schematic of the biphasic ME stimulator attached to the electrode array that is implanted into the STN. FIG. 13 panel (c) shows measured voltage generated by the ME device and the current applied to the brain on resonance (green) and off resonance (blue). Approximately 100 µA biphasic stimulation is applied only when then the magnetic field frequency matches the resonance condition. FIG. 13 panel (d) shows the angular velocity of the hemi-Parkinsonian rat over a 40-minute DBS trial with intervals of resonant and non-resonant stimulation shows that rotations are reduced only when the stimulator is activated by a resonant magnetic field. FIG. 13 panel (e) illustrates the typical trajectories that show the location of the animal's head over two 30-second intervals denoted in c (scale bar=5 cm). FIG. 13 panel (f) shows the average angular velocity of the rat during the 30 seconds before stimulation and the first 30 seconds of stimulation for each interval during the 40-min experiment shows a clear reduction in angular velocity only when the ME film is activated on resonance (*** P=4×10-7, n.s.=not significant P=0.70, paired t-test).

The inventors tested the wireless version of the biphasic ME stimulator mounted to the head of a freely behaving rat and found that ME stimulation showed efficacy comparable to previously reported wired DBS stimulators. With a magnetic field applied at resonance, the inventors found that one-minute periods of 200 Hz biphasic pulses resulted in a significant decrease in the animal's rotation rate as shown in the FIG. 13 panel (d) green intervals. This decreased rotation was not observed when the magnetic stimulus frequency was tuned off resonance as shown in the FIG. 13 panel (d) blue intervals. Plots of the head trajectories show that the pathological rotations observed during off-resonant magnetic field stimulation are not present when the ME stimulator is active during resonant magnetic field stimulation (FIG. 13 panel [e], Methods). When averaged over all trials, average rotation rate during the first half of stimulation fell to a statistically significant 1.6 rotations per minute (rpm), compared to 9.3 rpm in the absence of stimulation, or 9.4 rpm during off-resonant stimulation (paired t-test, FIG. 13 panel [f]). The inventors further demonstrated the repeatability of this stimulator by repeating this stimulation protocol on a second rat and found similar results (FIG. 14 panel [b]).

FIG. 14 panel (a) illustrates a schematic showing the location and spacing of wires and the number of drivers used to generate the alternating magnetic field overlaying a COMSOL simulation of magnetic field strength in the chamber FIG. 14 panel (b) shows results from rotation test in Rat 2: Angular velocity in the 30 seconds before stimulation and the first 30 seconds of stimulation shows a clear reduction in angular velocity only when the ME film is activated on resonance (*** P=1.5×10-8, n.s.=not significant P=0.27, paired t-test)

Figure 15:
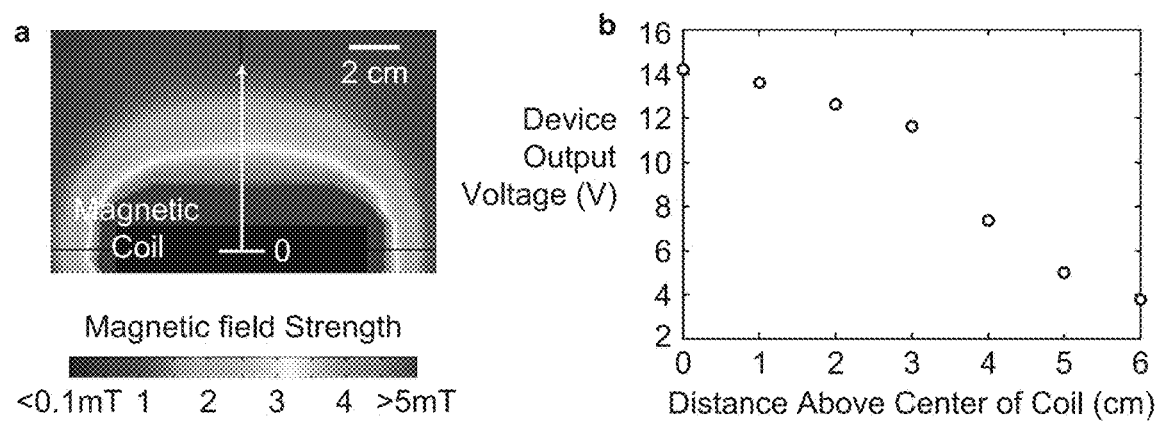
FIG. 15 illustrates a COMSOL simulation of magnetic field above a circular coil and the measured device output voltage as a function of distance above the coil.

With a weight of 0.67 g, the ME stimulators described here are the first reported miniature, magnetic, high frequency stimulator. Furthermore, by changing the frequency and timing of the external drive coils, the inventors can generate a variety of stimulation patterns throughout the therapeutic window of 100-200 Hz with applications to other disease models. Additionally, calculations of the magnetic field strengths suggest that the inventors can reconfigure the drive coils for a number of behavioral experiments by placing coils beneath the floor of an animal enclosure. Finite element simulations and measurements show that even at distance 4-5 cm above a drive coil, ME films generate sufficient voltage for stimulation (FIG. 15). This distance could be further improved by optimizing the geometry of the coils or increasing the power of the magnetic field. FIG. 15 illustrates ME devices can operate several centimeters above a single magnetic coil. FIG. 15 panel (a) shows a COMSOL simulation of magnetic field above a circular coil, while FIG. 15 panel (b) shows the measured device output voltage as a function of distance above the coil.

Figure 16:
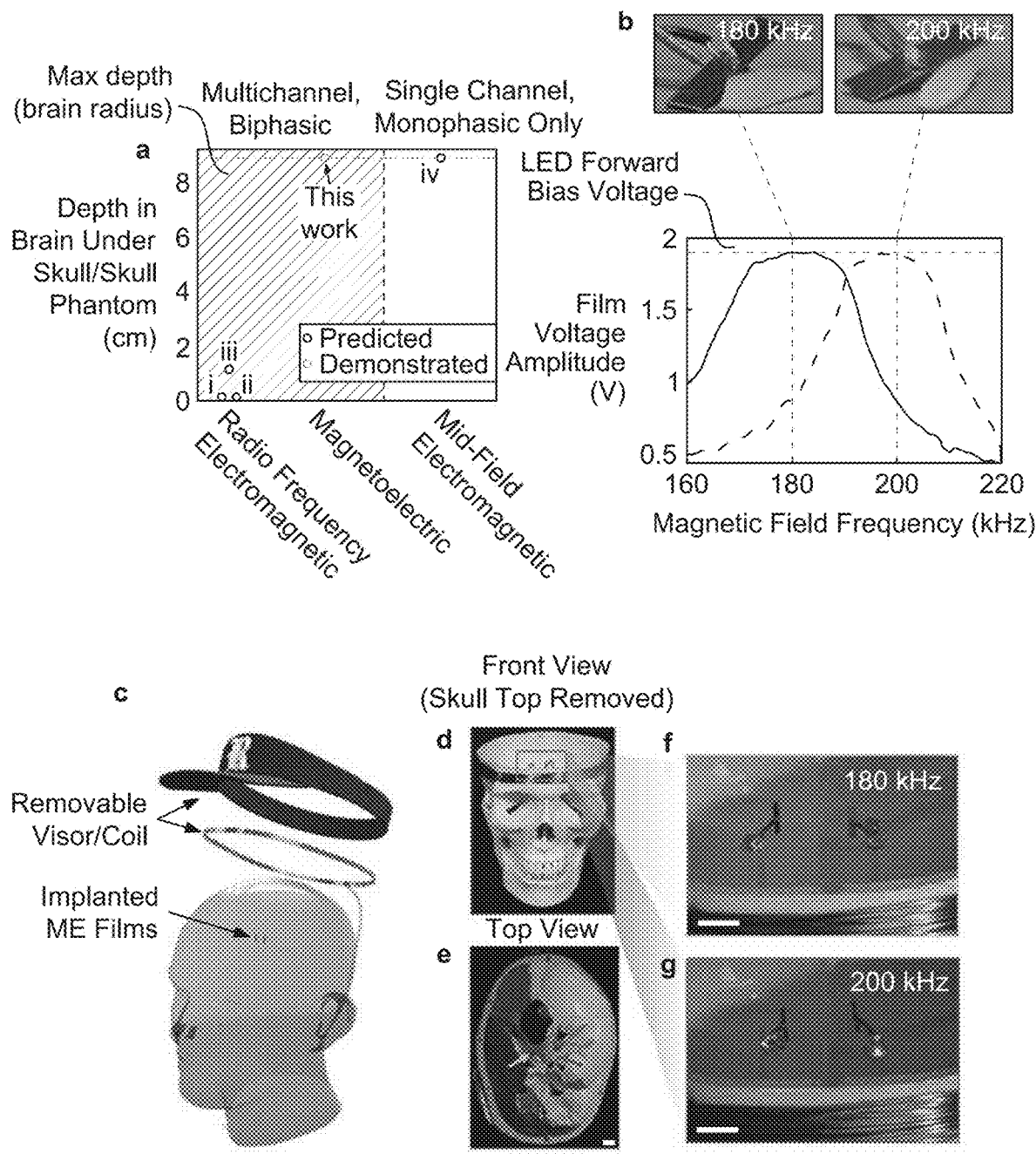
FIG. 16 illustrates aspects of a miniaturized multichannel stimulation in a human skull phantom.

Demonstration of Multichannel Deep Brain Stimulation in Skull Phantom Using Rice-Sized ME Films In addition to supporting experiments in freely moving rodents, ME materials could enable miniaturized wireless stimulators that operate deep in the brain of large animals or human patients and are individually activated with an external electromagnet. To our knowledge, this is the first technology that enables independent external wireless control of multiple miniature stimulators deep beneath a human skull phantom. FIG. 16 shows the predicted depth that various miniature antennas could be safely implanted under the skull and generate 1 mW of power, which is in the approximate maximum power required for high-frequency continuous neural stimulation [31]. As mentioned above, radio-frequency (RF) powered antennas that operate at frequencies above ~1 MHz have limitations in the amount of power that can safely be delivered to an implanted device without causing potentially harmful tissue heating. Simulations show that when operating with the safe power limits, RF-antennas must be placed on the surface of the brain or in very shallow regions to harvest 1 mW of power. "Mid-field" techniques [37], improve the RF coupling efficiency enabling deep operation, but because this approach operates at a fixed frequency there have yet to be demonstrations of individually addressable motes or biphasic stimulation. Other techniques for wireless power delivery discussed previously, such magnetic induction, also cannot achieve deep multichannel stimulation. For example, even using a higher operating frequency of 1 MHz an inductive coil with the same orientation and cross-sectional area as the ME films shown here would require a minimum of 500 turns of wire to generate 2 V using the same 0.5 mT field used here (assuming a typical Q-factor of 10). Thus, devices based on magnetic inductors cannot be miniaturized without sacrificing available power as described previously [9].

FIG. 16 illustrates aspects of a miniaturized multichannel stimulation in a human skull phantom. FIG. 16 panel (a) shows a comparison of effective depth beneath a human skull phantom for ME devices compared to other miniature wireless stimulators. The depth limit is based on safety limits to generate 1 mW. (i: Park et. al, Proc Nat Ac Sci, 2016, ii: Yazdandoost et. al, Asia Pac Microw Conf, 2009, iii: Yazdandoost et. al, Proc 37 Europ Microw Conf, 2007, iv: Agrawal et. al, Nat Biomed Eng, 2017). FIG. 16 panel (b) shows photos of ME films next to a grain of rice and the corresponding voltage as a function of magnetic field frequency (field strength 1 mT, scale bars 2 mm). FIG. 16 panel (c) is a schematic showing potential application of fully implanted ME films with the magnetic field generated by an external coil that can be incorporated into a hat or visor. FIG. 16 panel (d) shows a front view and panel (e) a top view of skull phantom with the top removed to view LEDs (film locations indicated by arrows, scale bar 1 cm). FIG. 16 panel (f) shows a photo of LEDs attached to ME films with the magnetic fields at applied at 180 kHz and FIG. 16 panel (g) shows 200 kHz. Selective illumination of the LEDs corresponding the resonant frequencies of the films demonstrates successful multichannel activation of individual films (scale bars 1 cm). Magnetic field strength was measured to be 0.5 mT at the location of the ME films.

As a proof-of-concept demonstration the inventors show that two rice-sized ME films can be individually addressed at the center of a human skull phantom using an external electromagnet. These two-films with lengths of 8 mm and 10 mm have acoustic resonant frequencies of 180 and 200 kHz, which are determined by the film length. When these films are attached to an orange LED, their output voltage is capped at approximately 1.8 V, which helps to regulate the stimulation voltage and allows us to visualize film activation. ME films of this size are smaller than current DBS leads and could potentially be implanted into deep brain areas as shown in FIG. 16 panel (c). Additionally, the magnetic stimulation coil is small enough to be incorporated into a stylish hat or visor that could be worn comfortably by a patient. When the inventors placed the two ME films at the center of a skull phantom, they found that they could individually illuminate the LEDs on each film when they applied a magnetic field at the resonant frequency of the selected film (FIG. 16 panels [d-g]). For this experiment the inventors used a 400 W power supply, which produced a field of approximately 0.5 mT at the center of the skull phantom. The top of the skull phantom was removed for visualization, but had no effect on our ability to drive the LED indicators. The number of stimulation channels could be increased with the addition of ME films with different resonant frequencies.

To the inventors' knowledge, this is the first demonstration of a miniature, magnetic neural stimulator that: (1) operates in the therapeutic band (100-200 Hz) in freely moving animals; and (2) enables individually addressable miniature stimulators deep within a human skull phantom; however, the advantages of ME materials extend beyond these proof-of-principle demonstrations.

ME stimulators such as the example described in the in vivo rat experiment could have an immediate impact on the study of DBS therapies using rodent disease models. Because the ME stimulator is compatible with commercial implanted electrodes, and the magnetic stimulators can be adapted to a number of standard behavioral experiments or animal enclosures, the ME stimulators disclosed herein could readily replace the wired DBS stimulators currently in use. As a result, new experiments can be developed to probe the effects of chronic and continuous DBS or DBS in social contexts where wired DBS stimulators would be impracticable.

Additionally, ME materials have the potential to enable miniature neural stimulators that can be implanted deep in the brain of large animals or humans and addressed externally with a small electromagnet. As shown here, rice-sized films can be selectively activated based on unique resonant frequencies. Additional miniaturization is not expected to reduce the voltage produced by these films since the voltage depends on the thickness of the piezoelectric field and not the film length (FIG. 7, panel [c]), suggesting that even smaller films could serve as effective=stimulators.

The inventors also foresee applications for ME materials as a wireless power technology for more complex implantable bioelectronic devices. For example, the demonstrated ability of ME films to power LEDs implies that ME materials could power implantable optogenetic stimulators, or small integrated circuits for physiological monitoring.

To realize these fully implantable bioelectronic devices, work is needed to improve ME materials and fabrication processes to reliably produce high-quality miniature ME films, and encapsulate them for chronic use. For wearable technologies, it is also necessary to further miniaturize magnetic field generators so that they can be battery powered and comfortably worn. These advances must also be accompanied by in vivo testing to show safety and efficiency for chronic use.

Overall, ME materials have the potential to fill a key need for wireless power delivery to miniature biphasic neural stimulators and other bioelectronic devices where the major challenge is transferring energy over distances of several centimeters without heating the tissue or suffering loss at interfaces between tissue, bone, and air.

Methods

General Statistical Methods Error bars in FIG. 7 panels (f) and (g) denote +/−one standard deviation for n=~50 data points. The inventors furthermore performed a Tukey's Honest Significant Difference test on the data in FIG. 7 panel (g), which indicated that the voltage produced at each different PVDF thickness is significantly different. Paired t-tests were used for the rotation tests in FIG. 13 panel (e).

Film Fabrication

To fabricate ME films, the inventors used Metglas SA1 alloy (Metglas Inc) for the magnetostrictive layer and polyvinylidene fluoride "PVDF" (precision acoustics) for the piezoelectric layer. The PVDF films used for these experiments were pre-stretched and poled by the manufacturer. The two layers were bonded together using an epoxy capable of transferring the mechanical stress between the two layers (Hardman double bubble red epoxy). Prior to bonding the two layers together, the inventors sputtered a thin layer of platinum (<100 nm) as a top electrode on the PVDF. Both the Metglas and PVDF were plasma cleaned using $O_2$ plasma for five minutes before epoxying. After the epoxy set, the films were cut into the desired rectangular shape using scissors, taking care to cut the long axis of the film along the stretching direction of the PVDF. The inventors then attached wires using conductive epoxy to either side of the films in order to measure the electrical capabilities of the film. The inventors found that attaching wires in the center dramatically increased the resonant voltage. However, for convenience, the wires were attached near the ends of the films during the in vitro experiments. In many cases the inventors also attached additional electronic components such as diodes or LEDs to the wires attached to the films as noted in the appropriate sections in the main text. Finally, the devices were coated in 5-10 µm of parylene-C (Labcoater 2). Initially this coating was used to electrically insulate and protect the devices during in vitro experiments, but the inventors also found that the encapsulation increases the resonant voltage, which could be due to increased mechanical coupling from the encapsulation.

Bench Top Electrolysis Tests

The stimulator shown in FIG. 13 panel (a) was wired to a stereotrode immersed in saline under a microscope in order to observe the formation of bubbles from electrolysis at the tips. During monophasic stimulation the inventors used only one resonant frequency and during biphasic stimulation the inventors used two frequencies as demonstrated above. In each case the pulse time was a 400 µs/phase. The inventors determined the limit of stimulation time as when the first bubble began to appear at the tips of the electrode and repeated each data point 4 times.

Magnetic Field Generation

In the embodiment shown in FIG. 9, each magnetic field generator comprises two major components: (1) Magnetic coils used for the alternating magnetic field (described in the main text and optimized for each experiment) and (2) Electronic drivers to control voltage and timing of the alternating current in the coils (the same for all experiments).

To maintain simplicity, efficiency, and low cost the coils were driven with full H-Bridge style switching circuits. The drivers are designed to deliver high currents to the drive coils in the form of bi-phasic pulse trains. This reduces the cost and complexity of the driver itself, as well as the power supply and control circuitry when compared to arbitrary function generators. The design also has potential for improved operational efficiency through impedance matching with the drive coils. Furthermore, it is also possible to regulate power delivered to the drive coils on the fly by adjusting the duty cycle of the current pulses, allowing power being delivered to the ME film to be easily controlled digitally while maintaining the resonant carrier frequency. The output carrier and pulse frequencies of the magnetic field are generated using a TeensyLC board and custom Arduino code to generate the specific pulse timings to deliver controlled ME stimulation (FIG. 9, panels [c] and [d]).

These coils and drivers can be combined in different ways to generate the appropriate field for a given experiment. For example, the setup used to generate the alternating field in the in vivo rotation experiments comprised four sets of coils each with five turns powered by one driver with all four drivers synced to the same output signal. In this way the inventors can generate sufficient power to generate a mT-scale magnetic fields over the whole behavioral area (FIG. 14 panel (a)].

Cell Culture

For experiments performed on coverslips, HEK cells expressing sodium channel $Na_{1.3}$ and potassium channel $K_{2.1}$ were grown on 12 mm poly-l-lysine coated coverslips to approximately 30% confluency. The cells were then transfected with the genetically encoded voltage indicator ArcLight using Lipofectamine (Invitrogen) following manufacturer's recommendations. Two to three days after transfection the coverslips were inverted onto ME films for testing. Preparation of GFP controls followed the same procedure with the exception of replacing the ArcLight vector (AddGene) with a GFP expression vector (AddGene). For experiments performed with cells grown on the films, HEK cells transfected with ArcLight were placed onto parylene coated poly-l-lysine treated films. The films were placed in cellular media overnight and tested the following day.

ArcLight and GFP were excited at 460 nm with an LED light source. Fluorescence images were collected at 33 fps using a CCD camera. Images were analyzed using Matlab to quantify fluorescence changes in individual cells. In vitro testing was performed in extracellular buffer (ECB, in mM: NaCl 119, KCl 5, Hepes 10, CaCl2 2,671 MgCl2 1; pH 7.2; 320 mOsm).

FIG. 11 panel (b) was obtained by growing unmodified HEK cells on a film submerged in cellular media for five days. The cells were then stained with Hoechst and Calcein-AM to label the nucleus and membrane respectively in living cells. The cells were then fixed and imaged using a confocal microscope.

Mouse Brain Slice Procedures

The inventors used 40-day old GAD2-GCaMP3 mice, generated by crossing GAD2-Cre (JAX #10802) with flox-GCaMP3 (JAX #14538) animals. Preparation of brain slices followed procedures described by Ting et al. 45 and was carried out in accordance with National Institutes of Health guidelines and approved by the UTHealth animal welfare committee. Mice were deeply anesthetized with Isoflurane and perfused with ice cold NMDG-based solution comprising (in mM): 92 NMDG, 2.5 KCl, 1.25 $NaH_2PO_4$, 10 $MgSO_4$, 0.5 $CaCl_2$, 30 $NaHCO_3$, 20 glucose, 20 HEPES, 2 thiouera, 5 Na-Ascorbate, 3 Na-pyruvate, saturated with 95% $O_2$ and 5% $CO_2$, at a rate of ~6 ml/min. Coronal brain slices (300 µm) were cut using a vibratome (Leica VT1200S), incubated for 15 min at 35° C. in NMDG solution, and then transferred to a chamber held at room temperature containing (in mM): 92 NaCl, 2.5 KCl, 1.25 $NaH_2PO_4$, 2 $MgSO_4$, 2 $CaCl_2$, 30 $NaHCO_3$, 25 glucose, 20 HEPES, 2 thiouera, 5 Na-Ascorbate, 3 Na-pyruvate, saturated with 95% $O_2$ and 5% $CO_2$. For experiments, slices were placed into a recording chamber perfused with ACSF containing (in mM): 126 NaCl, 2.5 KCl, 1.25 $NaH_2PO_4$, 2 $MgCl_2$, 2 $CaCl_2$, 26 $NaHCO_3$, 10 glucose), held at 32-34° C. using a 695 inline heater. NBQX (10 µM) was included in the bath solution to block AMPA receptor-mediated synaptic transmission. The stereotrode was placed in layer 5 of somatosensory (barrel) cortex.

GCaMP3 was excited at 460 nm with an LED light source. Fluorescence images were collected at 9.8 fps using a CCD camera attached to an Olympus BX51WI microscope. Images were analyzed using Matlab to quantify fluorescence changes in 600×600 µm regions around the stereotrode tips.

Implant Design and Rat Surgical Procedures

Two male Long-Evans rats (n≈1,400 g) were anesthetized with isoflurane gas. Five percent isoflurane was used to induce anesthesia and two percent was used to maintain anesthetic depth. Buprenorphine (0.04 mg/kg) was administered 30 minutes prior to ear bars for analgesia. 5-7 skull screws were placed to anchor the electrode array. Skull screws were bound to skull with Metabond dental acrylic. A craniotomy was made to accommodate the micro electrode array and expose an injection site for neurotoxin. A 30-gauge needle bent at the tip cut and pulled away the dura mater covering of the brain. Desipramine (DMI) reconstituted in saline at a concentration of 15 mg/mL was injected IP to protect noradrenergic neurons. The dose of DMI was approximately 15 mg/kg and injected approximately 30 minutes prior to administration of neurotoxin. To induce a hemiparkinsonian lesion, 8 ug of 6-hydroxydopamine (OHDA) at 2 µg/µL in saline was injected at 0.2 uL/min into the mid forebrain bundle (MFB −1.2 ML, −4 AP, and −8.1 DV). STN stimulation was delivered via a 2×2 platinum iridium microelectrode array (Microprobes) with 600×600 µm spacing of 75 µm electrodes. Each electrode had a nominal 10 kOhm impedance. The electrode array was lowered to −2.6 ML, −3.6 AP, and approximately −8.2 DV from bregma. The array was fixed to the skull with dental acrylic. All experiments were approved by the Institutional Animal Care and Use Committee of Rice University.

Prior to stimulating each rat with the magnetoelectric stimulator, the stimulator power was estimated via a benchtop approximation of the rodent electrode impedance. Constant current stimulation of the rodent brain with an A-M Systems 4100 stimulator produced characteristic voltage waveforms that approximated a simplified parallel RC circuit. A 56 kOhm resistor, and 440 pF capacitor in parallel closely approximated the impedance characteristics of the rat brain across the stimulating electrodes. Using this circuit model, the inventors estimated the field strengths and pulse durations necessary to produce the desired stimulation effects and confirm that the stimulation was charge balanced prior to rodent experimentation.

Rotation Test Experiments

Prior to performing the rotation tests the rat was briefly anesthetized with 5% isoflurane gas and injected intraperitoneally (IP) with methamphetamine (0.31 ml 1.25 mg/kg) and the wireless biphasic stimulator was plugged into the implanted electrode array. After the anesthesia had worn off (about 5-10 min) the rat was placed in the cylindrical behavioral chamber. The magnetic field was applied over the whole behavioral area to the films on the device (FIG. 14 panel [a]).

The magnetic field was applied on resonance and off resonance for one minute at various times during the 40-minute trial. The resonant frequencies were 73 kHz and 747 77 kHz and the off resonant frequencies were 63 kHz and 87 kHz.

Rodent Tracking

Head position on the rotation task was generated using a slightly modified version of DeepLabCut [46] to track ears, snout, and implant. A dataset totaling 286 frames from both the on and off resonance rotation tasks was hand labeled and trained for approximately 140,000 iterations.

Skull Phantom Demonstration

At the magnetic field frequencies used for this experiment bone and tissue are effectively transparent [47], so the inventors selected a life-sized skull with the size of an average human adult head as a phantom (Orient Infinity Limited). It was wrapped with 18 AWG magnet wire as shown in FIG. 16. The coil comprised four coils in parallel each wired to an individual magnetic field driver. All drivers were wired to the same input frequency signal and powered from the same power supply. The films were suspended at the center of the skull phantom. Orange LEDs (Chanzon) with a diode antiparallel were attached to the films for wireless verification of the voltage generated by the films. For visualization purposes the skull top was removed to better photograph the LED.

Zinc Oxide (ZnO) Embodiments

Figure 17:
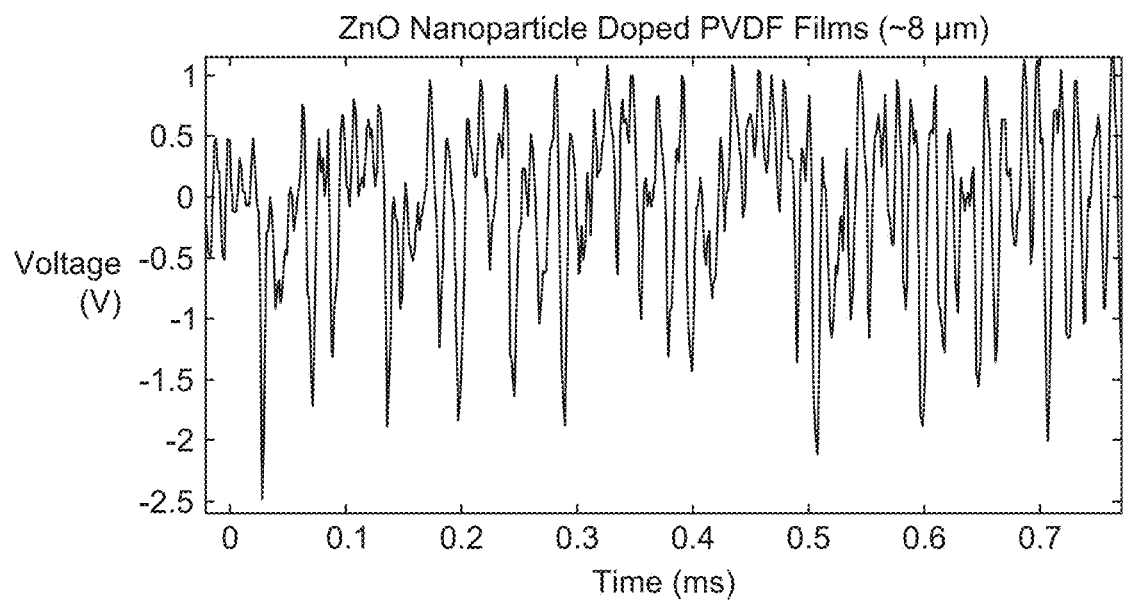
FIG. 17 illustrates voltage over time for a ZnO nanoparticle doped PVDF/Metglas film.

As previously discussed, certain embodiments may include zinc oxide (ZnO) nanoparticle doped films. Referring now to FIG. 17, a graph illustrates voltage over time for a ZnO nanoparticle doped PVDF/Metglas film that is approximately 8 µm resonating at approximately 70 kHz. When deviating from the resonant frequency, the voltage drops down to zero.

Fabrication Methods

In preliminary trials, following a similar procedure from Dodds et al., PVDF-TrFE, a modified PVDF molecule less sensitive to temperature, is dissolved in the solvents methyl ethyl ketone and butanone at 20% w.t. % [49]. The ZnO nanoparticles (approximately 13 nm in diameter) were added at approximately 10% weight fraction to the solution, and the solution was placed into a bath sonicator for more than 6 hours. The solution was then spun coat twice onto a 3×3 cm piece of Metglas at approximately 3000 RPM for 45 seconds yielding a film thickness of approximately 8 µm. The laminate was then thermally annealed at 150 C and electrically poled in the custom-built Corona Poling Setup. This led to one batch of films out of 4 that had higher voltages and self-rectification properties. (see FIG. 17). Challenges included the reproducibility of the results, where ZnO nanoparticles were insoluble in the PVDF solution especially at higher weight percentages. To the inventors' knowledge, there does not exist evidence in the literature showing self-rectifying behavior of PVDF-TrFE mixed with nanoparticles.

PVDF-ZnO nanowire materials that reliably demonstrate self-rectification behavior are known [50]. As the ZnO nanowires are grown in situ, it acts as a self-adjustment diode to control the output of the hybrid material.

In certain fabrication methods, the concentration of PVDF in solvents will remain the same (20% w.t. in MEK and Butanone). Instead of using ZnO nanoparticles, certain embodiments may grow ZnO nanowires from ZnO nanoseeds. Potential embodiments may use Zn(Ac2) (Zinc Acetate) as the seeds and mix it with PVDF solution. The hybrid solution can also then be spun coated onto a Metglas substrate.

Figure 18:
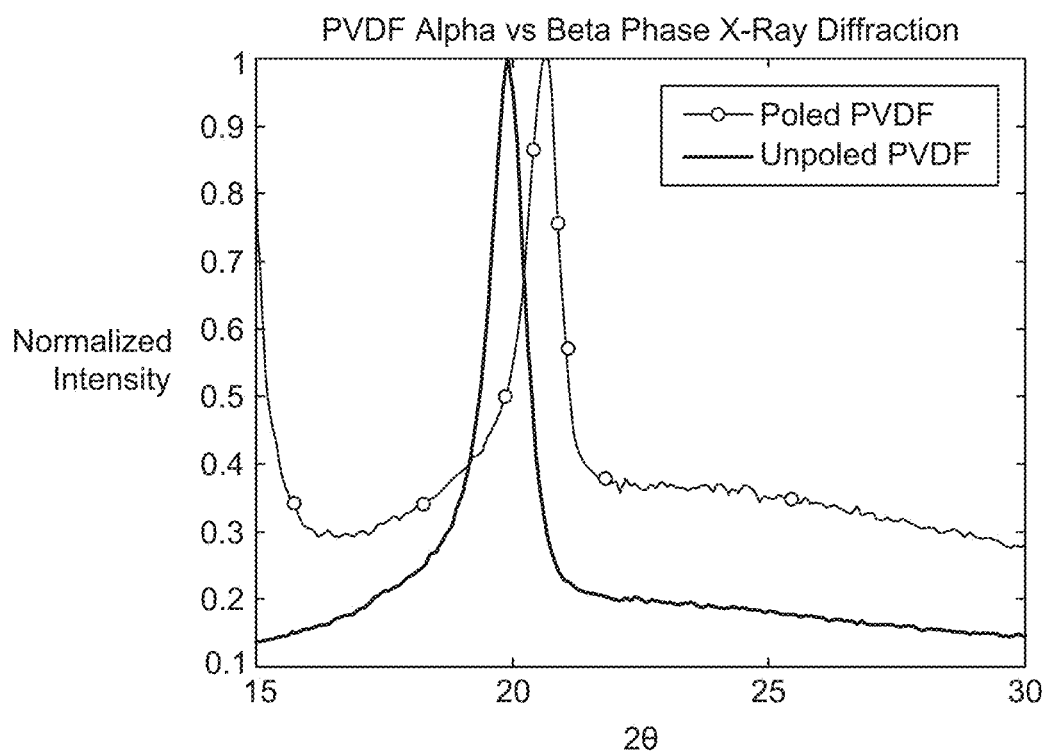
FIG. 18 illustrates x-ray diffraction data showing the poling of PVDF with alpha and beta phase peaks of PVDF.

In certain embodiments, the thin film can be placed into an aqueous solution of ZnNO3 (Zinc Nitrate) and nanowires are naturally grown at 80 C for 6 hours. The timing and termination of reaction will depend on the size of nanowires that are desired. Furthermore, because the PVDF is naturally stressed due an extension force by ZnO NW growth, the PVDF material is naturally formed into the piezoelectric beta phase. However, if the poling is insufficient, the inventors can also electrically pole the material with a corona poling setup. The final product will be probed to test with microwires and measure voltages at resonant frequencies. SEM imaging can also be used to verify ZnO NW growth in the film and x-ray diffraction for verifying that films are in the beta piezoelectric conformation. FIG. 18 illustrates x-ray diffraction data showing the poling of PVDF with alpha and beta phase peaks of PVDF, which can be used to verify films post ZnO nanowire growth.

Figure 19:
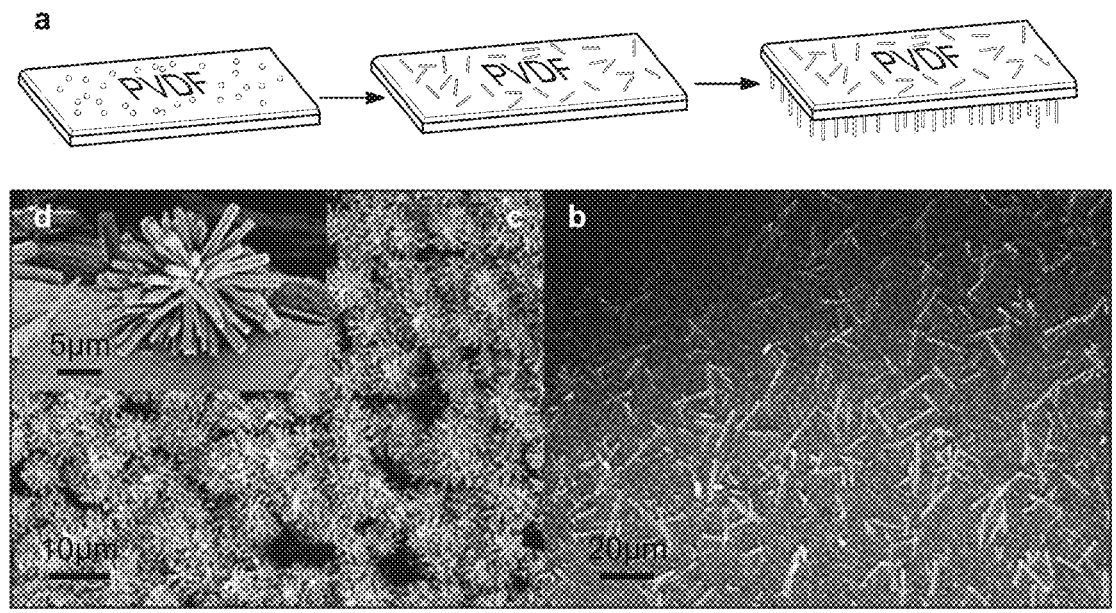
FIG. 19 illustrates aspects of ZnO/PVDF film fabrication.

FIG. 19 illustrates aspects of ZnO/PVDF film fabrication. Panel (a) of FIG. 19 shows the incorporation of zinc acetate into PVDF solution to serve as nanoseeds, which form a film and grow nanowires in zinc nitrate. Panel (b) shows a scanning electron microscope (SEM) image of ZnO nanowire grown in PVDF. Panel (c) shows an SEM image of ZnO nanowire on the surface of the PVDF, while panel (d) of FIG. 19 shows a close-up view of the ZnO nanowires.

Figure 20:
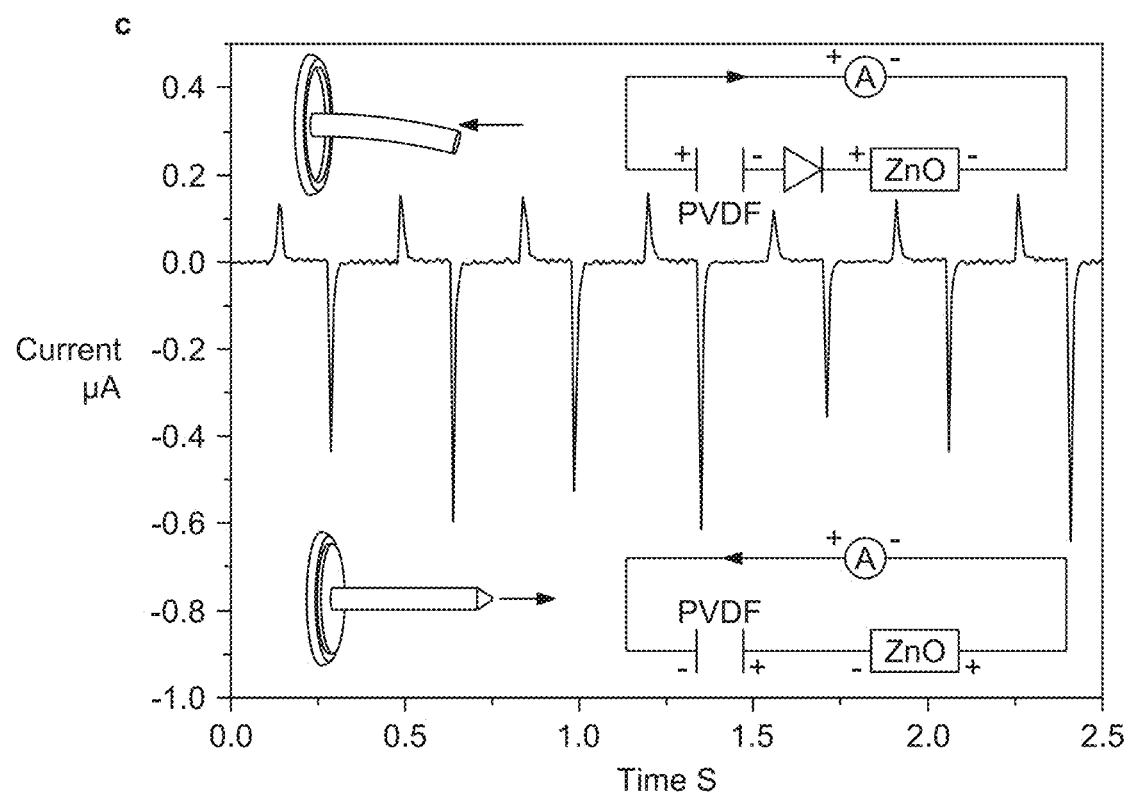
FIG. 20 illustrates self-rectification of current for a PVDF/ZnO nanowire hybrid material used as an energy harvester when a finger presses on the material.

FIG. 20 illustrates self-rectification of current for a PVDF/ZnO nanowire hybrid material used as an energy harvester when a finger presses on the material.

Figure 21:
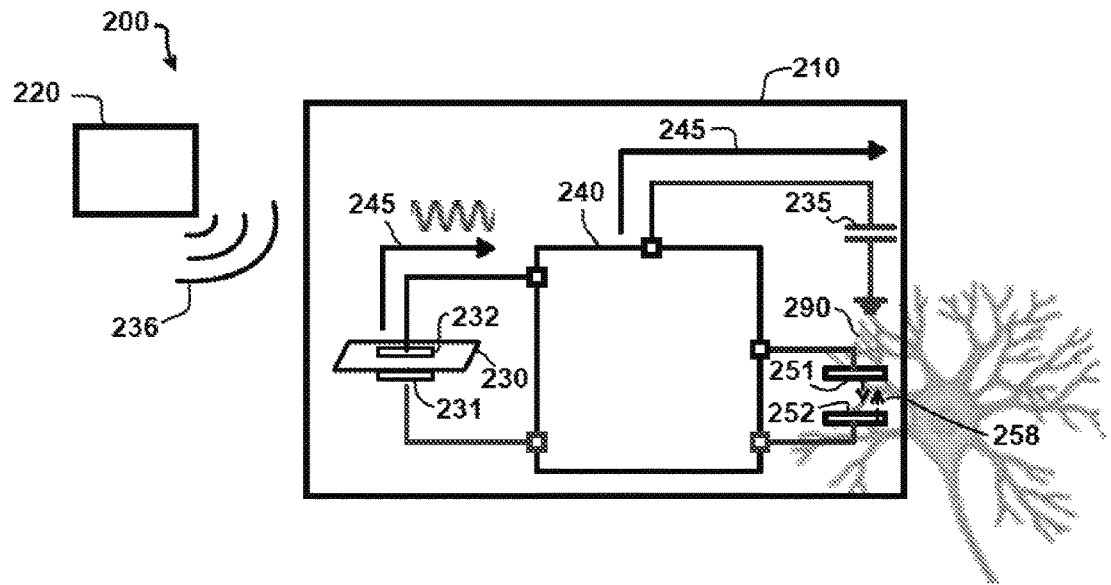
FIG. 21 illustrates a schematic diagram of an exemplary embodiment of the present disclosure.

Referring now to FIG. 21, an apparatus 200 comprises an implantable wireless neural stimulator 210 and a magnetic field generator 220 configured to generate a magnetic field 236 at one or more input frequencies. In the embodiment shown, implantable wireless neural stimulator 215 comprises a magnetoelectric film 230, a charge storage element 235, an electrical circuit 240, a first electrode 251, and a second electrode 252. In this embodiment, electrical circuit 240 is coupled to magnetoelectric film 230 via first and second electrodes 231 and 232. Exemplary embodiments of the present disclosure may sometimes be referred to herein as "Mag-Dust" or "MagMote" devices.

In certain embodiments, magnetoelectric film 230 is configured to produce an electrical signal 245 when magnetoelectric film 230 is stimulated by the magnetic field at a particular input frequency. Electrical circuit 240 can be configured to modify electric signal 245 to charge the charge storage element 235, which in particular embodiments may be a capacitor. In addition, electrical circuit 240 can be configured to transmit data to components of implantable wireless neural stimulator 210 and can be configured to provide a stimulation output 258 to third electrode 251 and fourth electrode 252. In the embodiment shown, stimulation output 258 can be used to stimulate nerve tissue 290, and in particular embodiments third electrode 251 and fourth electrode 252 may be configured as a stereotrode.

Figure 22A:
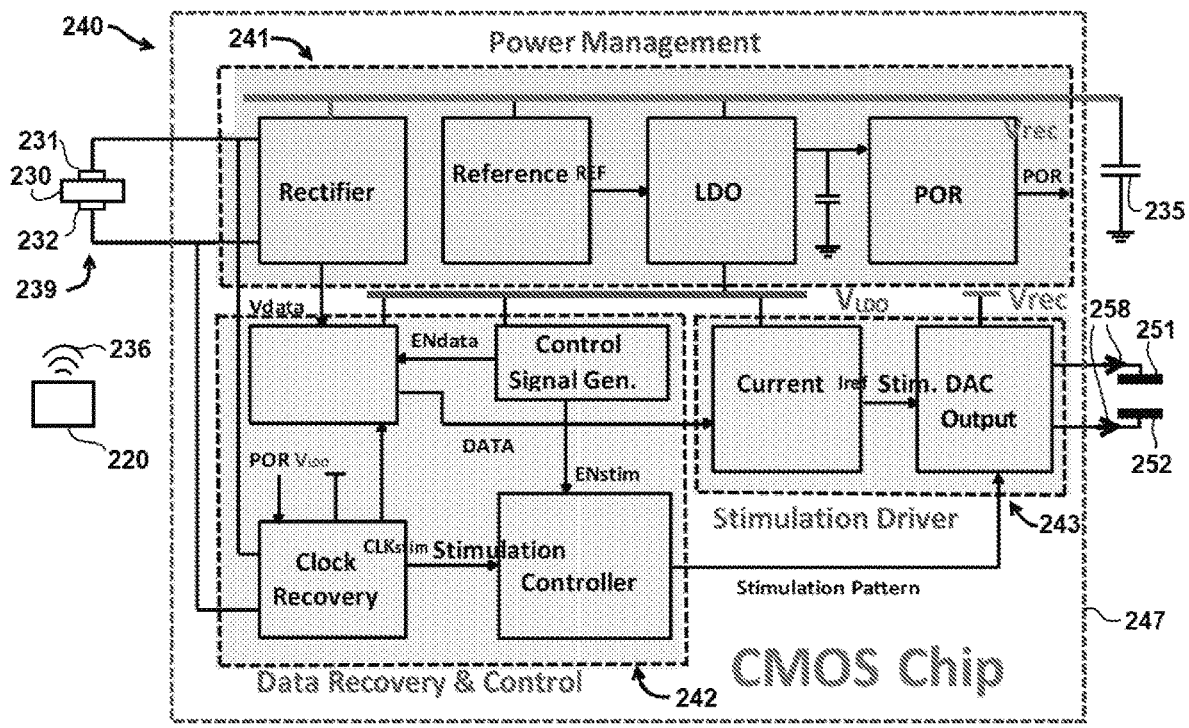
FIG. 22A illustrates a diagram of an electrical circuit of an exemplary embodiment of the present disclosure.
Figure 22B:
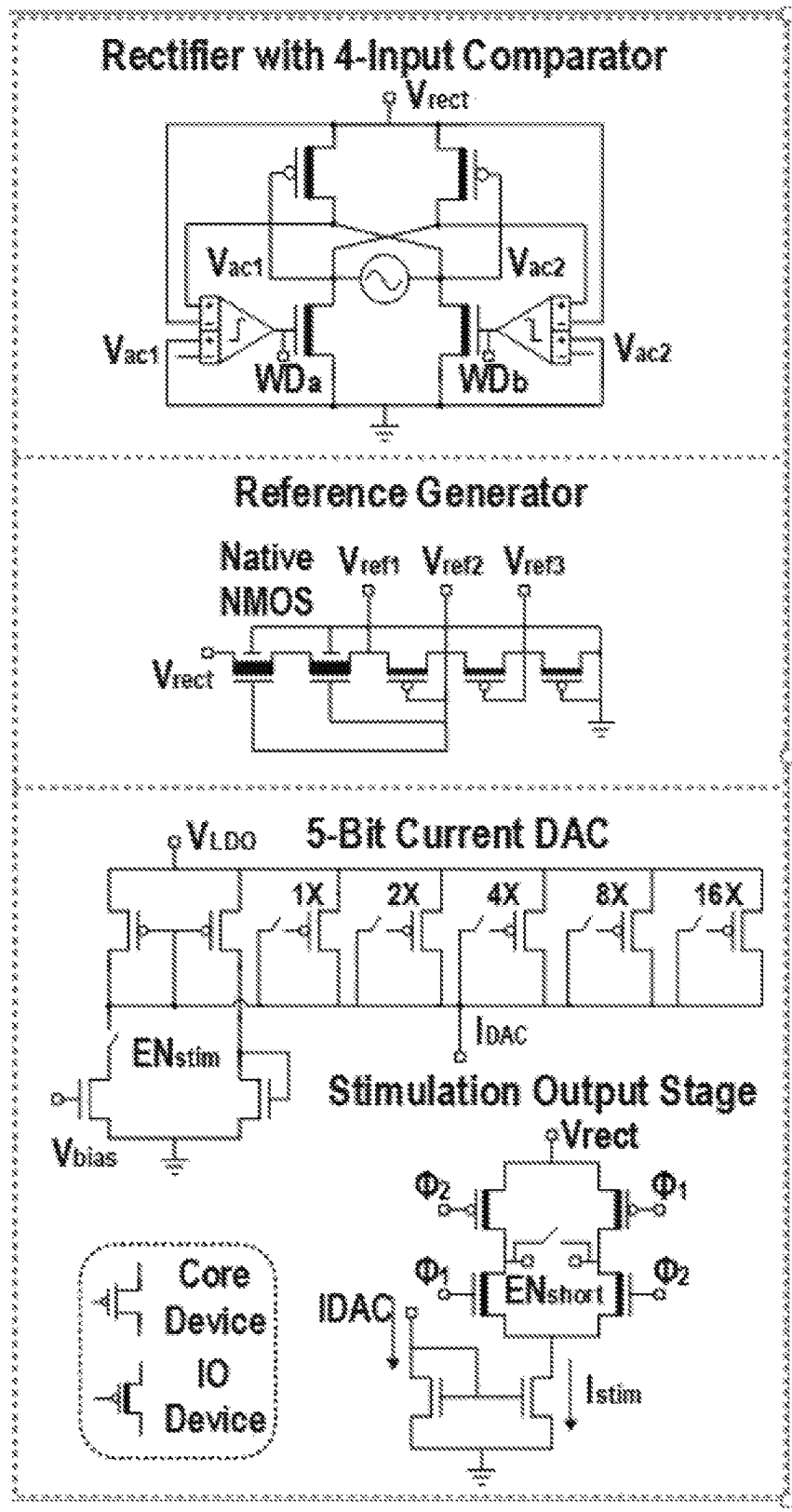
FIG. 22B illustrates circuit diagrams of an active rectifier, a native MOS-based voltage reference, and a 5-bit programmable stimulation driver.

Referring now to FIGS. 22A and 22B, an exemplary embodiment with particular components of electrical circuit 240 is shown. It is understood that this embodiment is merely one example, and that other embodiments of electrical circuit 240 may comprise different components or a different arrangement of components than those illustrated in FIGS. 22A and 22B. In this embodiment, electrical circuit 240 comprises charging module 241 configured to provide power management and charging of charge storage element 235. In addition, the illustrated embodiment of electrical circuit 240 comprises a data module 242 configured to provide data transfer and control. The embodiment of electrical circuit 240 shown in FIG. 22A also comprises a stimulation driver module 243 configured to provide stimulation output 258 to third electrode 251 and fourth electrode 252. In this embodiment, charging module 241 comprises a rectifier, a reference generator, a low dropout (LDO) linear voltage regulator, and a power-on-reset (POR). The illustrated stimulation driver module comprises a reference current generator and a current digital-to-analog (DAC) converter. In addition, the illustrated data module comprises a control signal generator, a stimulation controller, and a clock recovery module. FIG. 22B illustrates circuit diagrams for specific embodiments of the rectifier, the native MOS-based voltage reference, and the 5-bit programmable stimulation driver. Additional discussion of operational aspects of electrical circuit 240 and specific components is provided below in the section entitled "Example" below.

In exemplary embodiments electrical circuit 240 comprises a complementary metal-oxide-semiconductor (CMOS) chip 247 that can interface with a ME transducer 239 incorporating magnetoelectric film 230 to receive power and commands (e.g. through data transfer), and drive programmable electrical stimulation. In the embodiment shown, AC voltage induced on magnetoelectric film 230 is first converted to a DC voltage with an efficient active rectifier driven by 4-input differential comparators. The energy can be temporarily stored in charge storage element 235 for the next stimulation phase. In particular embodiments, a low-dropout regulator will provide a stable 1V supply to the rest of the system (except stimulation), to reduce their power consumption and effectively increase the load impedance of the application-specific integrated circuit (ASIC).

Figure 23:
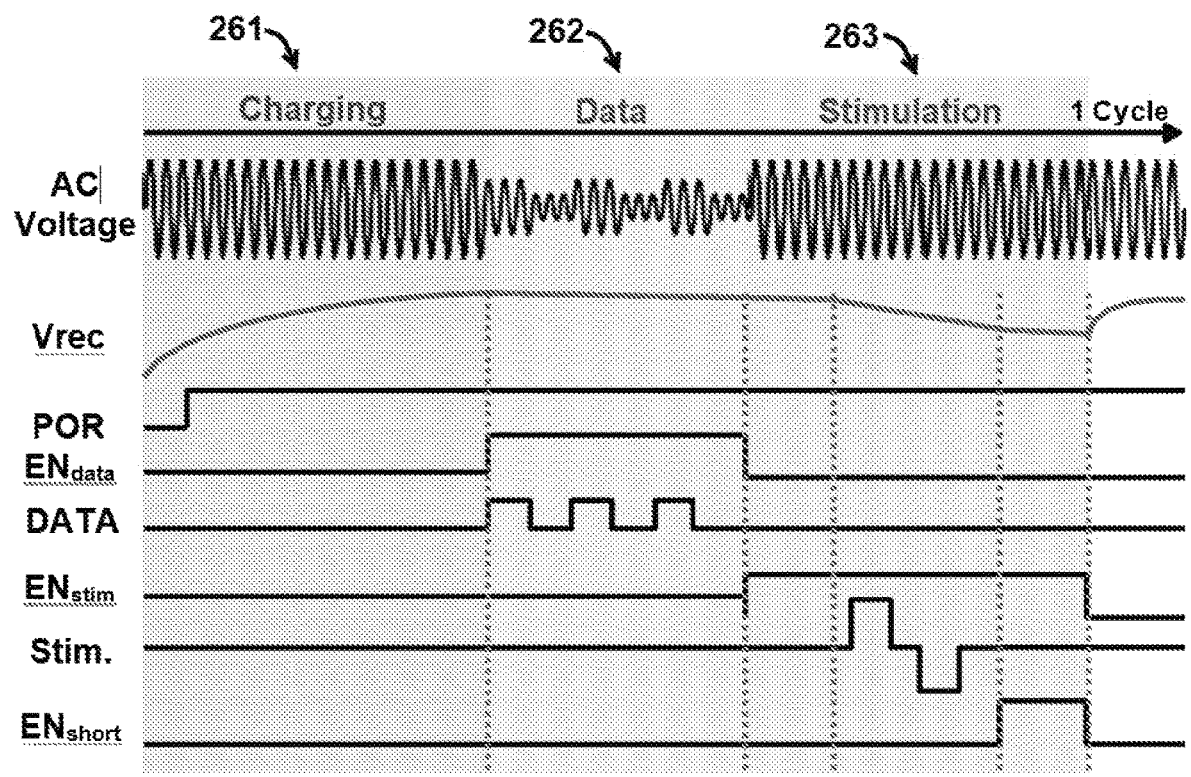
FIG. 23 illustrates charging, data and stimulation waveforms for an exemplary embodiment of the present disclosure.

As shown in FIG. 23, the ASIC can cycle through a charging step 261, a data receiving step 262, and a stimulation step 263. In particular embodiments, downlink data transfer will be performed with amplitude shift keying (ASK) modulation of the magnetic field (shown in FIGS. 21 and 22A). Received data can be used to program system operation and stimulation modes. An integrated stimulation driver can be used to drive electrodes 251 and 252 (shown in FIGS. 21-22) with current-regulated biphasic pulses, covering a wide range of therapeutic-relevant stimulation patterns (e.g. 0-200 Hz frequency, 30-1500 µA amplitude, and 50-500 µs pulse width).

One challenge to the ASIC design is to maintain reliable operation when the amplitude of voltage induced on ME transducer 239 varies under different distance and angle between the ME transducer 239 and magnetic field generator 220. Exemplary embodiments can address this by maximizing the power conversion efficiency of the device, and making the system adaptive to environmental conditions, controllable by external transmitters, and calibration-free.

These properties may be achieved with three circuit and system features: (1) optimized power interface to the ME transducer with different materials; (2) an adaptive ME-based data receiver to reliably initiate data transfer and decode data, even when the ME-induced voltage changes; and (3) low-power and calibration-free circuits to minimize the ASIC's quiescent power and maximize the energy available for stimulation.

CMOS Power Interfaces to ME Transducers

Enhancing the power conversion efficiency of Mag-Dusts to extract more usable power from a low-strength magnetic field is critical in realizing our aims on, (1) reliable operation under large physical distance and angle variations, and (2) wearable battery-powered transmitters. To miniaturize the implants, no battery will be integrated into the Mag-Dusts, which will be continuously powered by the external magnetic field. Within each cycle, all harvested energy will be used for stimulation and system operation or wasted. As a result, it will be more efficient to extract a high voltage directly from the ME transducers than pursuing the maximum power point with a low-efficiency DC-DC up-converter as in most ambient energy harvesters. To maximize usable power in Mag-Dusts, the inventors will study ME transducer's electrical model, Mag-Dusts' power management, and impedance matching between ME transducers and ASICs.

Figure 24:
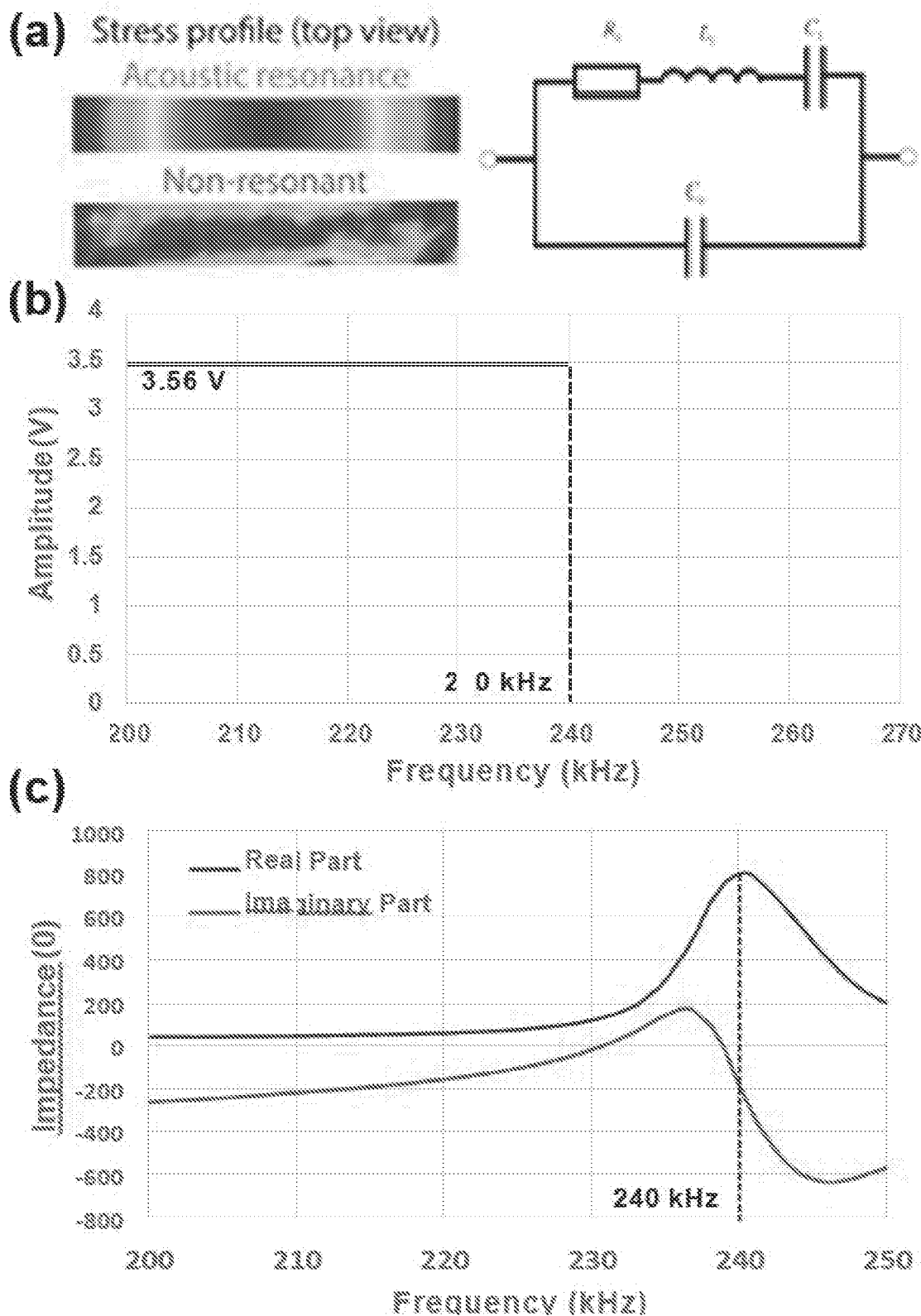
FIG. 24 illustrates Characteristics of ME transducers. (a) ME material's equivalent circuit model and a preliminary COMSOL simulation. (b) Induced voltage maximizes at mechanical resonance. (c) impedance of ME transducers (with PZT) over magnetic field frequency.
Figure 25:
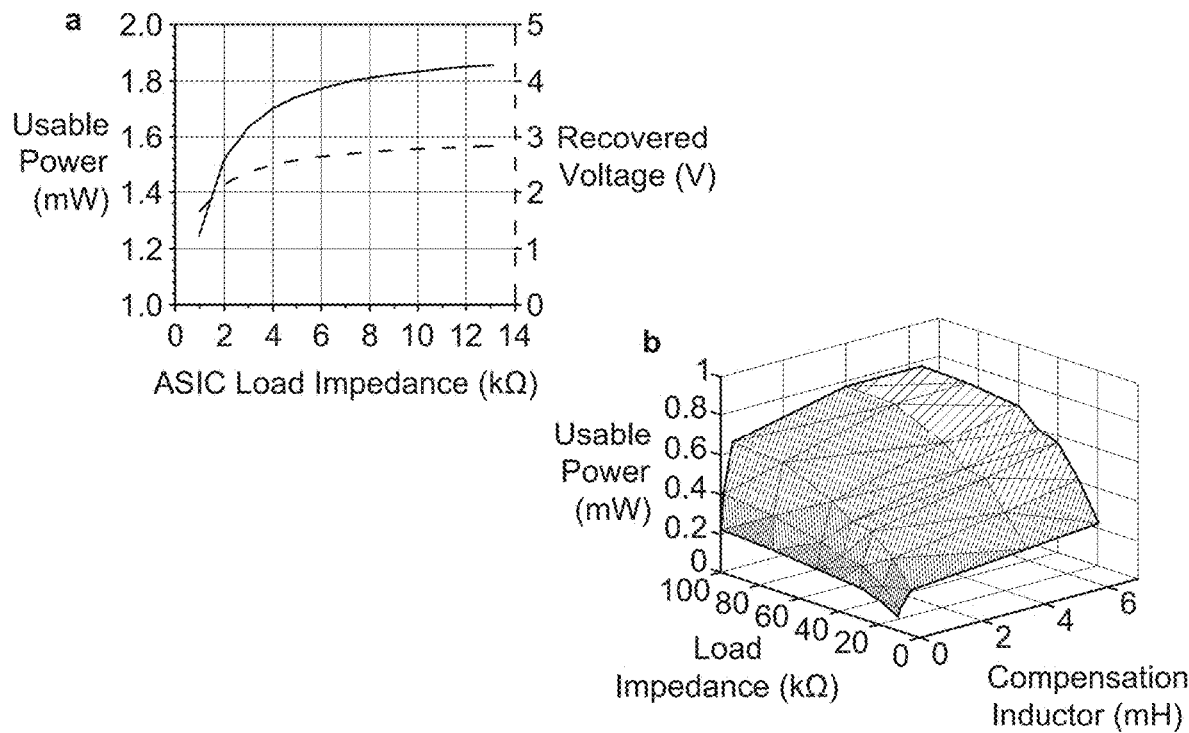
FIG. 25 illustrates usable power under impedance matching between ASIC and ME transducer with (a) purely resistive impedance, and (b) capacitive impedance.

An electrical model of the transducer is useful for interface design and co-optimization of transducers and circuits. Magnetoelectric laminate composites can be modeled with an RLC model shown in FIG. 24 panel (a). This model can be calibrated with COMSOL physical simulations and measurements of nanofabricated samples. As shown in FIG. 23 panels (b) and (c), a ME transducer nanofabricated with PZT piezoelectric materials induces a peak voltage at the mechanical resonant 240 kHz, and two purely resistive effective electrical resonant frequencies. It should be noted that some ME materials (like PZT) show purely resistive impedance at resonance, similar to ultrasound transducers [10], while others (like PVDF) are capacitive around resonance.

development of exemplary embodiments resulted in a significant observation about wirelessly powered battery-less devices. In particular, the maximum load power (e.g. the stimulation phase in most cases) equals the effective recharging power to charge storage element 235 (shown in FIGS. 21-22). In contrast to the classical power transfer model where increasing load impedance reduces received power, available power stored on the charge storage element actually increases with the received voltage. Preliminary simulation results (based on the ME model in FIG. 24) confirm this behavior and imply the importance of reducing ASIC's effective load impedance by reducing its quiescent power, as shown in FIG. 25 panel (a). FIG. 25 illustrates usable power under impedance matching between ASIC and ME transducer with purely resistive impedance as shown in panel (a), and capacitive impedance as shown in panel (b). Compared to directly attaching the ME transducers to the electrodes with an impedance of a few kiloohms, the effective load impedance of the ASIC can be as large as tens of kiloohms in certain embodiments.

In agreement with prior studies of PVDF materials, the inventors' preliminary measurement of a mm-sized ME films based on PVDF shows a capacitance of 68 pF at 150 kHz resonance. Since lead-free PVDF is potentially more bio-compatible than PVT, the inventors will study circuit interfaces to PVDF-based ME transducers to accommodate their characteristics distinctive from other commonly seen energy harvesters. One challenge is to compensate the capacitive impedance of ME transducers to maximize power harvesting. One method to achieve this is to add a serial inductor. However, as shown in FIG. 25 panel (b), a milli-Henry inductor is necessary to achieve the targets, which is challenging because inductors of these values are only possible with bulky discrete components. To overcome this challenge, the inventors will explore the principle of emulating inductors with multi-phase flipping capacitors [41] for impedance compensation. The inventors will investigate its circuit implementation for PVDF-based embodiments, and the reduction of required on-chip capacitance by adding more phases and exploring new switched capacitor topologies.

Adaptive Data Reception

Amplitude shift keying (ASK) is suitable for low-power data communication to implanted devices when high data rate is not required. Because the large inductor necessary for mT-strength magnetic field generators prevents fast switching between different amplitudes, certain embodiments may indirectly modulate the voltage induced on ME transducers by modulating the AC magnetic field's frequency. However, adopting this amplitude modulation scheme presents three challenges: (1) the large energy storage capacitor limiting the switching speed of rectified DC voltage; (2) varying resonant frequencies and voltage conversion efficiencies of ME transducers due to fabrication variations; and (3) unpredictable ME-induced AC amplitude dependent on physical conditions, such as the distance and alignment between the ME transducer and transmitter.

Figure 26:
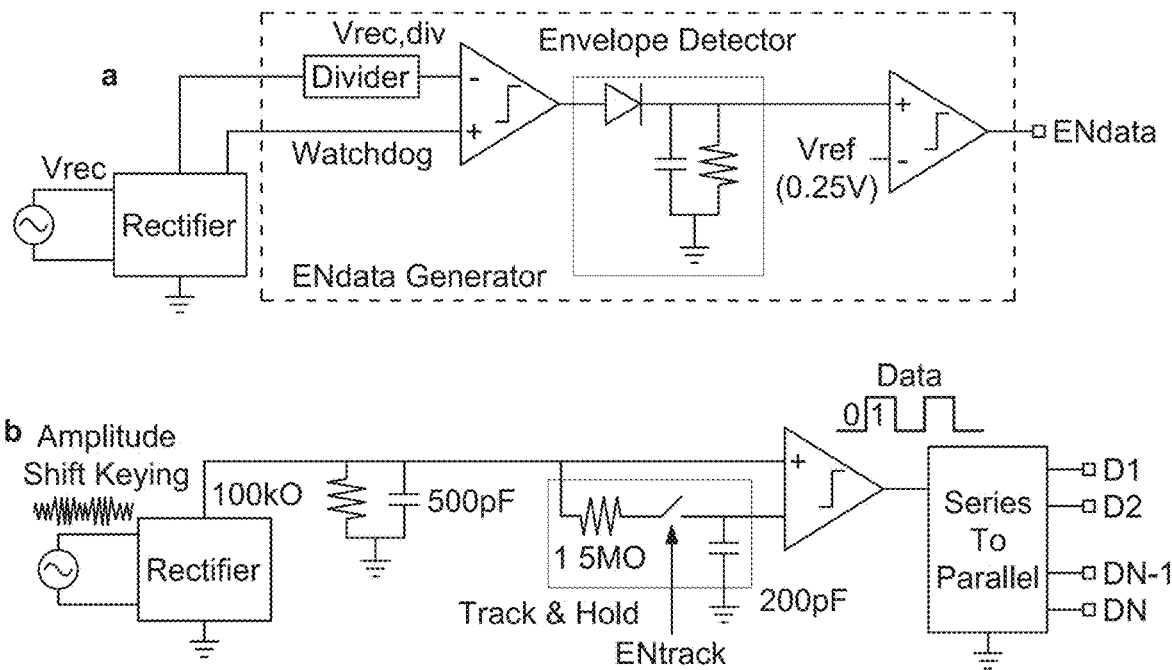
FIG. 26 illustrates a proposed adaptive data receiving scheme; (a) circuits for mode switching; and (b) adaptive threshold voltage generation and data reception.

To avoid the large off-chip capacitor during data receiving, exemplary embodiments may employ a dual-path structure, one for power delivery and one for data receiving. The inventors propose to control the switching between the two paths with a watchdog logic, which monitors changes in ME-induced voltage. As shown in FIG. 23 panel (b), the transmitter is designed to reduce the average amplitude of ME-induced voltage during data transmission. In practice, exemplary embodiments will leverage the existing comparator in the active rectifier as a zero-overhead mode-switching watchdog. The comparator can generate a train of narrow pulses when the input's amplitude is lower than the voltage stored on the energy capacitor. Exemplary embodiments can extract the envelop of this pulse train as the enable signal for data transmission, as shown in FIG. 26 panel (b). In this way, the external transmitter (e.g. magnetic field generator 220 shown in FIGS. 21 and 22) will have control of the durations of charging and data transmission steps.

Figure 27:
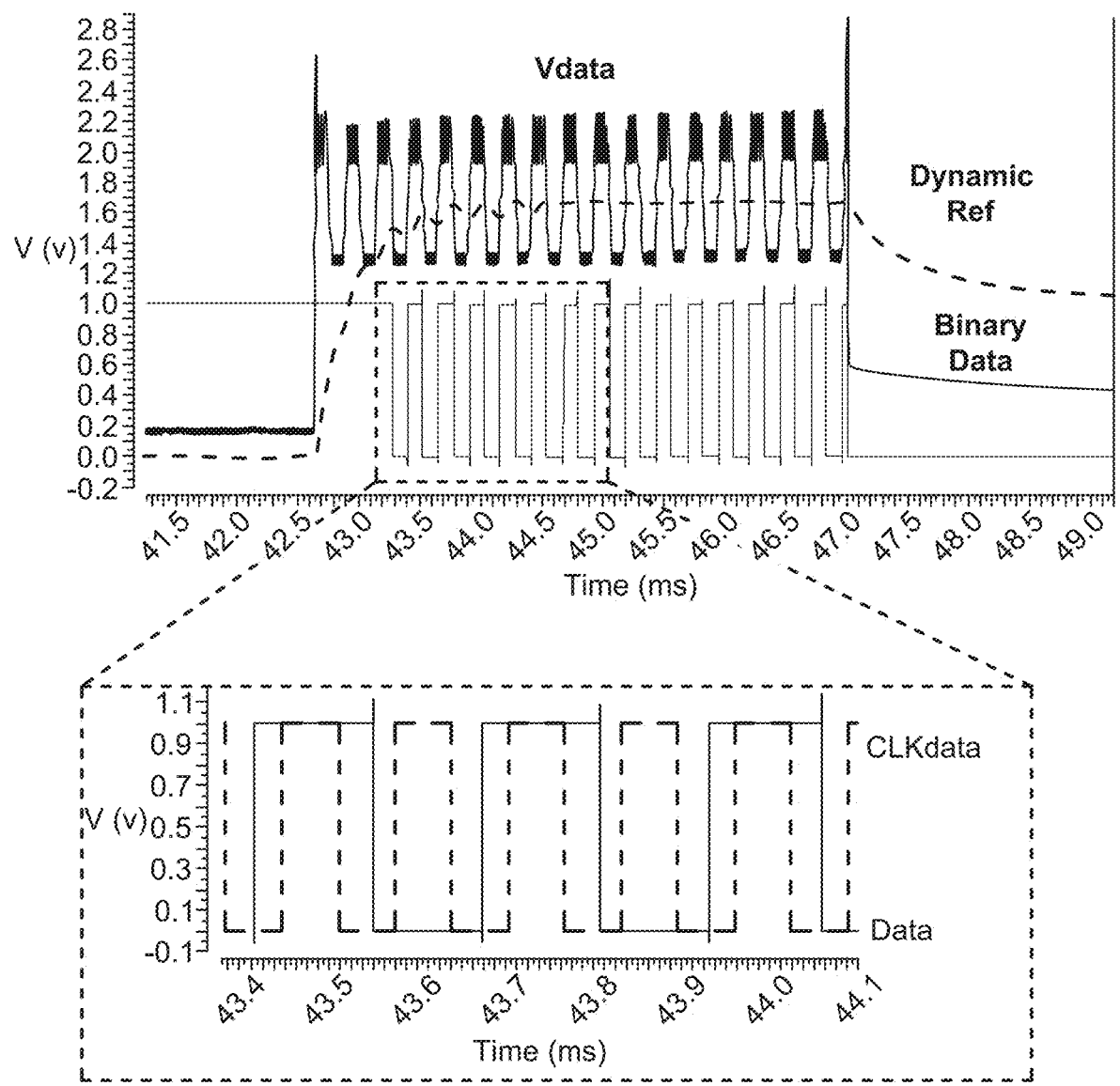
FIG. 27 illustrates simulated waveforms of adaptive data reception.

To synchronize the data sampling clock and the threshold voltage between the transmitter and the implant under fabrication and environmental variations, state-of-the-art miniature implants all rely on individually characterizing each fabricated device and calibrate the transmitter to it [10-12]. This approach suffers from three major draw-backs: (1) testing and storing these settings increase deployment complexity and require pairing between transmitters and implants; (2) on-chip frequency is dependent on supply voltage and aging condition so that accurate matching is impractical, leading to potential data errors and wrong commands; (3) ASK-modulated signal can be shifted or distorted under varying physical conditions and a fixed threshold voltage cannot reliably differentiate "1" and "0". To overcome these limitations, exemplary embodiments can include a simple yet effective method to extract both clock and threshold voltage from the external AC magnetic field. The clock can be extracted directly from the frequency of the AC magnetic field, so that the frequency of the recovered clock will be exactly same as that of the transmitter. Exemplary embodiments can also extract the threshold voltage from a toggling pilot tone sent by the transmitter before each data transmission session. As a result, the threshold voltage can be placed at 50% of the actual received amplitude in runtime, which is otherwise unknown to the system. In circuit implementation, the received pilot signal can first be low-pass filtered to extract its DC component, and then sampled by a track-and-hold circuit as the final threshold voltage for data decoding, as shown in FIG. 26, panel (b). Simulated operation of the adaptive data reception scheme is shown in FIG. 27.

Low-Power and Calibration-Free Circuit Components

Exemplary embodiments of the present disclosure may also include low-power and calibration-free voltage references for power management circuits, current references for stimulation driver, and accurate timing control of stimulation. As previously discussed, reducing quiescent power of exemplary embodiments' ASIC is important to increasing the usable power under a certain magnetic field. In addition, calibration-free circuits are desired to reduce deploying complexity and improve robustness to environmental variations. Outcomes from this task will primarily be designed for exemplary embodiments' ASIC, but the techniques may be applicable to other low-power applications as well.

Figure 28:
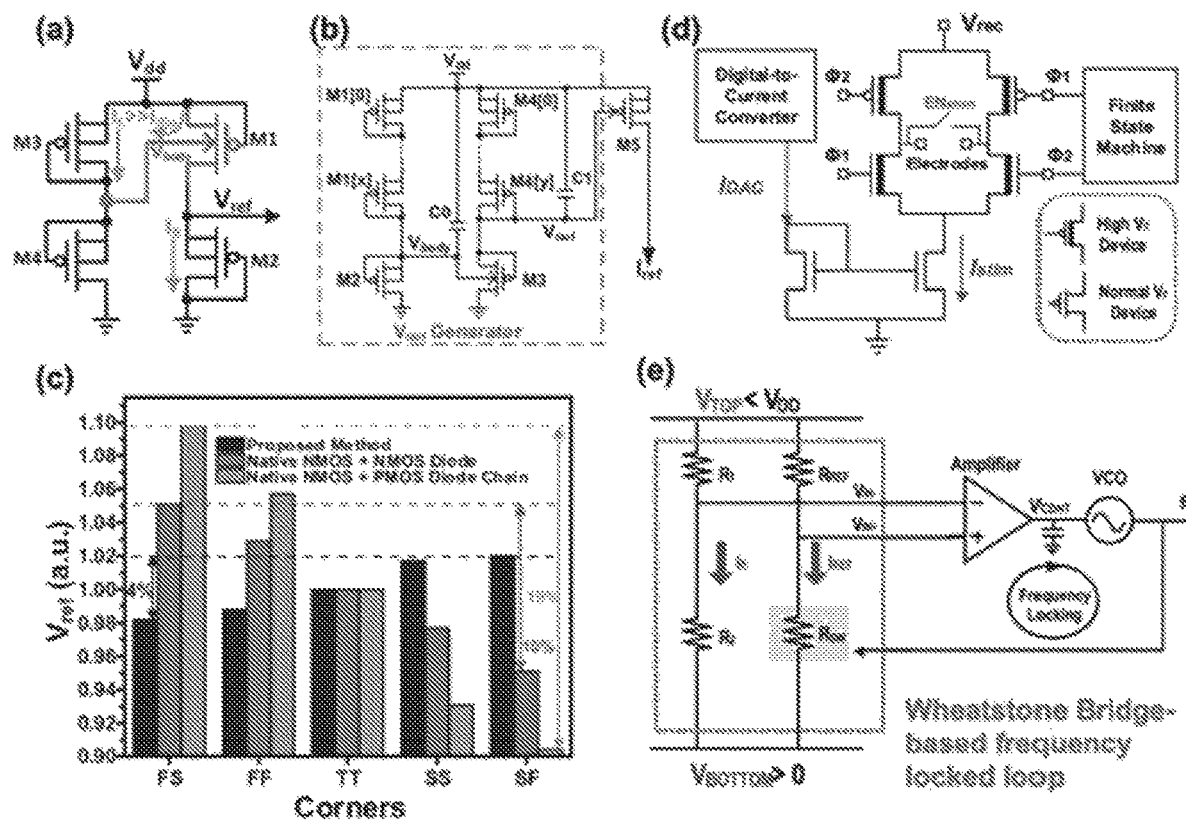
FIG. 28 illustrates low-power CMOS circuit components. (a-b) calibration-free voltage/current references, (c) measurement results across fabrication variations, (d) programmable stimulation driver, and (e) Wheatstone bridge-based timing reference.
Figure 29:
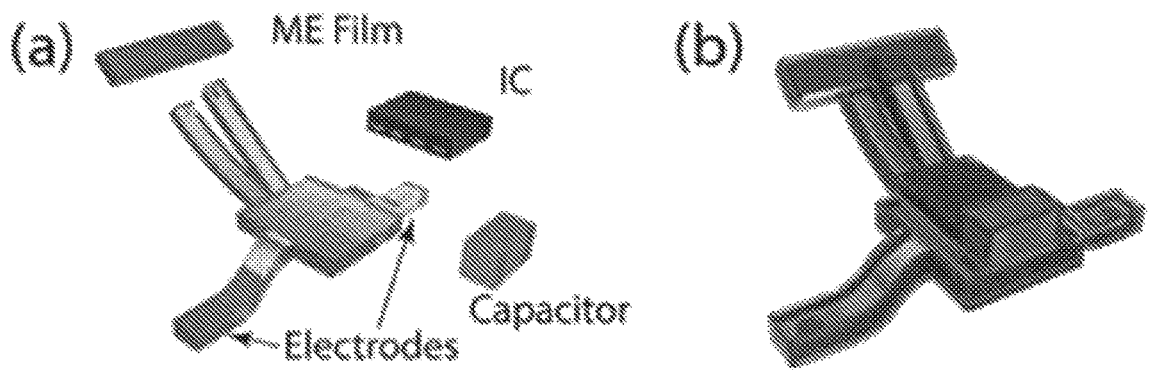
FIG. 29 illustrates exploded and assembled views of an exemplary embodiment of the present disclosure.

Calibration-free voltage and current references: Conventional voltage and current references using bandgaps of bipolar transistors have high biasing power, preventing their applications in battery-less implanted devices. References based on threshold voltage emerged for these applications because of their simplicity and low power [42]. However, a major drawback of existing designs is they require multipoint calibration to reach good supply and temperature stability. In an attempt to remove calibration, a key observation made in PI Yang's prior work is that body bias can be used as an extra tuning knob to compensate temperature effects [27, 43]. Voltage and current references designed with this principle show significantly reduced manufacturing variation over prior arts, as shown in FIG. 28, panels (a-c). However, their supply voltage sensitivity is still not as good. Because the supply voltage in exemplary embodiments is sensitive to distance and angle variations, voltage stability is more important than temperature stability. Exemplary embodiments of the present disclosure may leverage prior native-transistor stacking techniques [18] to trade off some temperature stability for a much-improved voltage stability. FIG. 28 illustrates low-power CMOS circuit components. In panels (a-b), calibration-free voltage/current references are shown. Panel (c) shows measurement results across fabrication variations, while panel (d) shows a programmable stimulation driver, and panel (e) shows a Wheatstone bridge-based timing reference.

In order to achieve reliable and programmable stimulation modes, exemplary embodiments may leverage a logic finite state machine with the clock recovered from AC magnetic field, to control a current digital-to-analog converter and a H-Bridge output driving stage, as shown in FIG. 28 panel (d). It is expected the stimulation pulse width and frequency can be digitally adjusted to the desired value, even under variations of the ME transducer's resonant frequency. However, should the accuracy of stimulation timing control be proven insufficient, exemplary embodiments may leverage CMOS RC oscillators, rather than bulky crystal oscillators, to provide a timing reference without increasing the implant's volume and weight. As shown in FIG. 28 panel (e), will a Wheatstone bridge can be used to eliminate the high biasing power presented in state-of-the-art designs. A prototype of an exemplary embodiments shows that this design can be two times more efficient than state-of-the-arts [44]. The inventors will further explore switching both resistors and capacitors in the bridge to support programmable and low frequency therapeutic-relevant stimulation modes desired in exemplary embodiments.

Millimeter-Sized Stimulator and In Vitro Testing

As disclosed herein, exemplary embodiments of the neural stimulator will demonstrate wireless power and data transfer through AC magnetic fields, efficient interface between ME transducers and CMOS ASICs, and fully untethered control of stimulation. Exemplary embodiments of the system can comprise a nanofabricated ME transducer, a CMOS ASIC, a ceramic capacitor for temporary energy storage, and a pair of electrodes (on a flexible PCB). FIG. 30 panel (a) shows an exploded view of an exemplary embodiment, while FIG. 30 panel (b) illustrates an assembled view of the same embodiment. The components will be integrated on a polyimide-based flexible printed circuit board and fully encapsulated. Challenges in demonstrating the proof-of-principle system include the ability maintain its functionality, along with bio-compatibility and safety, under biological environments. The inventors will investigate: (1) encapsulation and thermal management strategies for exemplary embodiments, (2) portable and wearable magnetic field generators to transmit power and data to exemplary embodiments, and (3) accelerated aging tests and in-vitro tests to validate functionality, safety, and efficiency.

Bio-Compatible Integration

In embodiments for biological applications, the transducers and ASICs can be encapsulated in a way that preserves their mechanical resonance and electrical properties in ionic solutions (like those inside the body). Parylene-C is commonly used as a passivation layer for implanted electronics due to its chemical inertness and ability to serve as a strong ion barrier. However, failure of the parylene layer often occurs due to moisture diffusion. To solve this issue, exemplary embodiments may also be fabricated using atomic layer deposition to deposit aluminum oxide, which is an excellent moisture barrier. In certain embodiments, the bilayer film uses chemical vapor and atomic layer deposition, where both steps are conformal processes that allow for the ME films to be uniformly coated. The combination of both aluminum oxide and parylene has been shown to significantly improve the lifetime of implanted neural interfaces in accelerated aging tests [45]. While this strategy will be an initial approach, the combination of $Al_2O_3$ and Parylene-C could be insufficient to preserve the mechanical and electrical properties of the magnetoelectric materials. In addition to testing Parylene-C/$Al_2O_3$ laminates, the inventors will also systematically investigate alternative hard and soft materials such as Silicon Carbide (SiC) and polyisobutylene (PIB) (see FIG. 30 material summary for reference).

In exemplary embodiments, the film will first be encapsulated with a soft material to preserve the mechanical resonance before being enveloped in a hard material. Some of the inventors' preliminary work has shown that films encapsulated in the semi-soft material polyimide retains greater than 95% of their max voltage. In certain embodiments, the external components, integrated circuit and capacitor will be potted in medical grade epoxy, a material that is regularly used for such applications [46-52]. Initially, exemplary embodiments will test chip and system functionality using a wired PCB in solution test to probe test points before testing a wireless version of the device.

Thermal Management

Testing of exemplary embodiments indicates results that are well within the range of power levels that will not cause significant heating of biological tissue. Based on the impedance and voltages of preliminary devices, it is expected that the total power delivered to the film is 1.5 mW. This power dissipation rate is comparable to DBS stimulators that do not cause significant heating of the brain [45, 46]. Nevertheless, temperature changes produced by devices during long-term in vitro stability tests will be directly measured. Using a fiber optic thermometer, the temperature of the solution can be monitored to ensure that it does not rise by more than 2 degrees C., which is considered the safe level for neural implants [47]. Should the investigators find that the temperature rises more than 2 degrees Celsius during tests, lower power stimulation paradigms will be investigated by lowering the duty cycle or improving device properties (e.g. lowering the electrode impedance) to improve power efficiency.

Wearable Magnetic Transmitter

An advantage for exemplary ME films as a wireless stimulator is that the magnetic field required to activate these devices requires very little power in comparison to other similar wireless power delivery technologies. For example, the inventors have been able to successfully activate films with magnetic fields that are less than 1 mT in strength, at least an order of magnitude smaller than other magnetically driven neurostimulation techniques [16]. As a result, the inventors expect to power the Mag-Dust by small lightweight magnetic field generators. These magnetic field drivers will also be used to transmit data to the Mag-Dust ASIC (see section entitled "Adaptive Data Reception").

Exemplary embodiments can include a wearable power and data transmitter comprising a battery, a microcontroller, and a H-bridge driver located externally in a wearable pack. In certain embodiments, a wire will run from the pack to the transmitting coil located at the site of the implant. For example, a coil can be placed near the back for a spinal cord implant, in a neck band for a Vagus nerve implant, or in a visor around the head for a brain implant, as shown in FIG. 31 panels (a)-(c). By using a resonant circuit to drop the impedance of the coil, exemplary embodiments can create a 1 mT field with only 0.2 mA draw on the battery as shown in FIG. 31 panel (d). Using a 1200 mAh battery weighing less than 120 g, battery life is estimated at more than 10 hours if operating continuously at maximum power.

Downlink data transfer to the ASIC can be accomplished by modulating the frequency of the driver between resonance and off-resonance frequencies. While at full resonance, the input voltage to the IC will be at its maximum. By selecting two alternative driver frequencies slightly off resonance, the IC will detect the changes in voltage developed by the film as information bits, "0" and "1". In exemplary embodiments, circuitry in the IC dynamically tracks these levels to compensate for coupling fluctuations and driver amplitude drift allowing it to robustly interpret the voltage shifts as incoming data. The driver's frequency generator can simultaneously generate all three frequencies so that switching between frequencies can be accomplished seamlessly between stimulation pulses, minimizing dead time and maximizing data transmission rate. Accuracy of the frequency generation allows this approach to work reliably, even when the coil and film are designed to have high Q factors to maximize efficiency.

In-Vitro Testing

Figure 32:
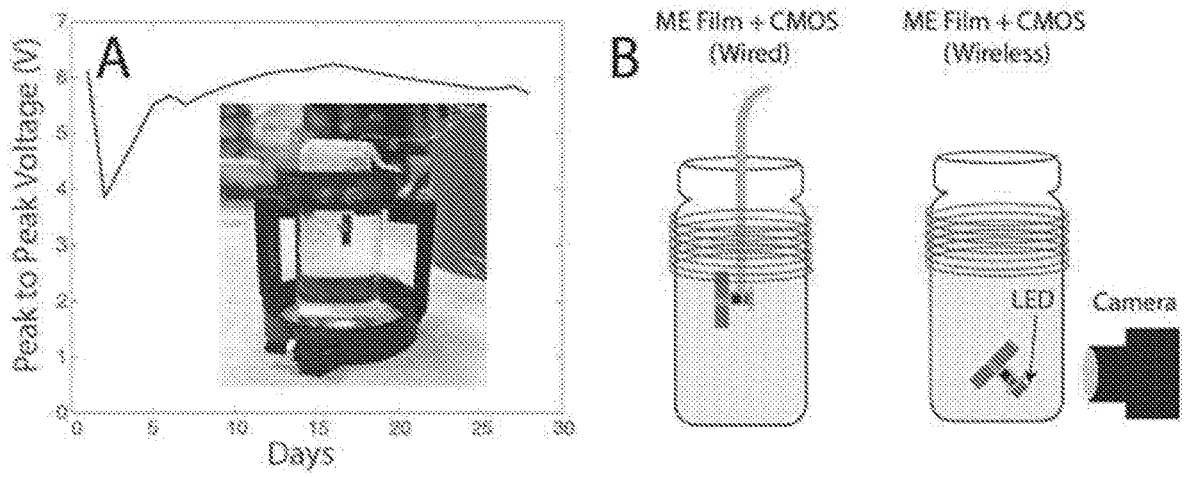
FIG. 32 illustrates in vitro testing. (A) Soak testing in 37 degree C. (or 80 degree C.) PBS can be used to confirm the stable hermetic packaging. Preliminary data shows a 28-day soak test of a polyimide encapsulated magnetoelectric film that displays a stable peak-to-peak voltage. (B) To measure the fully packaged CMOS device a flexible PCB can be used to record the voltage waveform in a wired configuration or monitor the intensity and frequency of an LED in a wireless configuration. Alternatively, a fiber could be coupled to the LED if unstable measurements are found with the camera (not shown).

The functionality of exemplary embodiments can be tested with ME-based wireless power and data transfer by affixing an LED to the stimulation drivers and monitoring the optical signal using a camera or bonded optical fiber (see FIG. 32). This can allow remote sensing of the IC's response to power and programming without interaction with the magnetic field driving the device. By measuring the intensity of the LED along with its output frequency and pulse width, the inventors can verify both the reliability of our programming approach and the effective efficiency of the system across a myriad of testing conditions. A testing apparatus can be employed to examine the impact of distance and alignment between coil and device on performance and reliability. Such testing can be performed at 37 degrees Celsius in phosphate buffer solution to approximate the biological conditions inside the body.

EXAMPLES

Modulating the electrical activity in the nervous system has shown great potential for neuroscience research and clinical therapies. To reduce risks of infection and restrictions in subject mobility, neuromodulators should be miniaturized and untethered. Safe and reliable wireless power transfer and data delivery with the size and power constraints is still one of the fundamental challenges in developing miniature neural interfaces. A few wireless neural implants powered by RF, inductive coupling [1-3], ultrasound [4], and optics [5] have been reported; however, existing solutions cannot simultaneously achieve implant miniaturization, system portability, functional flexibility, and subject mobility, while avoiding tissue heating due to body absorption of high-frequency EM waves [6], attenuation of mechanical waves crossing different mediums [7], limited penetration depth of light [5], or lack of controllability with magnetothermal nanoparticles [8]. In comparison, magnetoelectric (ME) transducers, which convert low-frequency (100 kHz to 10 MHz) AC magnetic fields into electrical energy via mechanical coupling between magnetostrictive and piezoelectric films (see FIG. 33, top), are promising for powering biomedical implants by offering the desired properties summarized in FIG. 33. At resonance, lead zirconate titanate (PZT)/Metglas-based ME films generate high output voltage (>7Vpp) with low resistive source impedance (~800$\Omega$), under a magnetic field of less than 1 mT, making it suitable for efficient energy harvesting.

Figure 33:
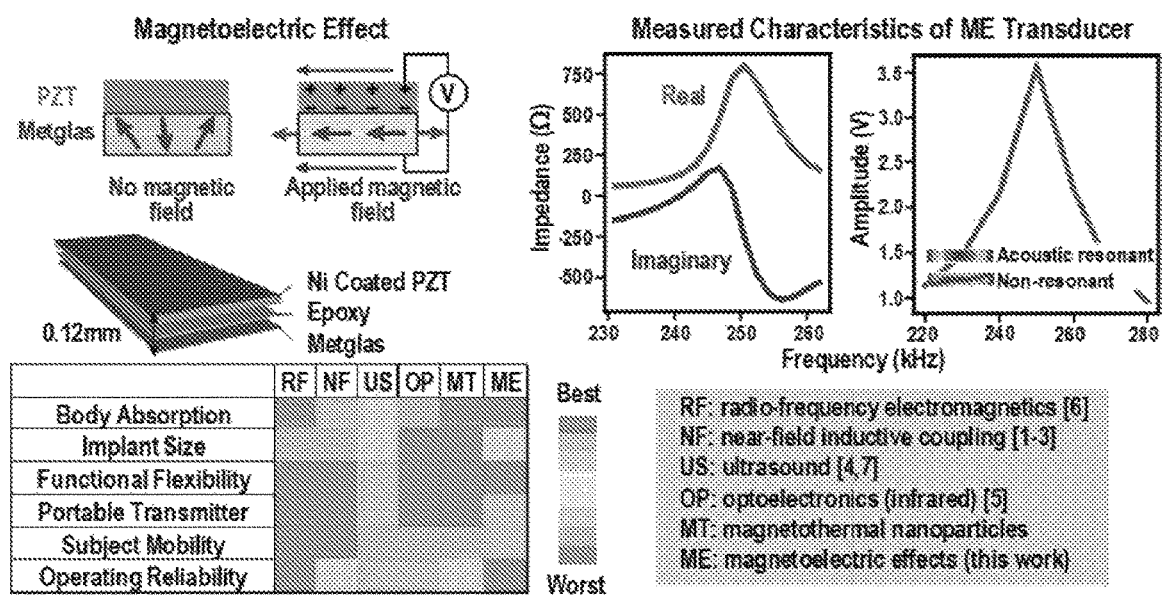
FIG. 33 illustrates principles and characteristics of magnetoelectric (ME) transducers; comparisons of wireless power transfer mechanisms; illustrations of the proposed MagMote and a wearable neurostimulation system concept.

Exemplary embodiments of the present disclosure (sometimes referenced as "MagMote") include an untethered and programmable neural implant exploiting ME effects. Specific embodiments integrate a 1.5 mm$^2$ 180 nm CMOS system-on-chip (SoC), an in-house built 4 mm×2 mm ME film, a single energy storage capacitor, and on-board electrodes onto a flexible polyimide substrate. Particular embodiments feature: (1) a miniature physical dimension of 8.2 mm$^3$ and 28 mg with only two discrete components added to the SoC; (2) adaptive system control and data transfer mechanisms robust under source amplitude variations (1V variation tolerance and 0.2V modulation depth); (3) a 90% chip efficiency due to its low static power down to 23.7 $\mu$W; and (4) the capability to perform fully programmable bi-phasic current stimulation covering 0.05 to 1.5 mA amplitude, 64 to 512 $\mu$s pulse width, and 0 to 200 Hz frequency ranges, suitable for a variety of clinical targets such as the spinal cord, the vagus nerve and the brain. The concept of a spinal cord stimulating system enabled by MagMote with a battery powered magnetic transmitter assembled on a wearable belt is shown in FIG. 33 (bottom left panel).

As discussed herein, the MagMote SoC, comprising power management, data recovery, and stimulation modules, interfaces with a ME film to receive power and data and drives programmable stimulation, as previously discussed in FIGS. 22A and 22B. Alternating current (AC) voltage induced on the ME transducer is first converted to a direct current (DC) voltage (Vrect) by an active rectifier. Energy is then stored in an off-chip 4.7 μF capacitor. The LDO provides a constant 1V supply VLDO for clock and data recovery to reduce power consumption and effectively increase the SoC's input impedance for higher voltage conversion ratio. Temperature and supply-invariant reference voltages for power management are generated by native MOS-based reference circuits [9]. Downlink data is transmitted by amplitude shift keying (ASK) modulation of the magnetic field and is used to program stimulation current with 50 μA resolution using a 5-bit current DAC. A finite-state machine (FSM), also configured by the received data, controls the timing of the bi-phasic stimulus, which, unlike mono-phasic pulses, is charge-balanced and prevents undesired electrochemical reactions. By the end of stimulation, electrodes are shortened to completely remove the residual charge. The SoC cycles through charging, data receiving, and stimulation phases at the desired stimulation frequency set by the external transmitter (TX) (FIG. 22, bottom left).

Figure 34:
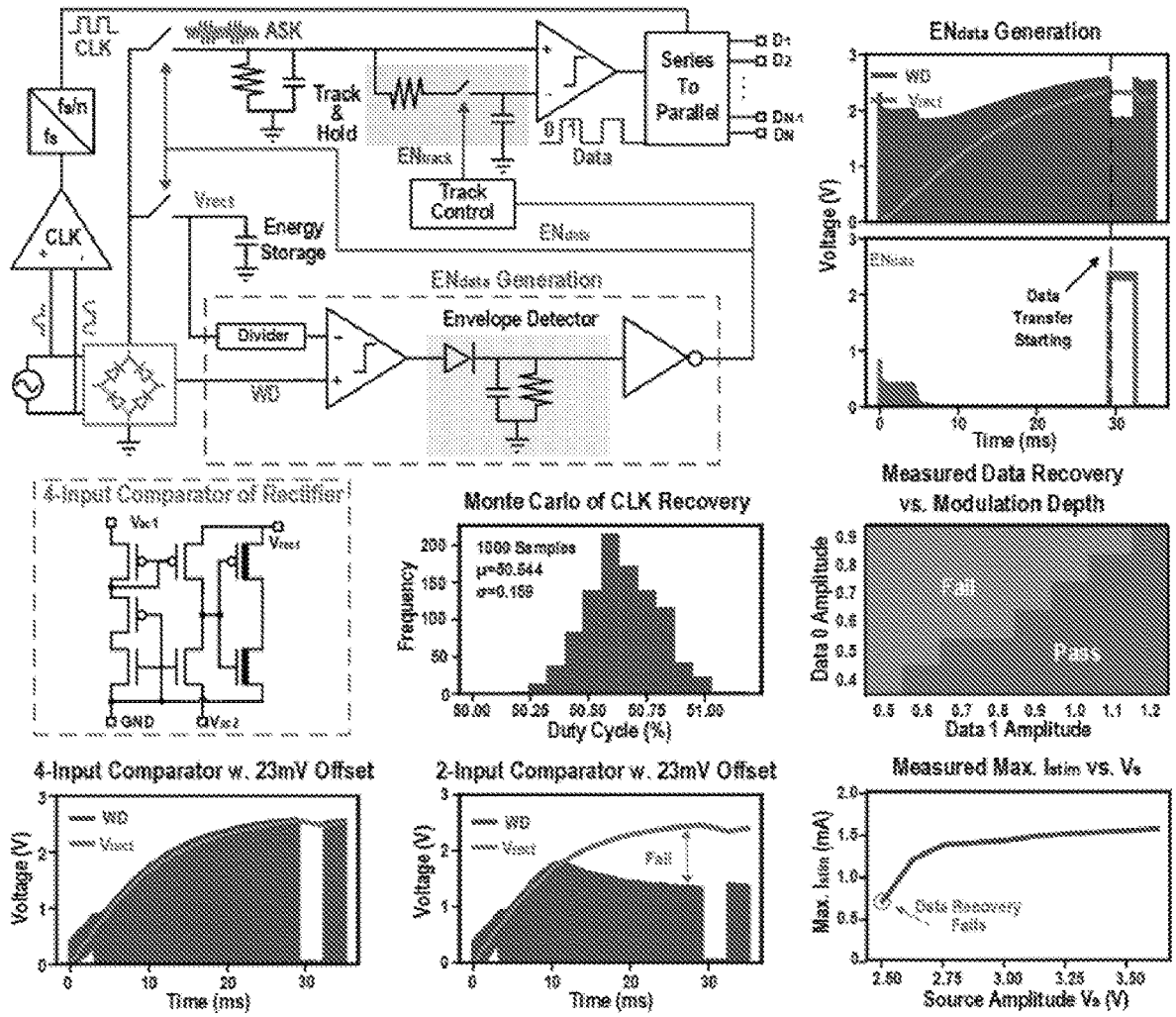
FIG. 34 illustrates a system diagram of the adaptive operating scheme; improved robustness of 4-input comparator in tracking Vrect; robustness analysis of clock; measured data modulation depth; and Istim,max under varying Vs.

To maintain reliable system operation, especially when the amplitude variations of the ME-induced voltage due to changing distance and misalignment, the transition between the three operation phases and digital communication are designed to be adaptive, calibration free, and fully controllable by the TX (user) side. First, the enabling of the data transfer phase is controlled by changing the ME amplitude, so that the time allocation for each phase is fully controlled by the external TX with accurate timing references and computing resources for control. To save power and area, the existing comparator in the active rectifier is reused as a watchdog to monitor the amplitude change. It generates a train of pulses tracking Vrect during charging and stops once the input's amplitude is below the voltage of the energy capacitor. By comparing the watchdog signal with divided Vrect and extracting the envelop, a rail-to-rail enable signal for data transfer (ENdata) is created (FIG. 34, top right). Comparator offset may cause a failure in tracking Vrect and generate incorrect ENdata (FIG. 34, bottom left). To alleviate this, a 4-input comparator that has higher drivability than the 2-input one of same size [10] increases offset tolerance from 11 mV to 23 mV, effectively reducing the failure probability from 8% to 0.02% (calculated with simulated variance of offset). Second, the system clock is derived directly from ME source, and therefore presents PVT-invariant frequency and a tight distribution of duty cycle (FIG. 34, right). Third, to ensure correct data demodulation under ME voltage variations, the voltage threshold is generated online before every data transfer, using an alternating pilot tone sent by the TX. The threshold is extracted with a low-pass filter followed by track and hold circuits. Measurement results show successful data transfer with a 0.2V modulation depth. Furthermore, the inventors validated the robust operation of the device by showing that a fixed setting of the stimulation current (maximum setting in FIG. 34, bottom right) stays around the expected 1.5 mA, when the ME-induced voltage varies from 2.6 to 3.6V due to magnetic field variations.

Figure 35:
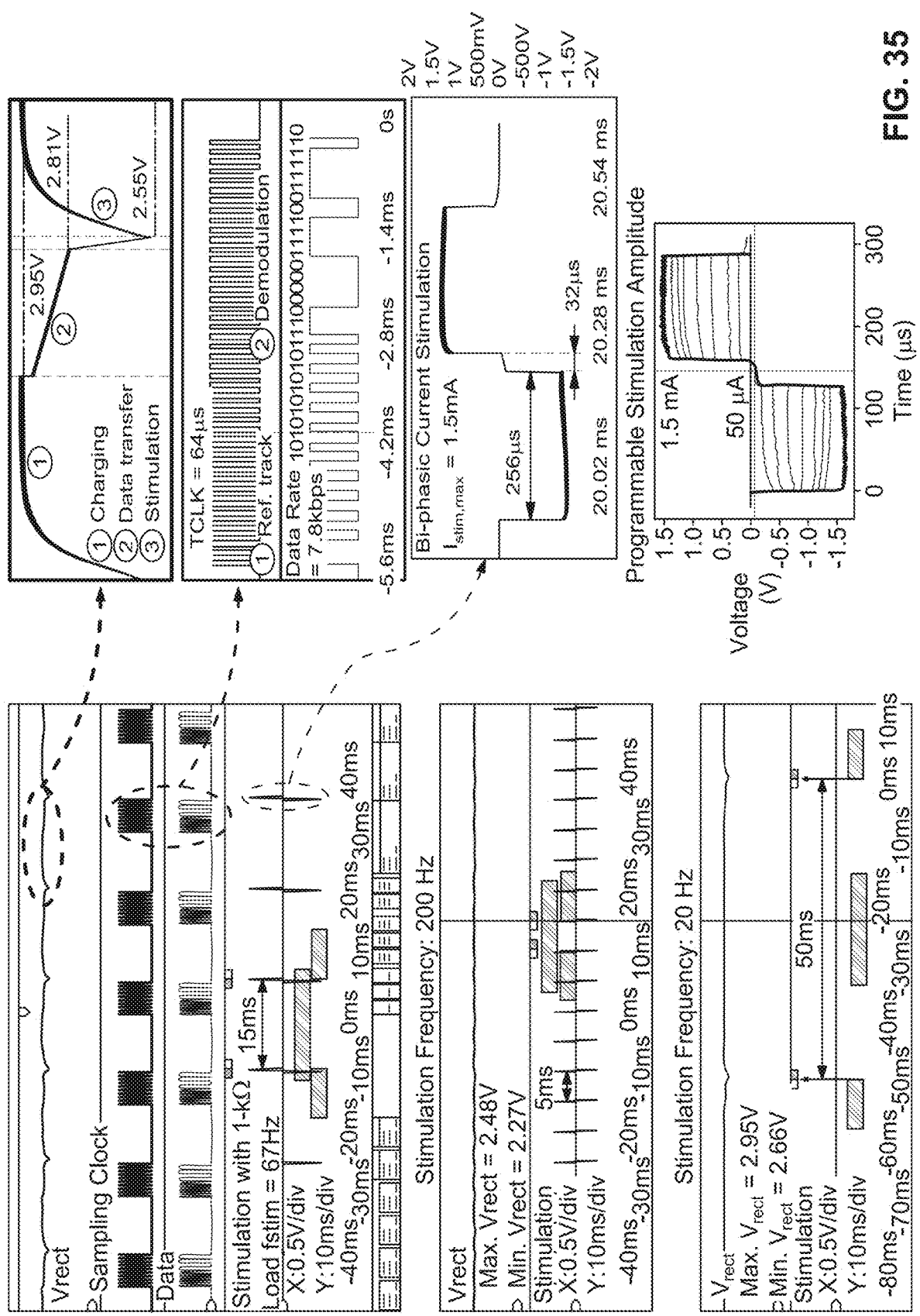
FIG. 35 illustrates measured waveforms of MagMote with different stimulation frequencies; zoom-in views of power recovery, data transfer, and bi-phasic stimulation demonstrating 0.05-1.5 mA amplitudes, 256 and 512 µs pulse width.

FIG. 35 shows the measured waveforms of MagMote operating at 20, 67 and 200 Hz stimulation frequencies. $V_{rect}$ peaks at 2.95V with an 83% voltage conversion ratio at 0.61 mT magnetic field strength and drops to 2.55V after 1.5 mA, 512 μs stimulation. ASK modulation is realized by slightly shifting the frequency, which causes the ME film to vibrate off resonance with reduced amplitude. Set by the settling time of the ME film, 32 cycles are required to reliably transmit one bit, resulting in a 7.8 kbps data rate. Additionally, 0.05 to 1.5 mA bi-phasic stimulation current is verified. The SoC consumes 23.7 μW power without stimulation and achieves a 90% peak efficiency at the 2.27 mW maximum average stimulating power Pstim,avg (Pstim,avg=Istim2× Rload×Tpulse×fstim).

Figure 36:
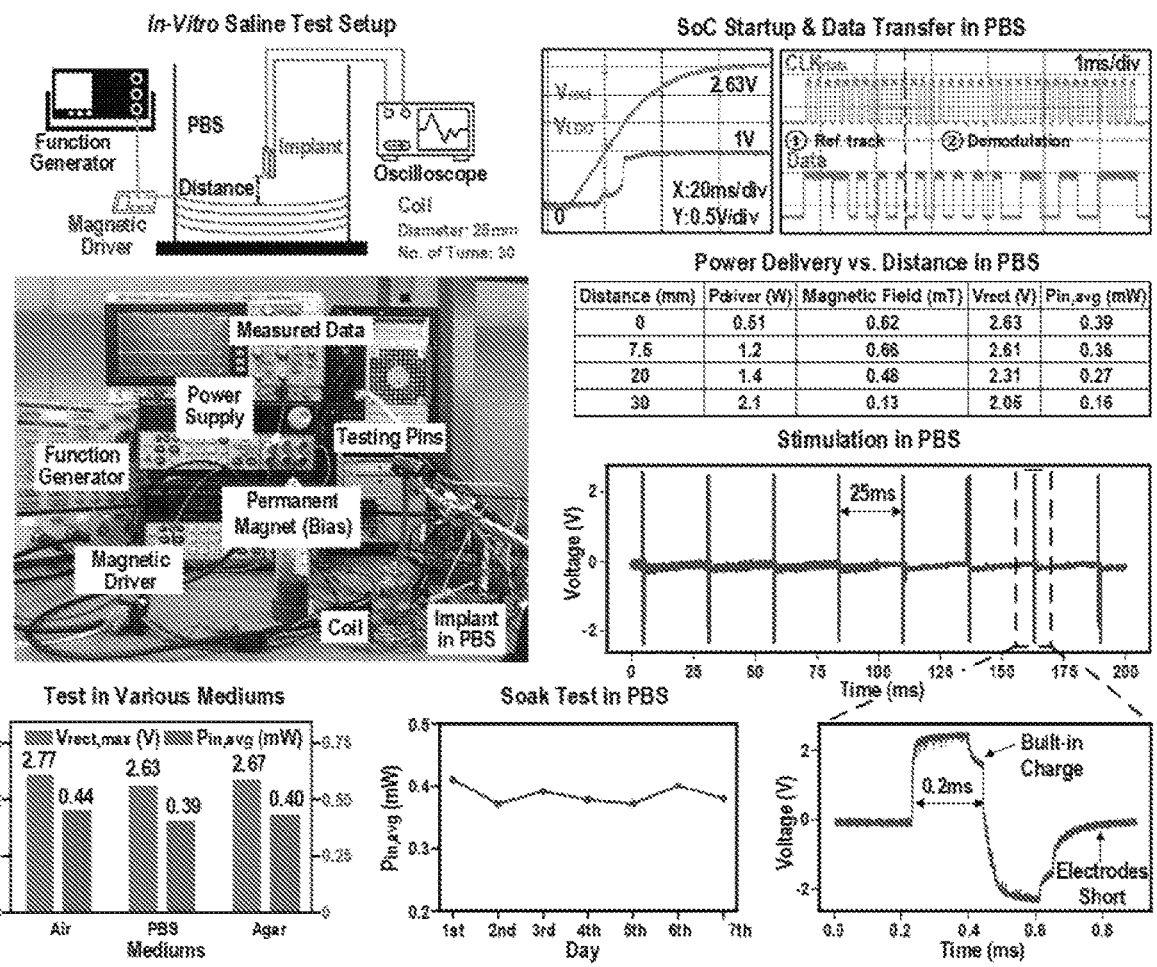
FIG. 36 illustrates an in-vitro setup in PBS (top left); ME power delivery at various distances and stimulating waveforms (top right); measured Vrect and Pin,avg in different mediums and stability of Pin,avg throughout a 7-day soak test (bottom).

To demonstrate the compatibility for implantation, the ME film is packaged in a 3D-printed enclosure to eliminate environmental influences on its mechanical vibration before the entire implant is encapsulated with nonconductive epoxy. A soak test is performed by immersing a MagMote in phosphate buffered saline (PBS) for 7 days. During start-up, the device is charged up to 2.6V in 44 ms with 0.37 mW average input power Pin,avg, when at the center of the TX coil. At a distance of 30 mm from TX, Vrect of 2.05V and Pin,avg of 0.16 mW are achieved, which are sufficient to ensure SoC functionality. In addition to testing in PBS, the device is also tested in air and agar, a substrate used to emulate the brain's mechanical properties, showing Vrect and Pin,avg variations less than 0.14V and 0.05 mW respectively (FIG. 36 bottom left), demonstrating the ME effect's adaptability in different mediums. Throughout the one-week soak test, the MagMote in PBS functions consistently with Pin,avg fluctuating between 0.35-0.39 mW, indicating its long-term reliability for implantation.

Figure 37:
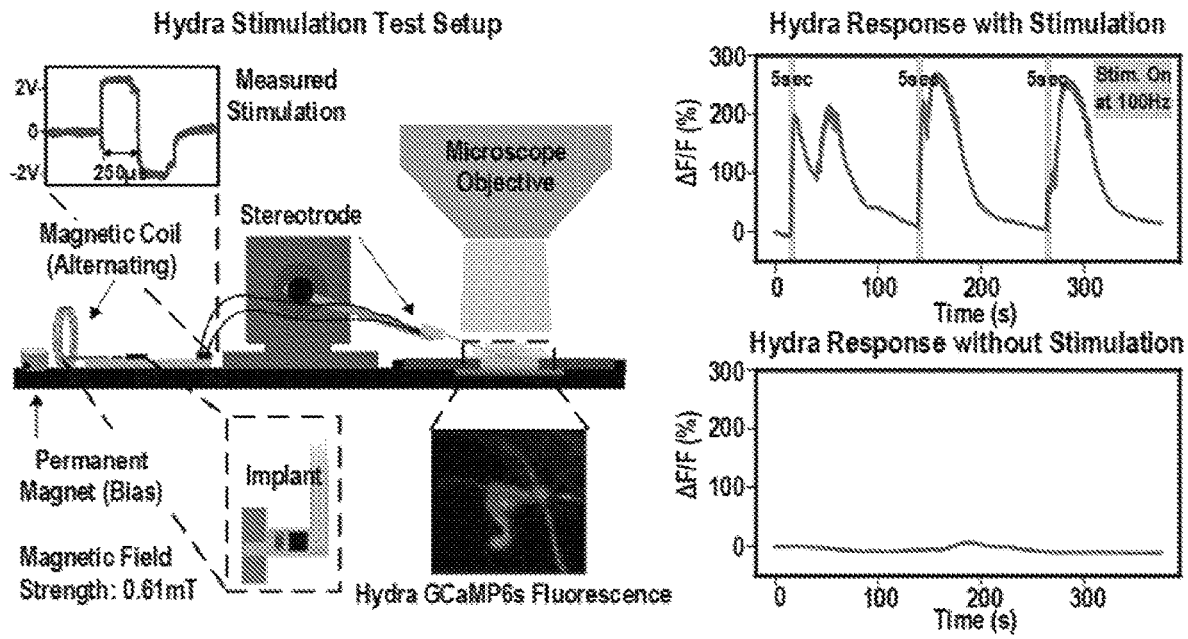
FIG. 37 illustrates an experimental setup of hydra test (top left); time aligned measured fluorescence increases in response to electrical stimulations (top right); comparison with state-of-the-art wireless implantable neurostimulator (bottom).
Figure 38:
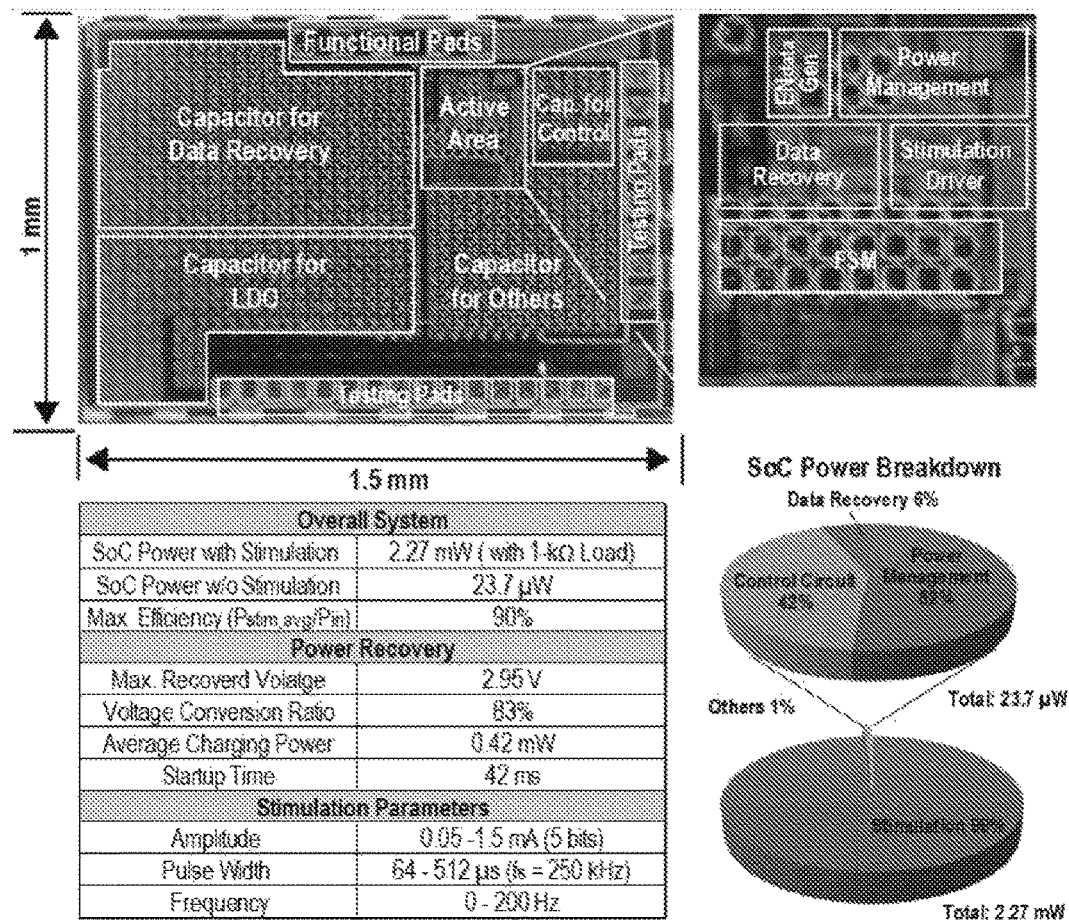
FIG. 38 illustrates a chip micrograph, SoC performance summary and power breakdown.

To further assess MagMote's bio-stimulation capability, the device is validated using Hydra vulgaris as a model for excitable tissue. The transgenic Hydra strains used express GCaMP6s, a calcium-sensitive fluorescent protein, in the ectoderm, and naturally express voltage sensitive ion channels (FIG. 37, top left). When the inventors apply 5 sec biphasic pulse trains with 500 us pulse widths at 100 Hz, the inventors observe a >200% increase in GCaMP6s fluorescence, which is consistent with electrical activation of voltage gated ion channels in Hydra tissue that result in muscle contractions (FIG. 37, top right). The table in FIG. 37 compares MagMote with state-of-the-art implantable wireless stimulators. Die micrograph of the MagMote SoC is included in FIG. 38.

Figure 39:
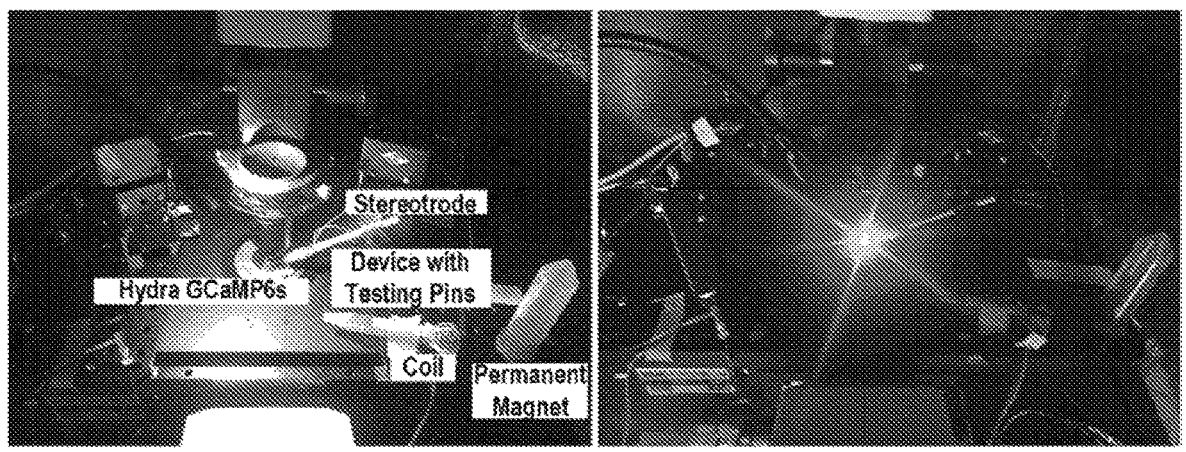
FIG. 39 illustrates an experimental setup using a microscope and a constant excitation light to capture fluorescence images; the stereotrode connected to the proposed device; a laser is used to image GCaMP6s activity in Hydra.

FIG. 39 shows an experimental setup using a microscope and a constant excitation light to capture fluorescence images; the stereotrode connected to the proposed device; a laser is used to image GCaMP6s activity in Hydra.

FIG. 40 shows a portable magnetic field driver and its system diagram.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

V. REFERENCES

The following references, to the extent that they provide exemplary procedural or other details supplementary to those set forth herein, are specifically incorporated herein by reference.

1. Hargreaves, D. G., Drew, S. J. & Eckersley, R. Kirschner Wire Pin Tract Infection Rates: A randomized controlled trial between percutaneous and buried wires. *J. Hand Surg. Br. Eur. Vol.* 29, 374-376 (2004).
2. Roy, B., C., M. D. & A., T. P. The brain tissue response to implanted silicon microelectrode arrays is increased when the device is tethered to the skull. *J. Biomed. Mater. Res. Part A* 82A, 169-178 (2007).
3. Markwardt, N. T., Stokol, J. & Rennaker, R. L. Submeninges implantation reduces immune response to neural implants. *J. Neurosci. Methods* 214, 119-125 (2013).
4. Sahin, M. & Pikov, V. Wireless Microstimulators for Neural Prosthetics. *Crit. Rev. Biomed. Eng.* 39, 63-77 (2011).
5. Pinnell, R. C., Vasconcelos, A. P. De & Cassel, J. C. A Miniaturized, Programmable Deep-Brain Stimulator for Group-Housing and Water Maze Use. *Front. Neurosci.* 12, 1-11 (2018).
6. Nurmikko, A. V. Approaches to large scale neural recording by chronic implants for mobile BCIs. in 2018 *6th International Conference on Brain-Computer Interface (BCI)* 1-2 (2018). doi:10.1109/IWW-BCI.2018.8311503
7. International, I. & Safety, E. *IEEE Standard for Safety Levels with Respect to Human Exposure to Radio Frequency Electromagnetic Fields, 3 kHz to 300 GHz.* 2005, (2006).
8. Fotopoulou, K. & Flynn, B. W. Wireless Power Transfer in Loosely Coupled Links: Coil Misalignment Model. *IEEE Trans. Magn.* 47, 416-430 (2011).
9. Freeman, D. K. et al. A sub-millimeter, inductively powered neural stimulator. *Front. Neurosci.* 11, 1-12 (2017).
10. De Hemptinne, C. et al. Therapeutic deep brain stimulation reduces cortical
All rights reserved. No reuse allowed without permission. was not peer-reviewed) is the author/funder, who has granted bioRxiv a license to display the preprint in perpetuity.
bioRxiv preprint first posted online Nov. 5, 2018; doi: http://dx.doi.org/10.1101/461855. The copyright holder for this preprint (which
phase-amplitude coupling in Parkinson's disease. *Nat. Neurosci.* 18, 779-786 (2015).
11. Alonso, P. et al. Deep brain stimulation for obsessive-compulsive disorder: A meta-analysis of treatment outcome and predictors of response. *PLoS One* 10, 1-16 (2015).
12. Theodore, W. H. & Fisher, R. S. Review Brain stimulation for epilepsy. *Lancet* 3, 111-118 (2004).
13. Merrill, D. R., Bikson, M. & Jefferys, J. G. R. Electrical stimulation of excitable tissue: Design of efficacious and safe protocols. *J. Neurosci. Methods* 141, 171-198 (2005).
14. Parastarfeizabadi, M. & Kouzani, A. Z. Advances in closed-loop deep brain stimulation devices. *J. Neuroeng. Rehabil.* 14, 79 (2017).
15. Montgomery, K. L. et al. Wirelessly powered, fully internal optogenetics for brain, spinal and peripheral circuits in mice. *Nat. Methods* 12, 969-974 (2015).
16. Ho, J. S. et al. Self-Tracking Energy Transfer for Neural Stimulation in Untethered Mice. *Phys. Rev. Appl.* 24001, 1-6 (2015).
17. Carrey, J. et al. Simple models for dynamic hysteresis loop calculations of magnetic single-domain Simple models for dynamic hysteresis loop calculations of magnetic single-domain nanoparticles: Application to magnetic hyperthermia optimization. *J. Appl. Phys.* 83921, (2015).
18. Chen, R., Romero, G., Christiansen, M. G., Mohr, A. & Anikeeva, P. Wireless magnetothermal deep brain stimulation. *Science* 347, 1477-80 (2015).
19. Munshi, R. et al. Magnetothermal genetic deep brain stimulation of motor behaviors in awake, freely moving mice. *Elife* 6, 1-26 (2017).
20. Johnson, B. C. et al. StimDust: A 6.5 mm3, Wireless Ultrasonic Peripheral Nerve Stimulator with 82% Peak Chip Efficiency. 2018 *IEEE Cust. Integr. Circuits Conf.* (2018).
21. Seo, D. et al. Wireless Recording in the Peripheral Nervous System with Ultrasonic Neural Dust. *Neuron* 91, 529-539 (2016).
22. Piech, D. K. et al. StimDust: A 2.2 mm3, precision wireless neural stimulator with ultrasonic power and communication. 1-35
23. Nan, T. et at Acoustically actuated ultra-compact NEMS magnetoelectric antennas. *Nat. Commun.* 8, 1-7 (2017).
24. O'Handley, R. C., Huang, J. K., Bono, D. C. & Simon, J. Improved Wireless, Transcutaneous Power Transmission for In Vivo Applications. *IEEE Sens. J.* 8, 57-62 (2008).
25. Yue, K. et al. Magneto-Electric Nano-Particles for Non-Invasive Brain Stimulation. *PLoS One* 7, 1-5 (2012).
26. Guduru, R. et al. Magnetoelectric 'spin' on stimulating the brain. *Nanomedicine* 10, 2051-2061 (2015).
27. Ribeiro, C., Correia, V., Martins, P., Gama, F. M. & Lanceros-Mendez, S. Proving the suitability of magnetoelectric stimuli for tissue engineering applications. *Colloids Surfaces B Biointerfaces* 140, 430-436 (2016).
28. Zhai, J., Dong, S., Xing, Z., Li, J. & Viehland, D. Giant magnetoelectric effect in Metglas/polyvinylidene-fluoride laminates. *Appl. Phys. Lett.* 89, 8-11 (2006).
29. Kulkarni, a. et al. Giant magnetoelectric effect at low frequencies in polymerbased thin film composites. *Appl. Phys. Lett.* 104, 0-5 (2014).
30. Wan, C. & Bowen, C. R. Multiscale-structuring of polyvinylidene fluoride for energy harvesting: the impact of molecular-, micro- and macro-structure. *J. Mater. Chem. A* 5, 3091-3128 (2017).
31. Amar, A. Ben, Kouki, A. B. & Cao, H. Power approaches for implantable medical devices. *Sensors (Switzerland)* 15, 28889-28914 (2015).
32. Park, J. et al. Screening fluorescent voltage indicators with spontaneously spiking HEK cells. *PLoS One* 8, 1-10 (2013).
33. Jin, L. et al. Single Action Potentials and Subthreshold Electrical Events Imaged in Neurons with a Fluorescent Protein Voltage Probe. *Neuron* 75, 779-785 (2012).
34. So, R. Q., Mcconnell, G. C. & Grill, W. M. Frequency-dependent, transient effects of subthalamic nucleus deep brain stimulation on methamphetamine induced circling and neuronal activity in the hemiparkinsonian rat. *Behav. Brain Res.* 320, 119-127 (2017).
35. Sun, Y. et al. Wirelessly Powered Implantable Pacemaker with On-Chip Antenna. *IEEE* 1242-1244 (2017).
36. Summerson, S. R., Aazhang, B. & Kemere, C. T. Characterizing Motor and Cognitive Effects Associated With Deep Brain Stimulation in the GPi of HemiParkinsonian Rats. *IEEE Trans. Neural Syst. Rehabil. Eng.* 22, 1218-1227 (2014).

37. Agrawal, D. R. et al. Conformal phased surfaces for wireless powering of bioelectronic microdevices. *Nat. Biomed. Eng.* 1, 1-16 (2017).
38. Schabrun, S. M., Jones, E., Elgueta Cancino, E. L. & Hodges, P. W. Targeting chronic recurrent low back pain from the top-down and the bottom-up: a combined transcranial direct current stimulation and peripheral electrical stimulation intervention. *Brain Stimul* 7, 451-459 (2014).
39. Mulpuru, S., Madhavan, M., McLeod, C., Cha, Y.-M. & Friedman, P. Cardiac Pacemakers: Function, Troubleshooting, and Management. *J. Am. Coll. Cardiol.* 69, (2017).
40. Kesar, T. M. et al. Novel Patterns of Functional Electrical Stimulation Have an Immediate Effect on Dorsiflexor Muscle Function During Gait for People Poststroke. *Phys. Ther.* 90, 55-66 (2010).
41. Bewernick, B. H. et al. Nucleus Accumbens Deep Brain Stimulation Decreases Ratings of Depression and Anxiety in Treatment-Resistant Depression. *Biol. Psychiatry* 67, 110-116 (2010).
42. Park, S. Il et al. Stretchable multichannel antennas in soft wireless optoelectronic implants for optogenetics. *Proc. Natl. Acad. Sci.* 113, E8169-E8177 (2016).
43. Yazdandoost, K. Y. A 2.4 GHz antenna for medical implanted communications. *APMC 2009—Asia Pacific Microw. Conf.* 2009 1775-1778 (2009). doi:10.1109/APMC.2009.5384240
44. Yazdandoost, K. Y. & Kohno, R. An antenna for medical implant communications system. *Proc. 37th Eur. Microw. Conf EUMC* 968-971 (2007). doi:10.1109/EUMC.2007.4405356
45. Ting, J. T., Daigle, T. L., Chen, Q. & Feng, G. Acute brain slice methods for adult and aging animals: application of targeted patch clampanalysis and optogenetics. *Methods Mol. Biol.* 1183, 221-242 (2014).
46. Mathis, A. et al. DeepLabCut: markerless pose estimation of user-defined body parts with deep learning. *Nat. Neurosci.* 21, (2018).
47. Bottomley, P. A. & Andrew, E. R. RF magnetic field penetration, phase shift and 778 power dissipation in biological tissue: Implications for NMR imaging. *Phys. Med. Biol.* 23, 630-643 (1978).
48. Devi, P. I., & Ramachandran, K. (2011). Dielectric studies on hybridised PVDF-ZNO nanocomposites. Journal of Experimental Nanoscience, 6(3), 281-293. https://doi.org/10.1080/17458080.2010.497947
49. Dodds, J. S., Meyers, F. N., & Loh, K. J. (2012). Piezoelectric characterization of PVDF-TrFE thin films enhanced with ZnO nanoparticles. IEEE Sensors Journal, 12(6), 1889-1890. https://doi.org/10.1109/JSEN.2011.2182043.
50. Li, Z., Zhang, X., & Li, G. (2014). In situ ZnO nanowire growth to promote the PVDF piezo phase and the ZnO-PVDF hybrid self-rectified nanogenerator as a touch sensor. Physical Chemistry Chemical Physics, 16(12), 5475-5479. https://doi.org/10.1039/c3cp54083a.

ADDITIONAL REFERENCES

Kang et al., US2018/0053890
Jin et al., "Multiferroic Polymer Composites with Greatly Enhanced Magnetoelectric Effect under a Low Magnetic Bias," Adv. Mater. 2011, 23, 3853-3858.
Martin et al., "Polymer-Based Magnetoelectric Materials," Adv. Funct. Mater. 2013, 23, 3371-3385.
Ribeiro et al., "Proving the suitability of magnetoelectric stimuli for tissue engineering applications," Colloids and Surfaces B: Biointerfaces 140 (2016) 430-436.
O'Handley et al., US 2009/0062886.
Fernando et al., "An Embedded Wireless Neural Stimulation and Recording System," Conference Paper, June 2007, DOI: 10.1109/CNE.2007.369678, Source: IEEE Xplore.
Pietronave et al., "Monophasic and Biphasic Electrical Stimulation Induces a Precardiac Differentiation in Progenitor Cells Isolated from Human Heart," STEM CELLS AND DEVELOPMENT Volume 23, Number 8, 2014
Yue et al., "Magneto-Electric Nano-Particles for Non-Invasive Brain Stimulation," PLoS ONE 7(9): e44040. doi: 10.1371/journal.pone.0044040.
Simon et al., US 2011/0125203
https://www.massdevice.com/medautonomic-implants-device-to-treat-metabolic-syndrome/

ADDITIONAL REFERENCES

[1] A. Bayrashev, W. P. Robbins, and B. Ziaie, "Low frequency wireless powering of microsystems using piezoelectric-magnetostrictive laminate composites," Sensors and Actuators A: Physical, vol. 114, no. 2, pp. 244-249, September 2004, doi: 10.1016/j.sna.2004.01.007.
[2] R. C. O'Handley, J. K. Huang, D. C. Bono, and J. Simon, "Improved Wireless, Transcutaneous Power Transmission for In Vivo Applications," IEEE Sensors Journal, vol. 8, no. 1, pp. 57-62, January 2008, doi: 10.1109/JSEN.2007.912899
[3] L. Wang and F. G. Yuan, "Vibration energy harvesting by magnetostrictive material," Smart Mater. Struct., vol. 17, no. 4, p. 045009, August 2008, doi: 10.1088/0964-1726/17/4/045009.
[4] S. D. Moss, J. E. McLeod, I. G. Powlesland, and S. C. Galea, "A bi-axial magnetoelectric vibration energy harvester," Sensors and Actuators A: Physical, vol. 175, no. Supplement C, pp. 165-168, March 2012, doi: 10.1016/j.sna.2011.12.023.
[5] T. Nan et al., "Acoustically actuated ultra-compact NEMS magnetoelectric antennas," Nat Commun, vol. 8, no. 1, p. 296, December 2017, doi: 10.1038/s41467-017-00343-8.
[6] M. G. Kang et al., "High Power Magnetic Field Energy Harvesting through Amplified Magneto-Mechanical Vibration," Advanced Energy Materials, vol. 8, no. 16, p. 1703313, 2018, doi: 10.1002/aenm.201703313.
[7] M. Zaeimbashi et al., "NanoNeuroRFID: A Wireless Implantable Device Based on Magnetoelectric Antennas," IEEE Journal of Electromagnetics, RF and Microwaves in Medicine and Biology, vol. 3, no. 3, pp. 206-215, September 2019, doi: 10.1109/JERM.2019.2903930.

FURTHER REFERENCES

[1] H. Lee, et al., "A power-efficient switched-capacitor stimulating system for electrical/optical deep-brain stimulation," ISSCC Dig. Tech. Papers, 2014, pp. 414-415.
[2] Y. Lo, et al., "A 176-channel 0.5 cm3 0.7 g wireless implant for motor function recovery after spinal cord injury," ISSCC Dig. Tech. Papers, 2016, pp. 382-383.
[3] Y. Jia, et al., "A mm-sized free-floating wirelessly powered implantable optical stimulating system-on-a-chip," ISSCC Dig. Tech. Papers, 2018, pp. 468-470.

[4] B. C. Johnson et al., "StimDust: A 6.5 mm3, wireless ultrasonic peripheral nerve stimulator with 82% peak chip efficiency," CICC, 2018, pp. 1-4.

[5] S. Lee, et al., "A 330 μm×90 μm opto-electronically integrated wireless system-on-chip for recording of neural activities," ISSCC Dig. Tech. Papers, 2018, pp. 292-294.

[6] "IEEE Standard for Safety Levels with Respect to Human Exposure to Radio Frequency Electromagnetic Fields, 3 kHz to 300 GHz," IEEE Std C95.1-2005, pp. 1-238, April 2006.

[7] S. C. Tang, et al., "A wireless batteryless deep-seated implantable ultrasonic pulser-receiver powered by magnetic coupling," IEEE Trans. Ultrason., Ferroelectr., Freq. Control, vol. 58, no. 6, pp. 1211-1221, June 2011.

[8] R. Chen, et al., "Wireless magnetothermal deep brain stimulation," Science, vol. 347, no. 6229, pp. 1477-1480, March 2015.

[9] M. Seok, et al., "A Portable 2-Transistor Picowatt Temperature-Compensated Voltage Reference Operating at 0.5V," JSSC, vol. 47, no. 10, pp. 2534-2545, October 2012.

[10] Y. Lam, et al., "Integrated Low-Loss CMOS Active Rectifier for Wirelessly Powered Devices," IEEE Trans. Circuits Syst., II, vol. 53, no. 12, pp. 1378-1382, December 2006.

What is claimed:

1. A system comprising:
a magnetoelectric film;
a magnetic field generator configured to generate a magnetic field at an input frequency between 20-500 kHz, wherein the magnetic field generator is configured to transmit downlink data by performing amplitude shift keying (ASK) modulation of the magnetic field; and
an electrical circuit coupled to the magnetoelectric film, wherein:
the magnetoelectric film is configured to produce an electrical output signal when the magnetoelectric film is stimulated by the magnetic field at the input frequency;
the electrical circuit configured to receive the electrical output signal comprises:
a charging circuit configured to extract power based on the electrical output signal;
a stimulation driver configured to modify the electrical output signal such that the electrical output signal has an output frequency between 0.5-1000 Hz to stimulate a biological tissue; and
a data circuit configured to recover the downlink data encoded via the amplitude shift keying (ASK) modulation of the magnetic field; and
the electrical circuit is configured to transition between the power, the stimulation and the data recovery based on modulation of the magnetic field.

2. The system of claim 1 wherein:
the magnetoelectric film comprises a central portion; and
the electrical circuit is coupled to the central portion of the magnetoelectric film.

3. The system of claim 1 wherein: the magnetoelectric film has a resonant frequency; and
the input frequency is within ten percent of the resonant frequency of the magnetoelectric film.

4. The system of claim 1 wherein the magnetic field generator is configured to generate a series of pulses of the magnetic field.

5. The system of claim 4 wherein each pulse in the series of pulses has a duration of approximately 1 millisecond (ms).

6. The system of claim 4 wherein: the electrical output signal has an output voltage; and
an amplitude of the output voltage depends on a duration of pulses in the series of pulses.

7. The system of claim 4 wherein: the electrical output signal has an output voltage; and
an amplitude of the output voltage depends on a total number of pulses in the series of pulses.

8. The system of claim 1 wherein the electrical output signal is a monophasic or biphasic output signal.

9. The system of claim 1 wherein the magnetoelectric film comprises a magnetostrictive layer and a piezoelectric layer; a polyvinylidene fluoride (PVDF) layer; or a lead zirconate titanate (PZT) layer.

10. The system of claim 1, further comprising an electronic device, wherein the electrical output signal powers the electronic device.

11. The system of claim 1 wherein the magnetoelectric film is a first magnetoelectric film, wherein the apparatus further comprises a second magnetoelectric film, and wherein the electrical circuit is coupled to the second magnetoelectric film.

12. The system of claim 1 wherein the magnetic field generator comprises an electromagnet.

13. The system of claim 1 wherein the magnetic field generator further comprises a permanent magnet.

14. The system of claim 1 wherein the electrical components comprise a full wave rectifier and a transistor.

15. The system of claim 1 wherein the electrical components comprise a diode and a capacitor.

16. The system of claim 1 wherein the apparatus further comprises a stereotrode and wherein the electrical output signal is transmitted through the stereotrode.

17. The system of claim 1 wherein the magnetic field generator configured to generate the magnetic field at the input frequency within five percent of the resonant frequency of the magnetoelectric film.

18. The system of claim 1, wherein:
prior to transmitting the downlink data, the magnetic field generator is configured to transmit a pilot tone as an unmodulated portion of the magnetic field that is received by the electrical circuit via the magnetoelectric film; and
the electrical circuit is configured to extract a threshold voltage based on the pilot tone to decode the downlink data.

19. A system comprising:
a magnetoelectric film;
a magnetic field generator configured to generate a magnetic field at an input frequency between 20-500 kHz, wherein the magnetoelectric film is configured to produce an electrical output signal with a voltage waveform when the magnetoelectric film is stimulated by the magnetic field at the input frequency; and
an electrical circuit or material coupled to the magnetoelectric film to modify the voltage waveform, wherein:
the magnetic field generator is configured to transmit downlink data to control at least part of the system by performing amplitude shift keying modulation of the magnetic field; and
the electrical circuit or material comprises electric components configured to:
modify the electrical output signal such that the electrical output signal has an output frequency between 0.5-1000 Hz; and
recover the downlink data encoded via the amplitude shift keying modulation of the magnetic field.

* * * * *